United States Patent [19]

Kadowaki et al.

[11] Patent Number: 4,996,591
[45] Date of Patent: Feb. 26, 1991

[54] METHOD OF AND APPARATUS FOR PROCESSING COLOR IMAGE

[75] Inventors: Toshihiro Kadowaki; Tetsuya Ohnishi; Koichi Katoh, all of Yokohama; Yasumichi Suzuki, Tokyo; Toshio Honma, Kawasaki, all of Japan

[73] Assignee: Canon Kabushiki Kaisha, Tokyo, Japan

[21] Appl. No.: 193,936

[22] Filed: May 13, 1988

[30] Foreign Application Priority Data

May 15, 1987 [JP] Japan ................................ 62-119305
May 15, 1987 [JP] Japan ................................ 62-119306

[51] Int. Cl.$^5$ .......................... G03F 3/08; H04N 1/46
[52] U.S. Cl. .......................................... 358/80; 358/75
[58] Field of Search ............................ 358/75, 78, 80

[56] References Cited

U.S. PATENT DOCUMENTS

| | | | |
|---|---|---|---|
| 4,165,165 | 8/1979 | Iwami et al. | 355/327 |
| 4,204,728 | 5/1980 | Goshima et al. | 355/326 |
| 4,517,590 | 5/1985 | Nagashima et al. | 358/75 |
| 4,535,413 | 8/1986 | Shiota et al. | 358/80 |
| 4,623,973 | 11/1986 | Hoffrichter et al. | 358/80 |
| 4,639,771 | 1/1987 | Hattori et al. | 358/80 |
| 4,649,423 | 3/1987 | Hoffrichter et al. | 358/80 |
| 4,661,843 | 4/1987 | Sekizawa et al. | 358/80 |
| 4,727,425 | 2/1988 | Mayne et al. | 358/80 |
| 4,727,434 | 2/1988 | Kawamura | 358/80 |
| 4,745,466 | 5/1988 | Yoshida et al. | 358/80 |
| 4,794,382 | 12/1988 | Lai et al. | 358/80 |
| 4,855,765 | 8/1989 | Suzuki et al. | 358/80 |
| 4,873,570 | 10/1989 | Suzuki et al. | 358/80 |

FOREIGN PATENT DOCUMENTS 0145801 6/1985 European Pat. Off. .
0168818 1/1986 European Pat. Off. .
62-180668 8/1987 Japan .

Primary Examiner—James J. Groody
Assistant Examiner—Mark R. Powell
Attorney, Agent, or Firm—Fitzpatrick, Cella, Harper & Scinto

[57] ABSTRACT

There is provided a color image processing apparatus in which, by making use of an image reading apparatus of a digital full-color copying apparatus, the designated color to be obtained after conversion is input and stored as component ratio of color-separated image data, and monochromatic image data proportional to the gradation levels, e.g., density, lightness, luminance and so forth are obtained from the color separated image data produced from the original image, the monochromatic image data thus obtained being converted into the color separation data corresponding to the component ratio of the designated color to be obtained after conversion, thereby making it possible to preserve the hue of the designated color and to effect color conversion to the designated color having gradation proportional to the gradation of the original image.

33 Claims, 74 Drawing Sheets

FIG. 3

| COMMAND | CODE | FUNCTION |
|---|---|---|
| RESET COMMAND | 01H | AFTER RECEPTION OF RESET COMMAND, 0-ADDRESS CALLED STARTS FOLLOWING A SERIES OF COMMUNICATION HANDSHAKING |
| HOLD-OFF COMMAND | 02H | AFTER RECEPTION OF HOLD-OFF COMMAND, STEPPING MOTOR CONTROLLER RELEASES HOLD STATE OF MOTOR AND MAKES SCANNER FREE (POWER ON STATE) |
| HOLD-ON COMMAND | 03H | AFTER RECEPTION OF HOLD-ON COMMAND, STEPPING MOTOR CONTROLLER MAINTAINS HOLD STATE OF MOTOR |
| HP SEARCH COMMAND | 04H | AFTER RECEPTION OF HP SEARCH COMMAND, SCANNER IS MOVED TO HP SENSOR POSITION (MOVING OPERATION CONSISTS OF THREE STATES) |
| SCAN COMMAND | 05H | SCAN COMMAND IS NORMALLY TO DESIGNATE SCAN MODE, AND CONSISTS OF FOLLOWING 4-BYTE PARAMETER (SCAN LENGTH; MAGNIFICATION). AFTER RECEPTION OF SCAN COMMAND AND PARAMETERS, SCANNER STARTS RESPONSIVE TO "SSTART" SIGNAL SCAN COMMAND IS HELD UNTIL RESET. DEFAULT VALUE: A-4 SIZE (210mm) EQUI-MAGNIFICATION (100%) |
| DESIGNATION MOVEMENT COMMAND | 06H | DESIGNATION MOVEMENT COMMAND IS TO DESIGNATE MOVEMENT DISTANCES IN TWO DIRECTIONS FROM PRESENT POSITION, AND CONSISTS OF FOLLOWING 2-BYTE PARAMETER |

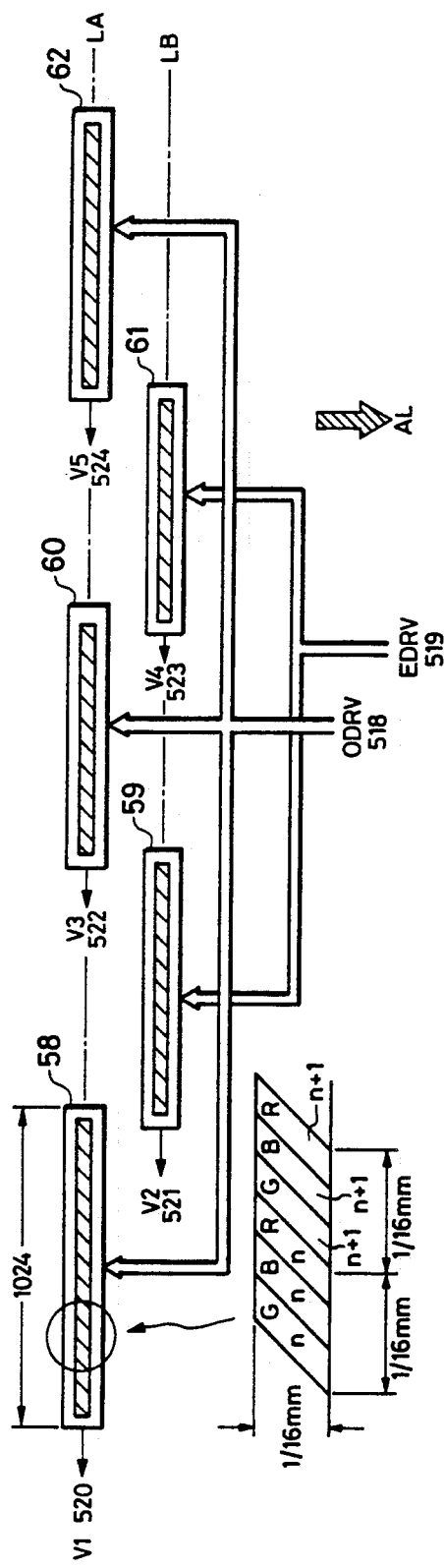
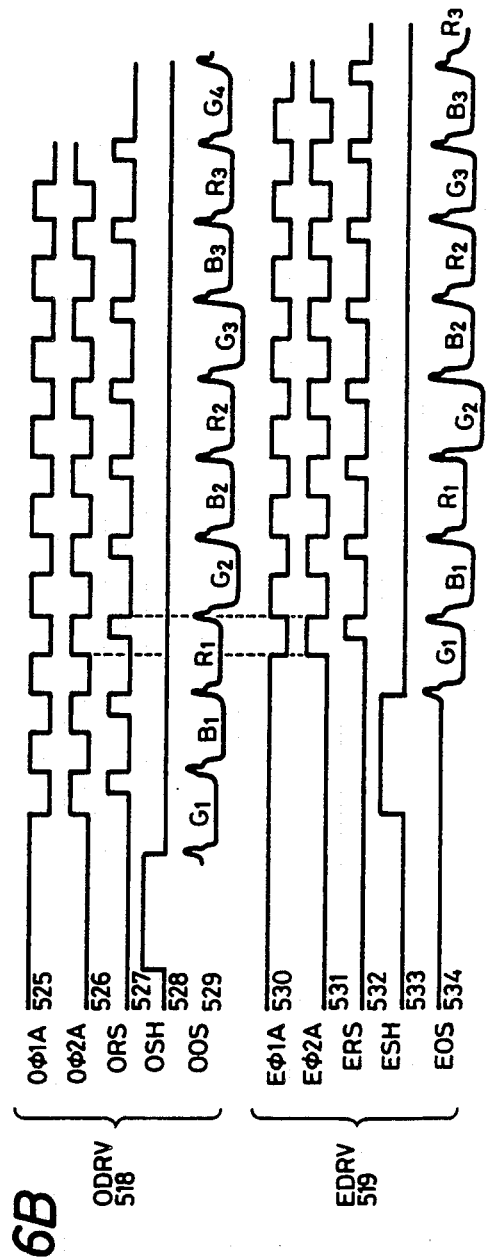
FIG. 6A
FIG. 6B

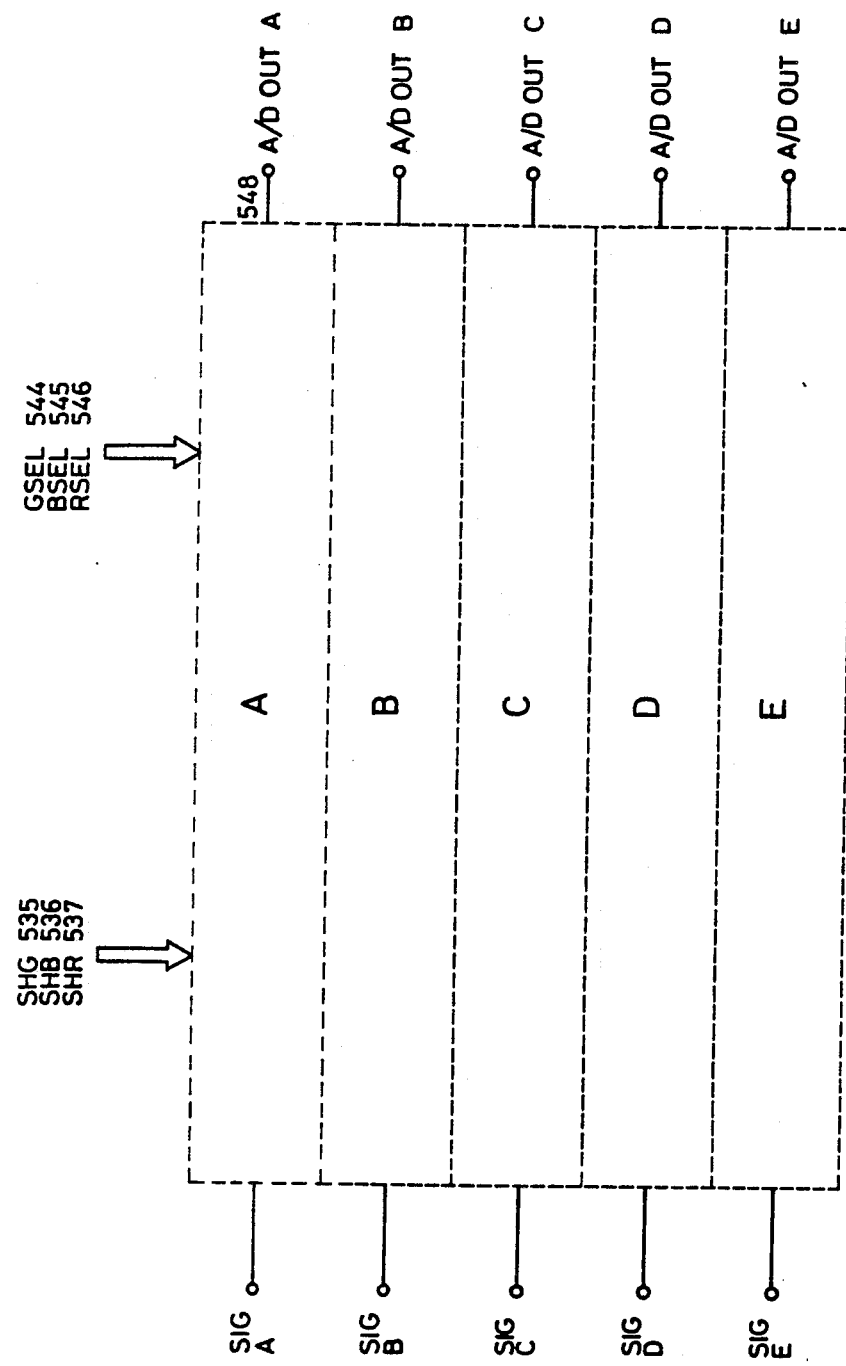

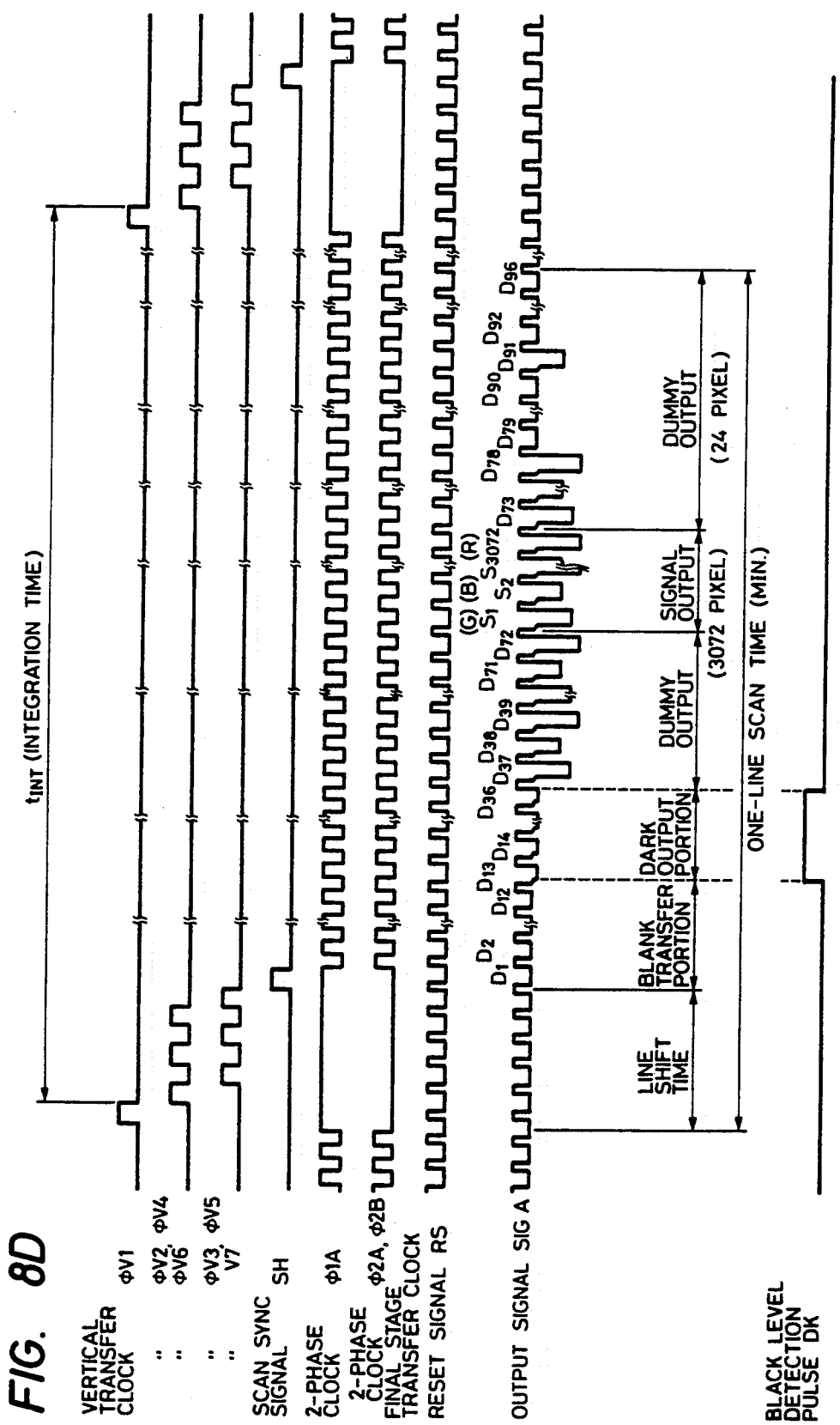

FIG. 17E
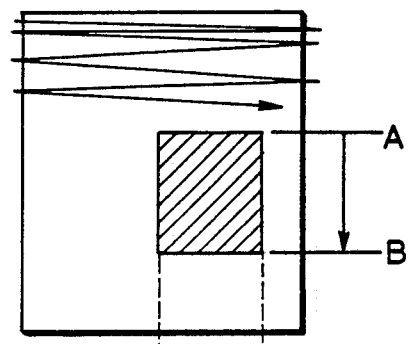
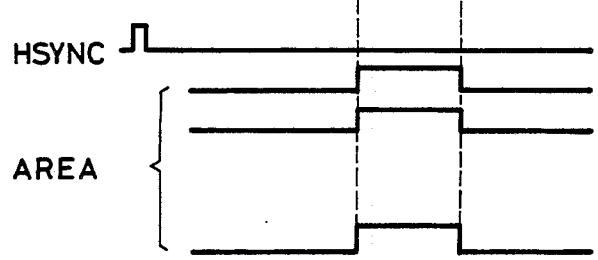
FIG. 17G
| BIT | 0 | UAREA | 565 |
| --- | --- | --- | --- |
| BIT | 1 | KAREA | 587 |
|  | 2 | MAREA | 564 |
|  | 3 | GAREA | 626 |
|  | 4 | AWE | 628 |
|  | 5 | ARE | 632 |
|  | 6 | BWE | 629 |
|  | 7 | BRE | 633 |
|  | 8 | TMAREA | 660 |
|  | 9 | CHAREA 0 | 615 |
|  | 10 | ♦ 1 | 665 |
|  | 11 | ♦ 2 | 666 |
|  | 12 | ♦ 3 | 667 |
|  | 13 | CHSEL 0 | 668 |
| BIT | 14 | CHSEL 1 | 669 |
FIG. 17F
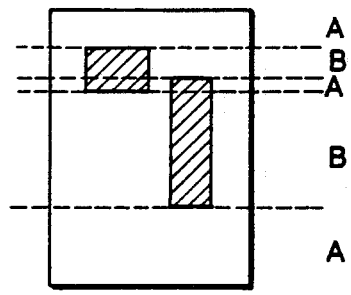

FIG. 18B
| $S_0$ | $S_1$ | $S_2$ | $S_3$ | $\bar{O}$ |
|---|---|---|---|---|
| 1 | 1 | 0 | 0 | 1 |
| 1 | 1 | 0 | 1 | 2 |
| 1 | 1 | 1 | 0 | 3 |
| 0 | X | X | X | 4 |
| X | 0 | X | X | 4 |
FIG. 18D
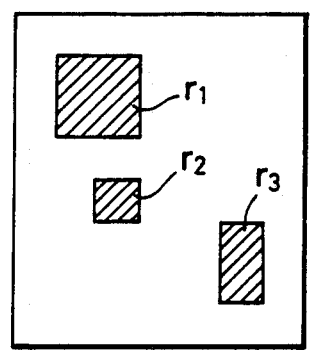
FIG. 18C
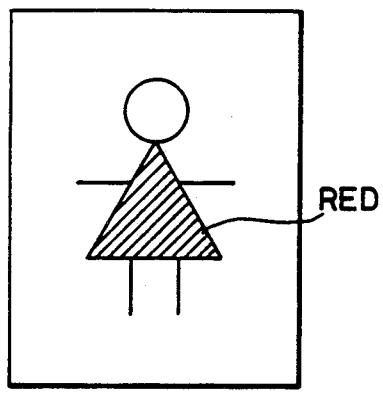
FIG. 18E
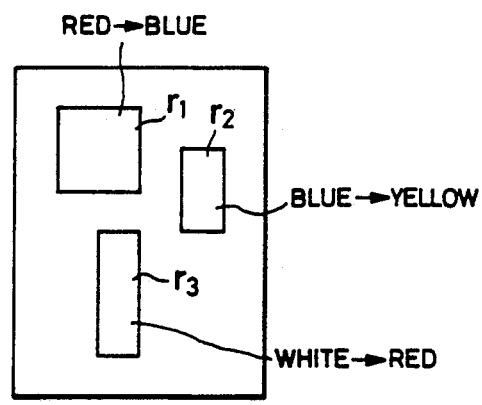

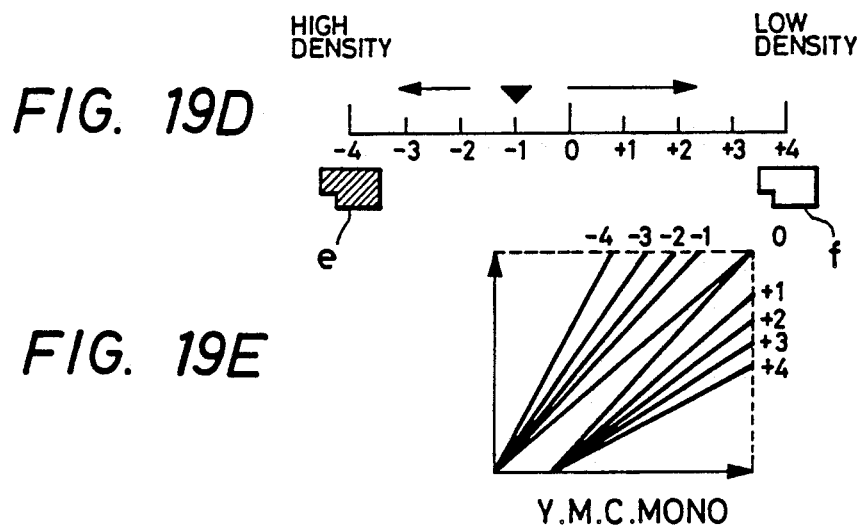
FIG. 19D
FIG. 19E
FIG. 19F
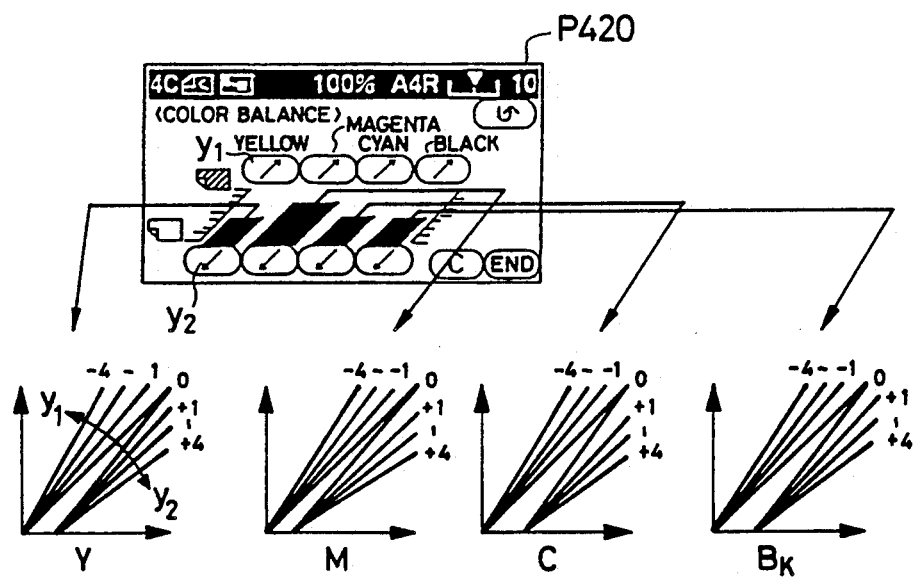
FIG. 19F-Y    FIG. 19F-C
FIG. 19F-M    FIG. 19F-BK

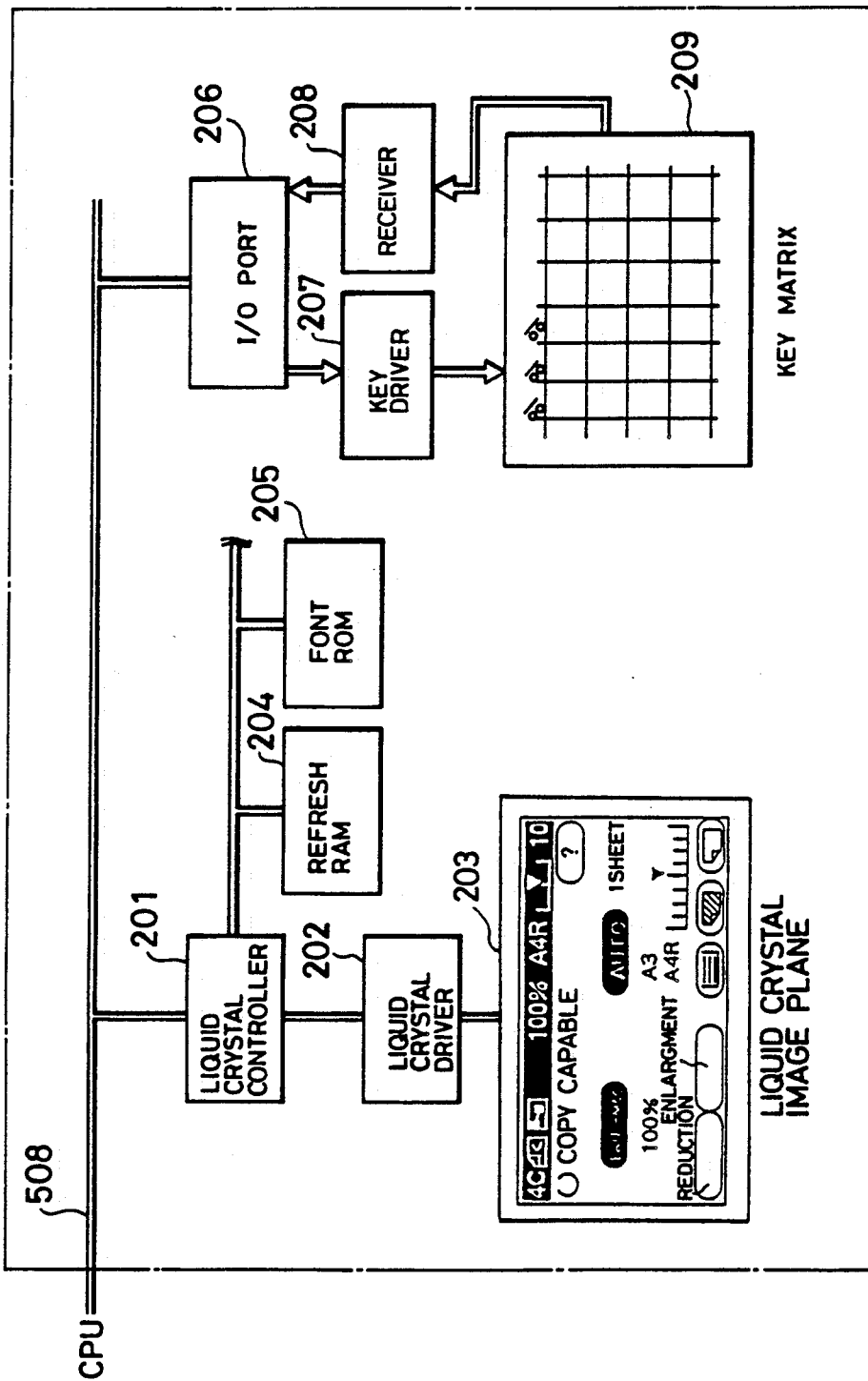

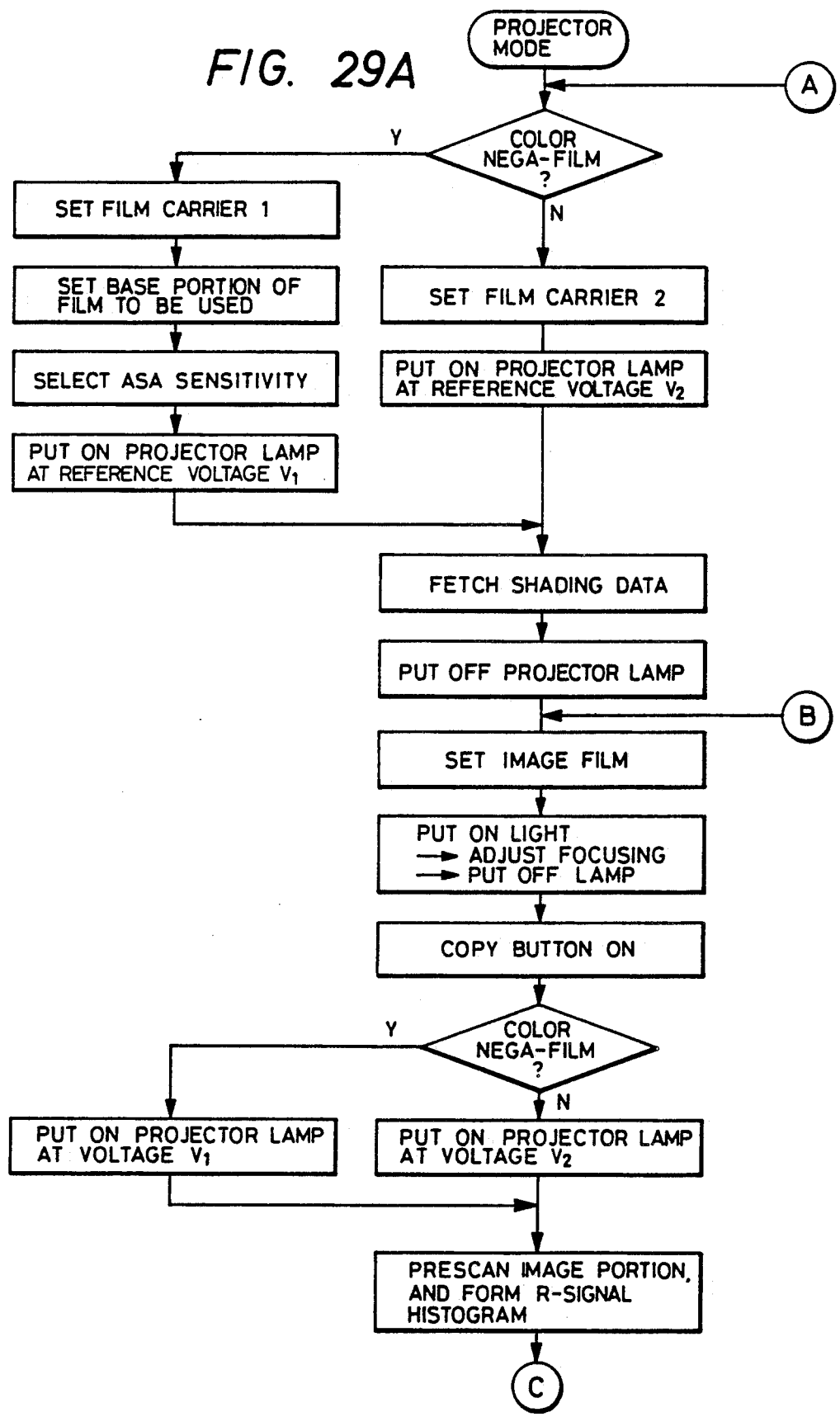

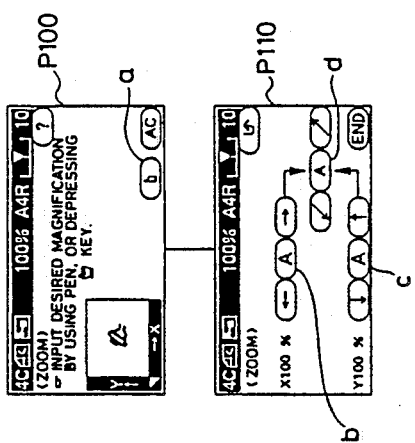
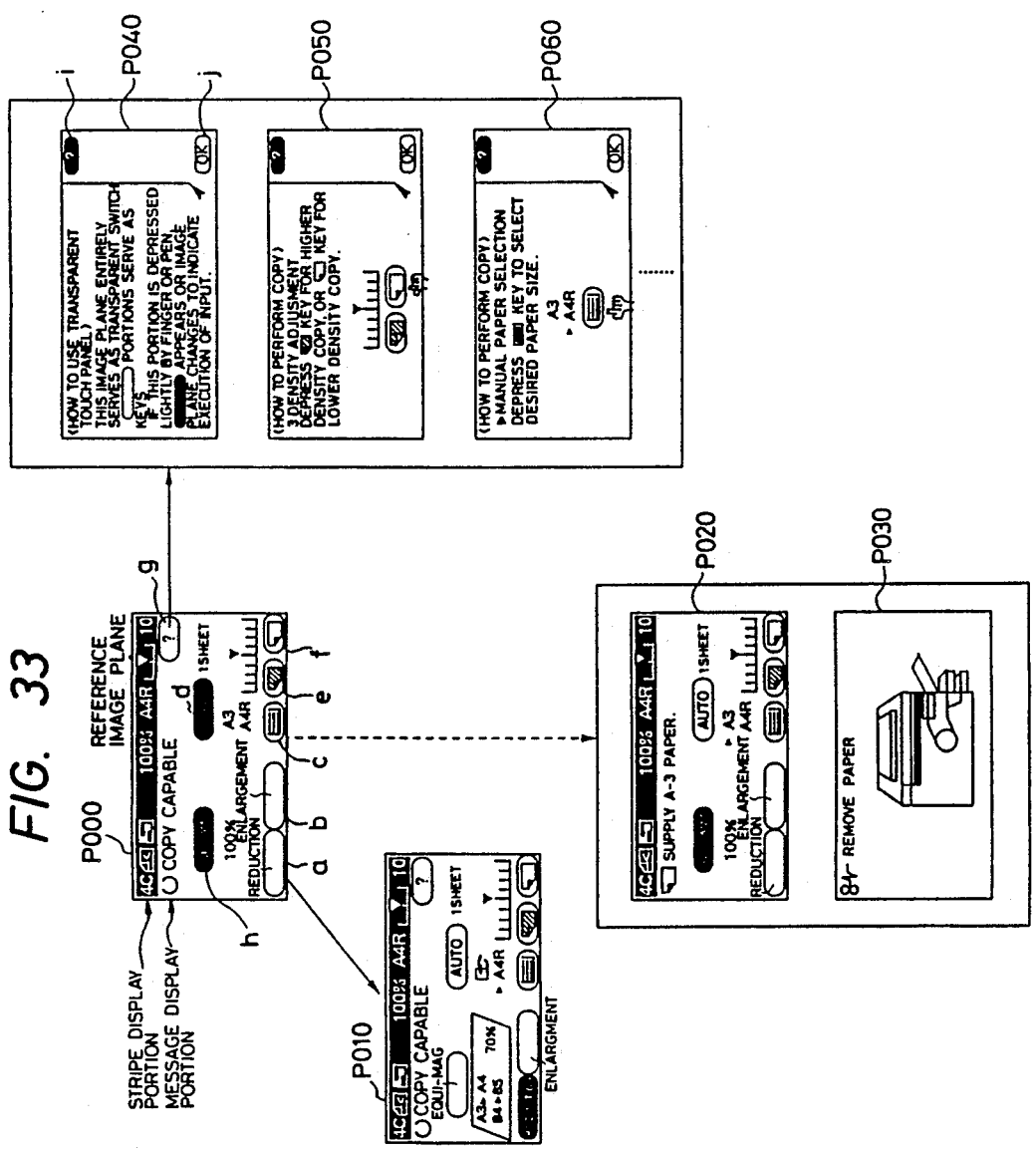
FIG. 34
FIG. 33

MONOCHROME ORIGINAL DOCUMENT

COLOR ORIGINAL DOCUMENT

PRINT AFTER INSERTION SYNTHESIZING

FIG. 45

| STANDARD COLOR | YELLOW COMPONENT | MAGENTA COMPONENT | CYAN COMPONENT | BLACK COMPONENT |
|---|---|---|---|---|
| YELLOW | 80H | 00H | 00H | 00H |
| MAGENTA | 00H | 80H | 00H | 00H |
| CYAN | 00H | 00H | 80H | 00H |
| BLACK | 00H | 00H | 00H | 80H |
| RED | 80H | 80H | 00H | 00H |
| GREEN | 80H | 00H | 80H | 00H |
| BLUE | 00H | 80H | 80H | 00H |

COMPARISON OF EACH COLOR COMPONENT
IN STANDARD COLOR DESIGNATION
(WHITE IMAGE = 00, BLACK = FFH)

FIG. 52B $V_{OUT} = -V_{IN}/N$ $$0 < N < 1$$

$$A_v = -\frac{V_{OUT}}{V_{IN}} = -\frac{1}{N}$$

$A_v$ = VOLTAGE GAIN $$N = \frac{BIT\ 1}{2^1} + \frac{BIT\ 2}{2^2} + \cdots + \frac{BIT\ 8}{2^8}$$

| DIGITAL INPUT N | $A_v$ |
|---|---|
| MSB      LSB<br>0 0 0 0  0 0 0 0 | $-A_{OL}$(OPAMP) |
| 0 0 0 0  0 0 0 1 | $-256$ |
| 1 0 0 0  0 0 0 0 | $-\frac{256}{128} = -2$ |
| 1 1 1 1  1 1 1 1 | $-\frac{256}{256} = -1$ |

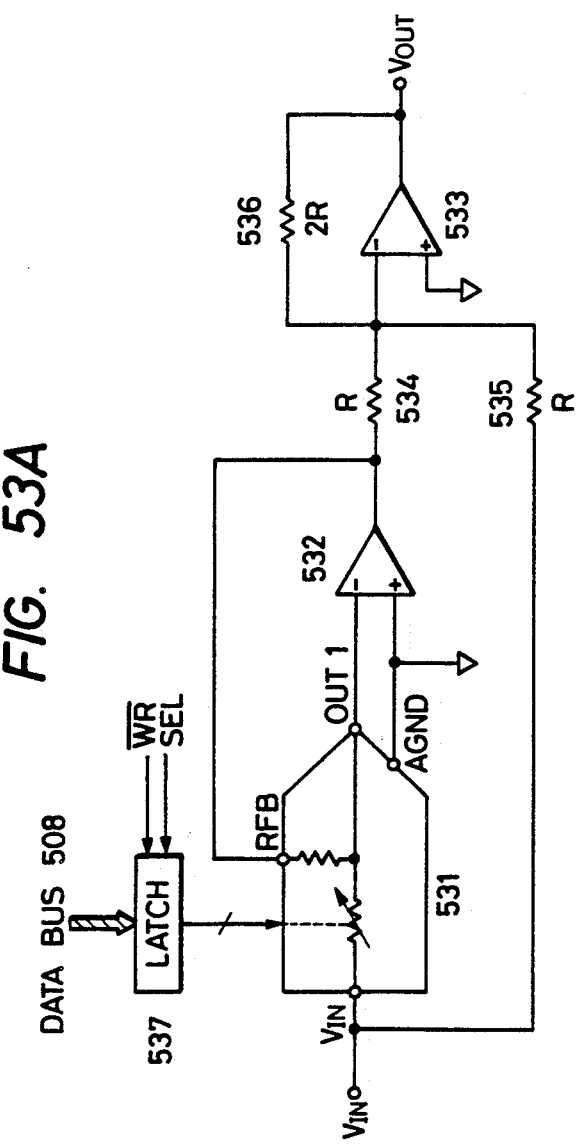

METHOD OF AND APPARATUS FOR PROCESSING COLOR IMAGE

BACKGROUND OF THE INVENTION

1. Field of the Invention

The present invention relates to a color image forming apparatus which is capable of reading an original color image having a gradation and outputting images of desired designated colors

2. Description of the Related Art

In the field of color image forming technic to which the present invention pertains, a method has been proposed in which a mono-color copying apparatus is provided with a plurality of developing units for different colors so that a monochromatic copy image is obtained in desired one of the different colors provided by the developing units Also is proposed a method in which a copy image of a fixed color selected from yellow, magenta, cyan, black, red, green and blue colors is produced by a full-color copying apparatus which operates with a combination of developing agents of complementary three primary colors of yellow, magenta and cyan plus black Unfortunately, these known methods could provide only monochromatic copy images of colors which are available in the copying apparatus. Thus, these known methods could be used effectively only when a mere sorting of copy images according to color is required.

SUMMARY OF THE INVENTION

Accordingly, an object of the present invention is to provide a method of and an apparatus for processing color images which are capable of overcoming the above-described problems of the prior art.

Another object of the present invention is to provide a method of and an apparatus for processing color images which can uniformalize the hue of the copy image while preserving the gradation possessed by the object image.

Still another object of the present invention is to provide a method of and apparatus for processing color images which affords free selection of hue in converting the hue of the object image into a uniform hue.

A further object of the present invention is to provide improved color image processing method and apparatus which can easily be applied to color copying apparatus.

To these ends, according to the present invention, there is provided a color image processing apparatus in which, by making use of an image reading apparatus of a digital full-color copying apparatus, the designated color to be obtained after conversion is input and stored as component ratio of color-separated image data, and monochromatic image data proportional to the gradation levels, e.g., density, lightness, luminance and so forth are obtained from the color separated image data produced from the original image, the monochromatic image data thus obtained being converted into the color separation data corresponding to the component ratio of the designated color to be obtained after conversion, thereby making it possible to preserve the hue of the designated color and to effect color conversion to the designated color having gradation proportional to the gradation of the original image.

A still further object of the present invention is to present invention is to provide an image processing method and apparatus which, in converting the object image into an image of the same hue, enables the density of the object image to be corrected freely.

A still further object of the present invention is to provide a color image processing method and apparatus having novel functions.

A still further object of the present invention is to provide a recording medium which records a novel image formed by the novel color image processing method or apparatus.

These and other objects, features and advantages of the present invention will become clear from the following description of the preferred embodiment when the same is read in conjunction with the accompanying drawings.

BRIEF DESCRIPTION OF THE DRAWINGS

FIG. 6A is an illustration of arrangement of color CCD sensors;

FIG. 6B is a timing chart illustrating timings of signals at different portions of the arrangement shown in FIG. 6A;

FIG. 8A is a block diagram of an analog color signal processing circuit 44 shown in FIG. 5;

FIG. 8D is a timing chart illustrating the timing of driving of the CCD;

FIGS. 11-1B, 11-1C and 11-1D are illustrations of the manner in which the white level correction is conducted;

FIGS. 11-2A, 11-2B, 11-2C and 11-3 are illustrations of a manner in which CCD channels are connected;

FIGS. 17A, 17B, 17C, 17D, 17E, 17F and 17G are illustrations of generation of region signals;

FIGS. 18A, 18B, 18C, 18D and 18E are illustrations of color conversion;

FIGS. 19A, 19B, 19C, 19D, 19E, 19F, 19F-Y, 19F-M, 19F-C and 19F-BK are illustrations of gamma correction conducted for the purpose of controlling the color balance and color density;

FIG. 22 is a control circuit diagram showing the construction of a control circuit in an operation panel unit;

FIGS. 29A and 29B are control flow charts illustrating the manner in which the operation of the apparatus is controlled when the film projector is used;

FIG. 33 is an illustration of a liquid crystal standard display;

FIG. 34 is an illustration of the manner in which the apparatus is operated when the same is used in zooming mode;

FIG. 40-1 is an illustration of the manner in which the apparatus is operated in the registration mode;

FIG. 40-2 is an illustration of operation of the apparatus in service mode;

FIG. 45 is an illustration of color components of the standard color;

FIG. 52B is an illustration of the code table of the multiplier 258;

FIG. 53A is a circuit diagram showing the circuit of a multiplier 260 in the circuit shown in FIG. 8B;

FIG. 53B is an illustration of the code table of the multiplier 260;

DESCRIPTION OF THE PREFERRED EMBODIMENT

A preferred embodiment of the present invention will be described in detail hereinunder with reference to the accompanying drawings.

Figure 1:
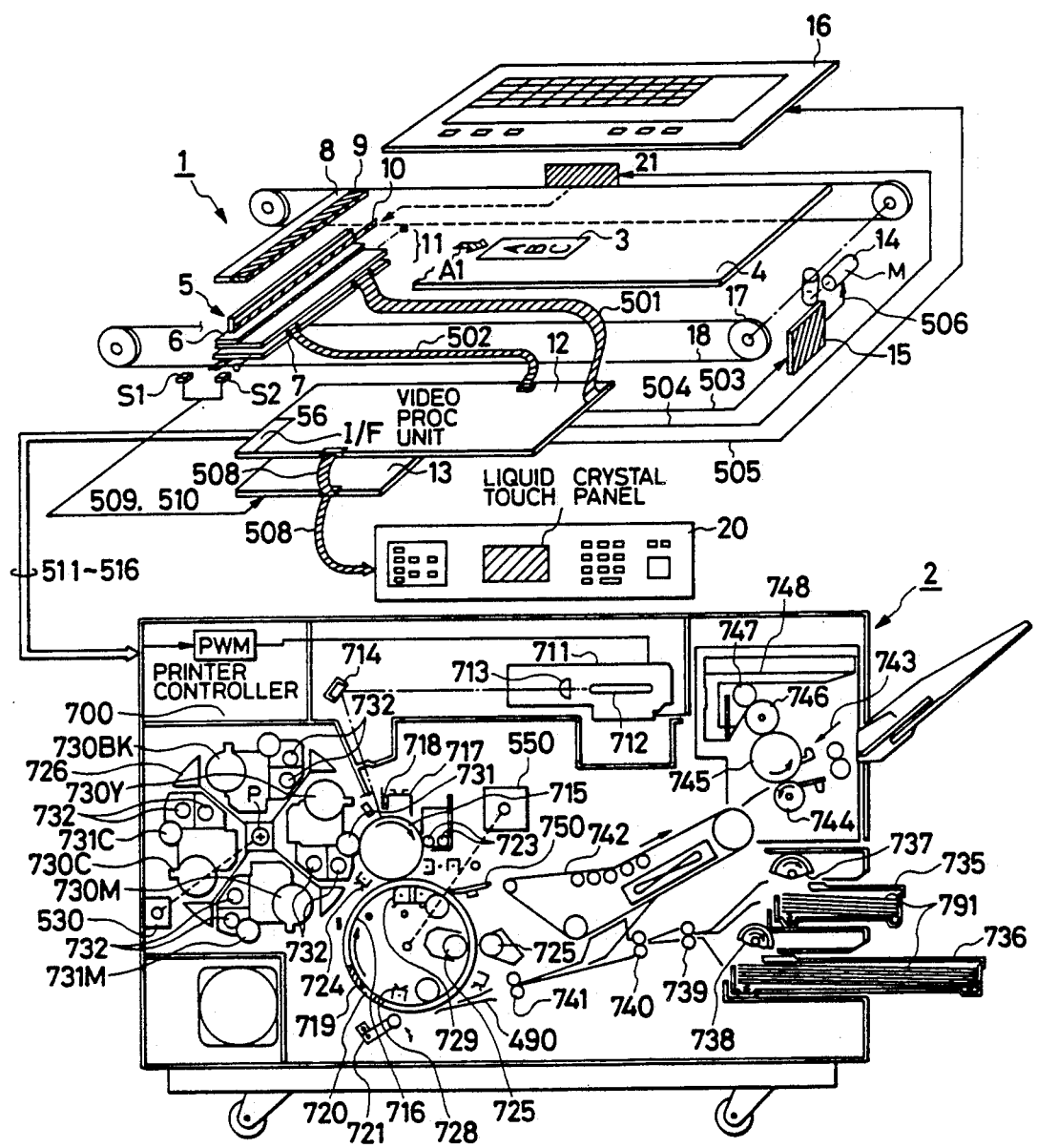
FIG. 1 is an illustration of a digital color copying apparatus embodying the present invention.

Construction of Image Processing System Incorporating Image Reading Apparatus Embodying Invention FIG. 1 schematically shows the construction of a digital color image processing system which incorporates an image reading apparatus of the present invention. As will be seen from this figure, the image processing system has an upper portion constituting a digital color image reading apparatus 1 (referred to as "color reader", hereinafter) and a lower portion constituting a digital color image printing apparatus 2 (referred to as "color printer" hereinafter). The color reader 1 is capable of reading color image information of an original image on the basis of different colors, by a combination of a later-mentioned color separation means and a photoelectric conversion element such as CCD. The color reader 1 then converts the color information in different colors into electrical digital image signals corresponding to the respective colors. The color printer 2 is a laser beam color printer of electrophotographic type which is capable of reproducing color images of different colors in accordance with the digital image signals and performing a plurality of transfer cycles so as to print a color image in the form of digital dot patterns on a recording paper.

A description will be made first as to the color reader 1. The color reader has an original 3, a platen glass 4 for carrying an original, a halogen exposure lamp 10 by which the original is scanned, a rod array lens 5 which receives and collects light reflected by the original, and a real-size full-color sensor 6 into which a light image is input by the rod array lens. The rod array lens 5, the real-size full-color sensor 6, and the halogen exposure lamp 10 in combination constitute an original scanning unit 11 which is movable in the direction of an arrow A1 whereby the original is scanned. The color-separated image signals obtained through scanning over each scan line are input to a sensor output signal amplifier circuit 7 so as to be amplified to a predetermined voltage level. The amplified signals are input through a signal line 501 to a video processing unit 12 and are processed by this unit in a manner which will be detailed later. In order to ensure a high fidelity of signal transmission, the signal line 501 is constituted by a coaxial cable. Another signal line 502 is intended for transmitting driving pulses for driving the real-size full-color sensor 6. All the pulses necessary for driving the full-color sensor 6 are produced in the video processing unit 12. Numerals 8 and 9 denote, respectively, white and black boards for use in white-level correction and black-level correction which will be explained later. More specifically, the white and black boards 8 and 9 are adapted to be illuminated by the halogen exposure lamp 10 and are suitably processed thereby forming signals of predetermined levels which are used in white-level correction and blacklevel correction of the video signal. A reference numeral 13 designates a control unit having a microcomputer. The control unit 13 performs various controls: namely, control of display and key-input on the control panel 20 through a BUS 508; control of operation of the video processing unit 12; control of the stepping motor driving circuit for driving a stepping motor 14 which drives the scanning unit 11 through the signal line 502 in response to position signals representing the position of the scanning unit 11 detected by position sensors S1, S2 and transmitted through signal lines 509, 510; control of the state of the halogen exposure lamp 10, as well as the quantity of light from the same, by means of an exposure lamp driver which in turn is controlled through the signal line 504; and all types of control necessary in the color reader unit 1 including the control of a digitizer 16, control of internal keys and control of display units. The color image signals read by the exposure scanning unit 11 during the scanning operation are input to the video processing unit 12 through the amplifier circuit 7 and the signal line 501, and undergo various processings conducted in this unit 12 as will be explained later. The thus processed color image signals are sent to the printer unit 2 through an interface circuit 56.

A description will be made hereinunder as to the color printer 2. The color printer 2 has a scanner 711 which includes various parts such as a laser output unit for converting the image signals from the color reader 1 into light signals, a polygon mirror 712, e.g., an octagonal mirror, a motor (not shown) for rotationally driving this polygonal mirror, and an f/θ lens (image-forming lens) 713. A reference numeral 715 designates a photosensitive drum. The laser beam emitted from the laser output unit is reflected by the polygon mirror 712 onto the surface of the photosensitive drum 715 thereby to raster-scan the surface of the photosensitive drum 715, whereby a latent image corresponding to the original image is formed on the surface of the photosensitive drum 715.

The color printer 2 further has a primary charger 717, a whole exposure lamp 718, a cleaner unit 723 for collecting residual toner particles which have not been used in the image transfer, and a pre-transfer charger 724. The primary charger 717, whole exposure lamp 718, cleaner unit 723, and the pre-transfer charger 724 are arranged around the photosensitive drum 715.

A reference numeral 726 designates a developing unit capable of developing the electrostatic latent image formed on the surface of the photosensitive drum 715. The developing unit 726 includes developing sleeves 731Y, 731M, 731C and 731Bk which are adapted for conducting development upon direct contact with the photosensitive drum 715 toner hoppers 730Y, 730M, 730C and 730Bk for preserving toner particles and a screw 732 for conveying the toner as the developer. These parts of the developing unit 726 are arranged around the axis P of rotation of the developing unit. When an yellow toner image is to be formed, the development is conducted in the illustrated position by means of the yellow toner, whereas, when a magenta toner image is to be formed, the developer unit 726 is rotated about the axis P in the drawings so as to bring the developing sleeve 741M into contact with the photosensitive drum 715. Development in other colors, i.e., cyan and black, can be conducted in the same manner.

The toner image formed on the photosensitive drum 715 is transferred to a paper by means of a transfer drum 716. A reference numeral 719 designates an actuator plate for detecting the position of the transfer drum 716. More specifically, a position sensor 720 is adapted to produce a signal representing that the transfer drum 716 has been brought to the home position, as it is brought to a position near the actuator plate 719. The color printer 2 further has a transfer drum cleaner 725, a paper retaining roller 727, a charge eliminator 728 and a transfer charger 729. These parts 719, 720, 725, 727 and 729 are arranged around the transfer roller 716.

The copy paper sheets are fed selectively from paper cassettes 735, 736 by means of paper feed rollers 737, 738. The feed and convey of the printing paper sheet are controlled by means of timing rollers 739, 740 and 741. The paper sheet which has been fed by the feed rollers is guided by a paper guide 749 and is wound on the transfer drum 716 with its leading end gripped by a later-mentioned gripper so as to be sent to an image-forming process.

A reference numeral 550 designates a drum motor which drives the photosensitive drum 715 and the transfer drum 716 in such a manner that these drums rotate in synchronism with each other. A reference numeral 750 designates a separator claw for separating the copy paper sheet from the transfer drum 716 after completion of formation of the image. A numeral 742 denotes conveyor belts for conveying the copy paper sheet after separation from the transfer drum 716. A numeral 743 designates an image fixing unit for fixing the image on the copy paper sheet which has been conveyed by the conveyor belts 742. The image fixing unit 743 has a pair of heat-pressing rollers 744 and 745.

A description will be made hereinunder as to the control unit 13 of the reader unit, with specific reference to FIG. 2.

Control Unit

Figures 1A, 11:
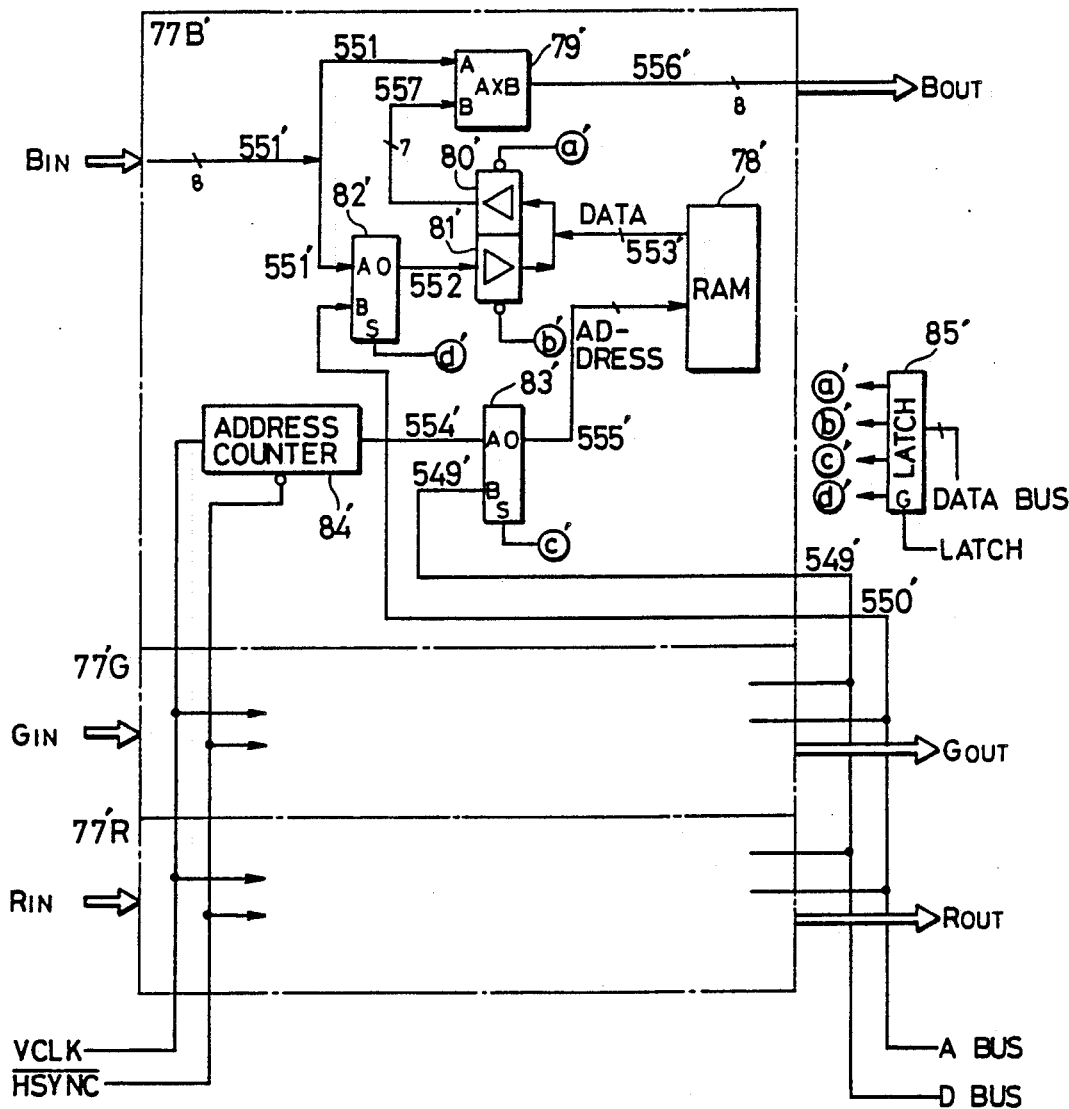
FIG. 11-1A is a circuit diagram showing the construction of a white level correction circuit.
Figures 1B, 11:
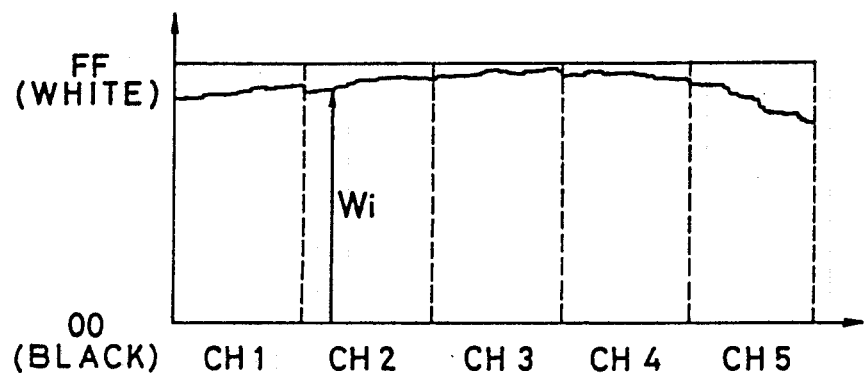
Figures 1C, 11:
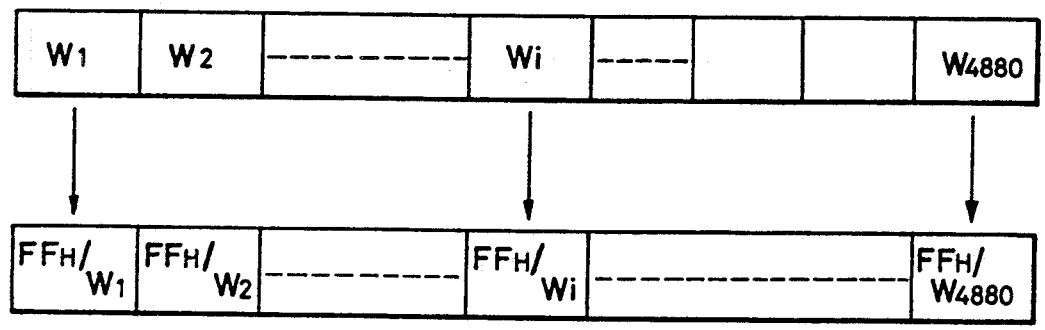
Figures 1D, 11:
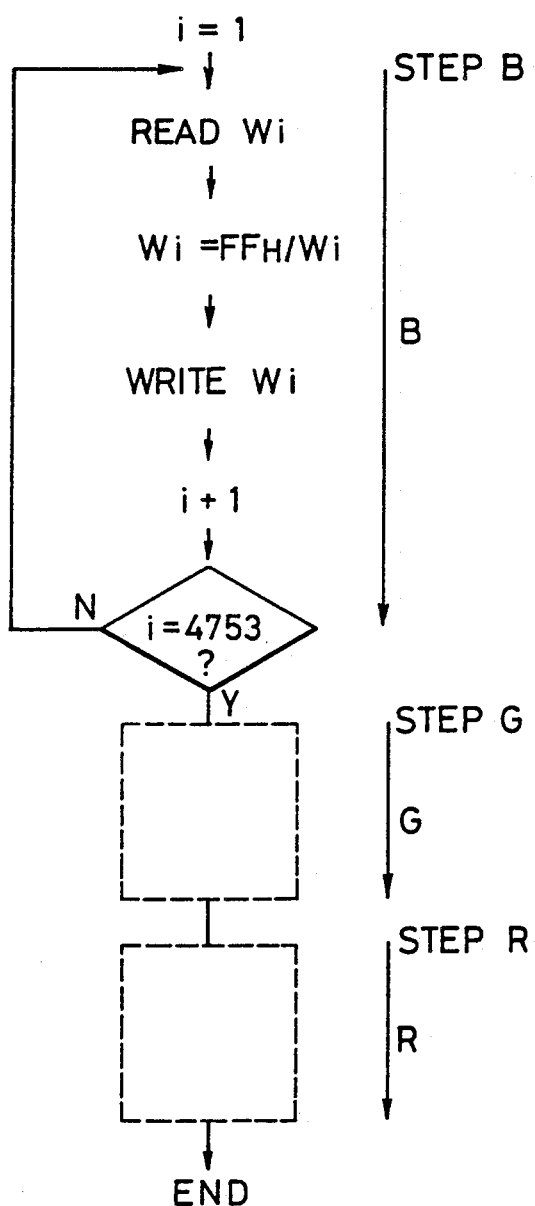

The control unit includes a CPU 22 which is a microcomputer. The control unit is adapted for performing various types of control such as the control of the video processing, control of the lamp driver 21 for effecting exposure and scanning, control of the motor driver 15, control of the digitizer 16 and the control of the control panel 20. These controls are performed through signal lines (BUSes) 508, 504, 503 and 505 and in accordance with programs stored in the ROM 23 and RAMs 24 and 25, so as to obtain desired copy of the image. The RAM 25 is backed-up by a series of batteries 31 which ensures non-volatile nature of this memory. The signal line 505 is constituted by a line which is ordinarily used for the purpose of serial signal transmission. The signals transmitted through this signal line are input by the operator through the digitizer 16, in accordance with the protocol between the CPU 22 and the digitizer 16. More specifically, signals input through the signal line 505 are, for example, instruction signals for appointing coordinates or regions in editorial operations such as shifting and synthesis of images, instructions for selecting a copy mode, instructions for determining the magnification, and so forth. The signal line 503 is adapted to transmit signals from the CPU 22 to the motor driver 15 for giving instructions concerning the scanning speed, scanning distance and scanning direction. Upon receipt of the instructions from the CPU 22, the motor driver 15 delivers predetermined pulses to the stepping motor 14 thereby operating the motor so as to attain the desired movement of the scanning unit. The serial I/Fs 29, 30 may be ordinary ones which may be realized by, for example, by serial I/F LSIs such as Model 8251 available from INTEL Co., Ltd. Although not shown in the drawings, similar circuits are also provided in the digitizer 16 and the motor driver 15. FIG. 3 shows the protocol of the interface between the CPU 22 and the motor driver 15.

Sensors S1 and S2 are provided for detecting the position of the original exposure scanning unit 11 (see FIG. 1). More specifically, the sensor S1 detects that the original exposure scanning unit is in the home position where the white-level correction of the image signal is conducted. On the other hand, the sensor S2 detects that the original exposure scanning unit is on the leading end of the image. This position is used as the original reference position.

Printer Interface

Figure 2:
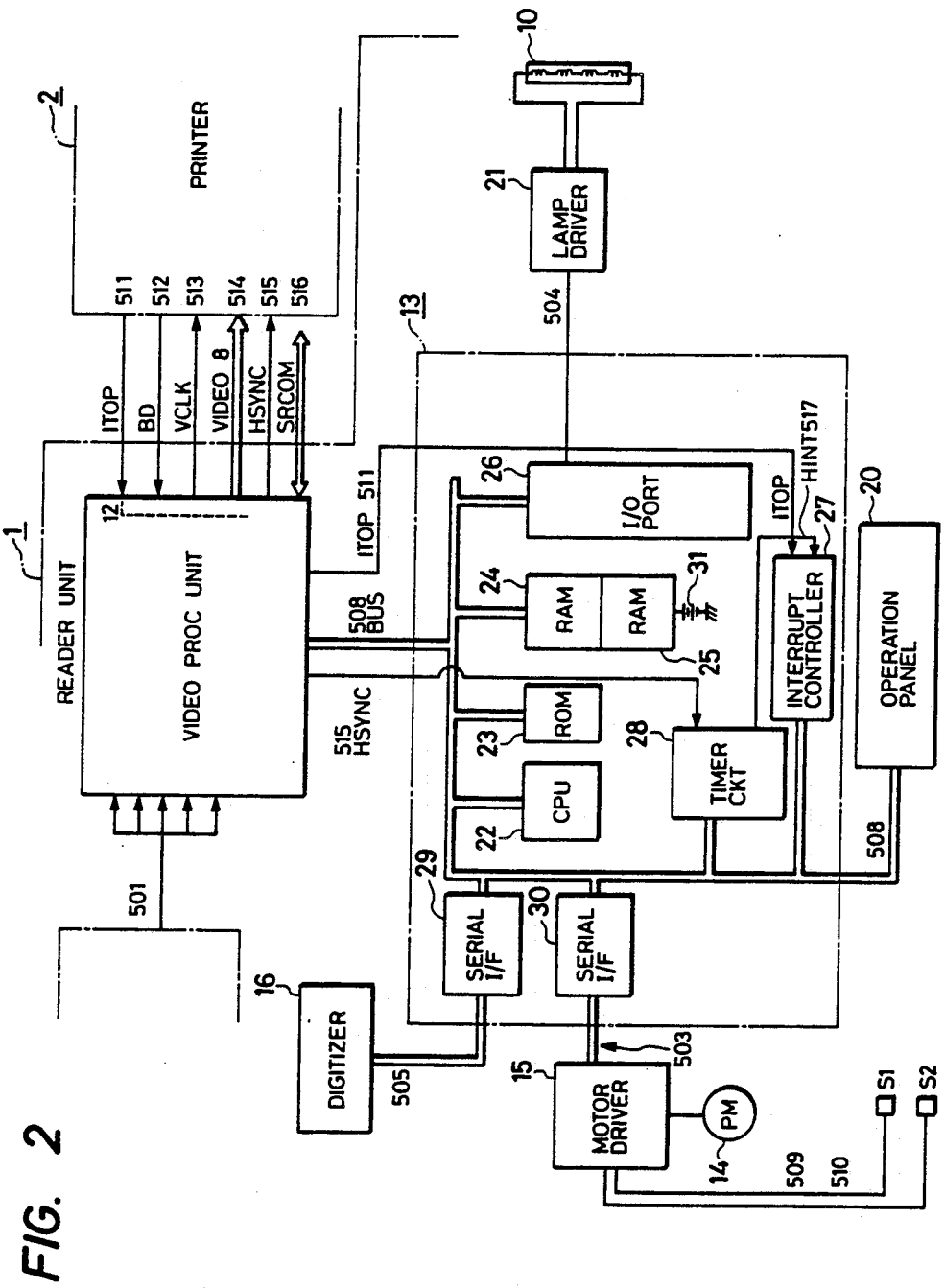
FIG. 2 is a block diagram of a reader control unit.

Referring to FIG. 2, signals ITOP, BD, VCLK, VIDEO, HSYNC and SRCOM (511 to 516) are signals for the interface between the color printer unit 2 and the reader unit 1. The image signal VIDEO 514 as read by the reader unit 1 is transmitted to the color printer unit 2 in accordance with the above-mentioned signals. More specifically, the signal ITOP is a synchronizing signal for attaining synchronism in the direction of feed of the image. This direction will be referred to as "sub-scan direction", hereinafter. The signal ITOP is produced once for each color in the transmission of signals corresponding to one frame of image. Thus, in case of transmission of four-color image constituted by yellow, magenta, cyan and black, four pieces of signals ITOP are produced in the transmission of one frame. This signal is timed to be in synchronism with the rotations of the transfer drum 716 and the rotation of the photosensitive drum 715 so that the leading end of the copy paper sheet wound on the transfer drum 715 may be aligned with the image on the leading end of the original when the toner image on the photosensitive drum 715 is transferred to the copy paper sheet at the nip between both drums 715 and 716. To this end, the signal ITOP is input as an interruption 511 to the CPU 22 in the controller 13. The CPU 22 performs control of the image in the sub-scan direction for the purpose of, for example, edition, in accordance with the ITOP interruption. A synchronizing signal BD 512 is produced once per each rotation of the polygonal mirror 712, i.e., per each raster scan so as to attain synchronism of signals in the direction of the raster scan. This direction will be referred to as "main-scan direction", hereinafter. The reader unit 1 produces image signals upon reading the original, and the thus obtained image signals are delivered to the printer unit 2 in a line-by-line fashion in synchronism with the synchronizing signals BD. A symbol VCLK 513 is a synchronizing clock signal for delivering an 8-bit digital video signal to the color printer unit 2. For instance, the 8-bit digital video signal is transmitted through flip-flops 32 and 35, as shown in FIG. 4B. A horizontal synchronizing signal HSYNC 515 is a signal for attaining synchronization of signals in the direction of the main scan and is produced in synchronization with the VCLK 513 in accordance with the signal BD. The signal HSYNC has the same period as the signal BD. More strictly, the video signal VIDEO is produced in synchronization with the horizontal synchronizing signal HSYNC 515, for the following reason. The signal BD is generated in synchronization with the rotation of the polygon mirror 712, so that this signal inevitably contains jitter components produced by the motor for driving the polygon mirror 712. Therefore, if the signal VIDEO 514 is produced in synchronization with the signal BD, the signal VIDEO 514 inevitably contains jitter components. To overcome this problem, the signal VIDEO 514 is generated in synchronization with the horizontal synchronizing signal HSYNC 515 which in turn is generated in accordance with the signal BD in synchronization with the synchronizing clock VCLK which does not contain any jitter component. The signal line SRCOM is a semi-double signal line for by-directional serial signal transmission. As shown in FIG. 4C, a command CM is delivered in synchronization with an 8-bit serial clock SCLK which is delivered in a period between successive synchronizing signals CBUSY (command busy) which are delivered from the reader unit. In response to this command CM, the printer unit transmits a status signal ST in synchronization with an 8-bit serial clock produced in a period between successive SBUSY (status busy) signals. The timing chart in FIG. 4C shows that a status signal "3CH" is sent back in response to a command "8EH". Thus, instructions from the reader unit to the printer unit, e.g., appointment of color mode and selection of cassette, as well as information concerning the status of the printer, e.g., jamming of paper, absence of paper, wait and so forth, are transmitted through this signal line SRCOM.

Figure 4A:
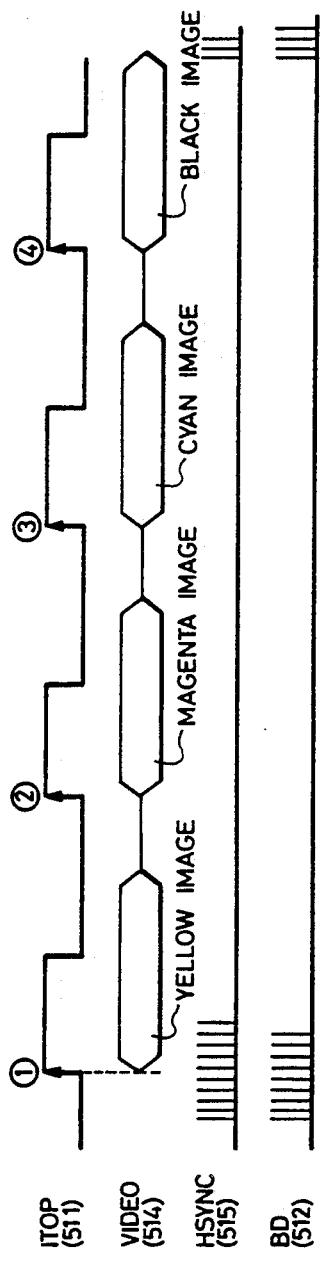
FIG. 4A is a timing chart showing the timing of signals exchanged between a reader unit and a printer unit.
Figure 4B:
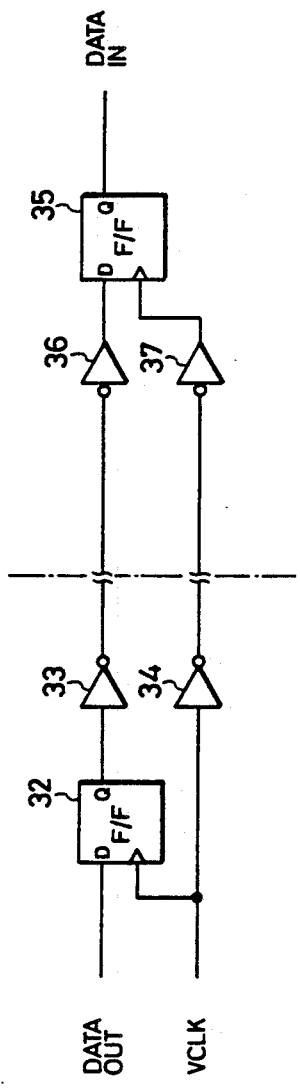
FIG. 4B is a circuit diagram illustrating a video signal delivery circuit between the reader unit and a printer unit.
Figure 4C:
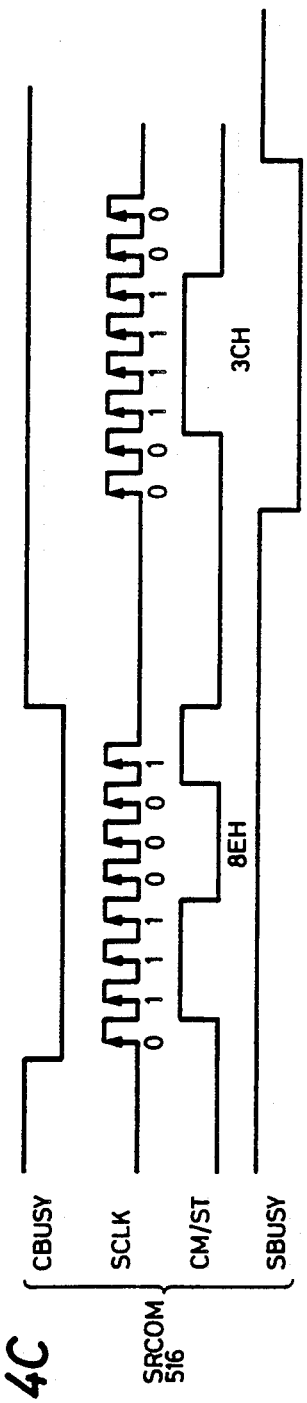
FIG. 4C is a timing chart showing timings of signals carried by a signal line SRCOM.

FIG. 4A is a timing chart illustrating the timing of transmission of signals constituting a four-color image, in accordance with the signals ITOP and HSYNC. A signal ITOP 511 is produced once per each rotation or every other rotations of the transfer drum 716. More specifically, an yellow image, a magenta image, a cyan image and a black image are delivered from the reader unit 1 to the printer unit 2 in the periods ①, ②, ③ and ④, respectively, whereby the four color images are superposed so as to form a full color image on the transfer paper. Assuming here that the original image of A-3 (420 mm long) is to be read at a density of 16 pel/mm in the direction of feed, the horizontal synchronizing signal HSYNC is produced 6720 times (420×16=6720). The signal HSYNC also is delivered to the clock input of a timer circuit 28 in the controller circuit 13. When a predetermined number of signals HSYNC has been counted, an interruption HINT 517 is delivered to the CPU 22. The CPU 22 conducts various controls of image such as extraction or shift of image in the direction of feed, in response to the interruption HINT 517.

Video Processing Unit

A detailed description will be made hereinunder as to the video processing unit 12, with specific reference to FIG. 5. As the first step, the original is illuminated by the exposure lamp 10 (see FIGS. 1 and 2) and the light reflected from the original is read in a color-separated manner by the color reading sensor 6 in the scanning unit 11. The output from the color reading sensor 6 is amplified by the amplifier circuit 42 to a predetermined level. A reference numeral 41 designates a CCD driver adapted to supply a pulse signal for driving the color reading sensor 6. The original pulses for forming this pulse signal are generated by a system control pulse generator 57.

FIGS. 6A and 6B show, respectively, the color reading sensor and the driving pulses, respectively. Referring first to FIG. 6, the color reading sensor used in this embodiment has five sensor elements or chips 58 to 62 arranged in a staggered manner such that each sensor chip reads corresponding one of five sections which are formed by sectioning the original image in the direction of the main scan. Each sensor chip has 976 pixels, each pixel having a length of 62.5 $\mu$m (1/16 mm). Since each pixel is divided into three regions corresponding to G, B and R, the total number of effective pixels is given by $976 \times 3 = 2928$. The sensor chips 58 to 82 are formed on a common substrate in such a staggered manner that the first, third and fifth sensor chips 58, 60 and 62 are positioned on a line LA, while the second and fourth sensor elements 59, 61 are disposed on a line LB which is offset from the line LA by an amount corresponding to four scanning lines (62.5$\mu$m $\times$ 4 = 250 $\mu$m) in the direction of the sub-scan which is conducted in the direction of an arrow AL in FIG. 6A. In operation, the first, third and fifth sensor chips 58, 60 and 62 are driven by a group of driving pulses ODRV 518 in synchronization with one another, while the second and fourth sensor elements 59, 61 are driven by another group of driving pulses EDRV 519. As will be seen from FIG. 6B, the driving pulse group ODRV 518 includes pulses O01A, O01A, O02A and ORS which are charge transfer clocks and charge reset pulse for each sensor chip of this group. Similarly, the driving pulse group EDRV 518 includes pulses E01A, E02A and ERS which are charge transfer clocks and charge reset pulse for each sensor chip of this group. In order to eliminate any mutual interference and noise between the first group of sensor chips including first, third and fifth sensor chips and the second group including the second and fourth sensor chips, the above-mentioned clock and reset pulses are produced in a substantially perfect synchronism so as to exclude any jitter.

Figure 5:
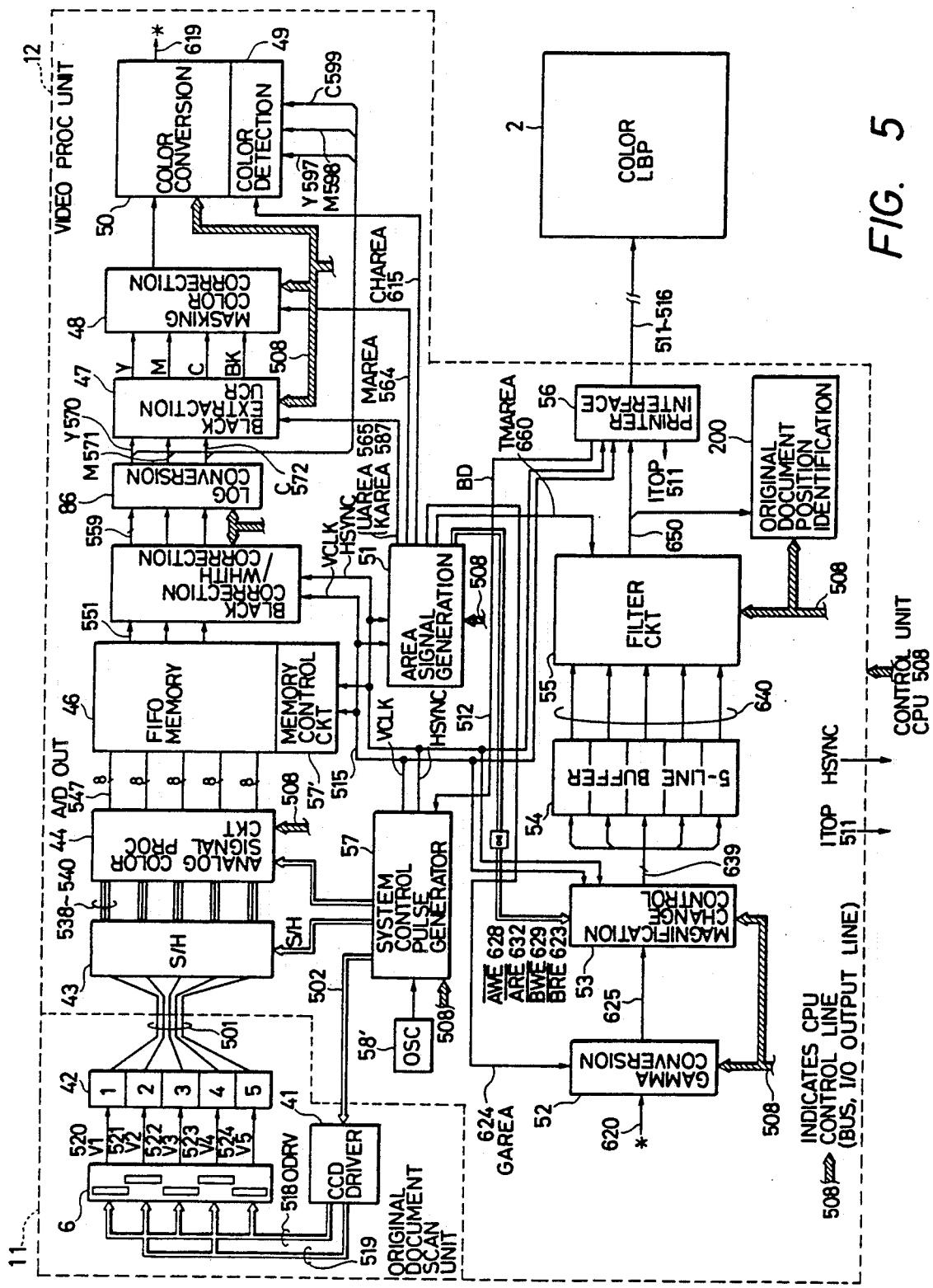
FIG. 5 is a circuit diagram showing the detail of the video processing unit shown in FIG. 2.
Figure 7A:
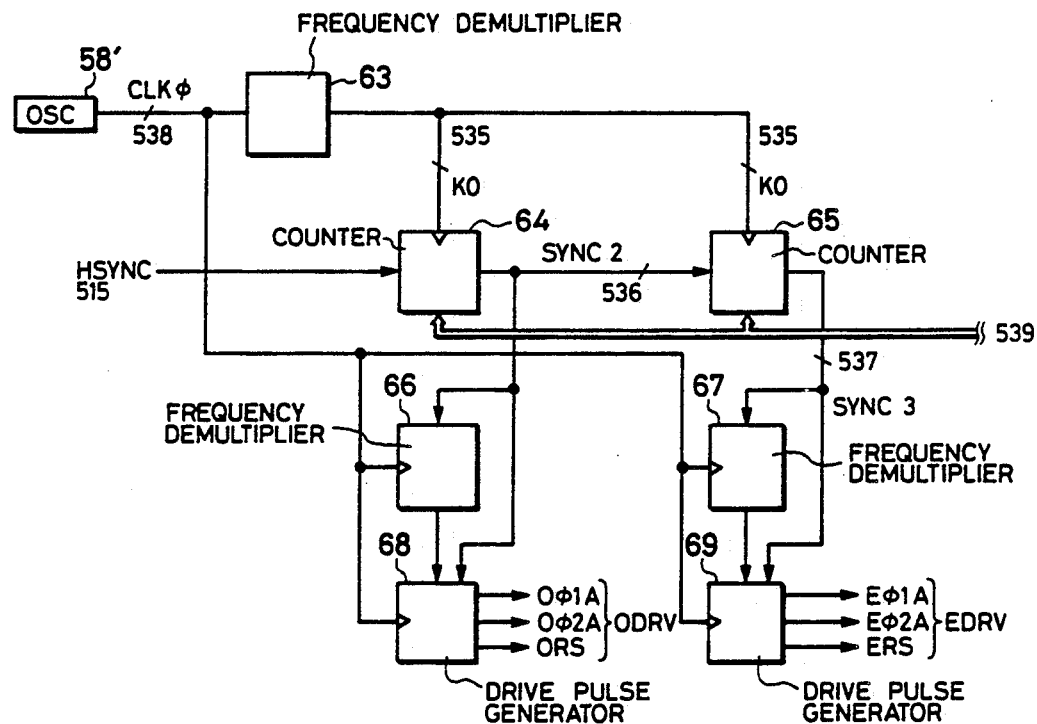
FIG. 7A is an illustration of a CCD driving signal generating circuit in a system control pulse generator circuit 57.
Figure 7B:
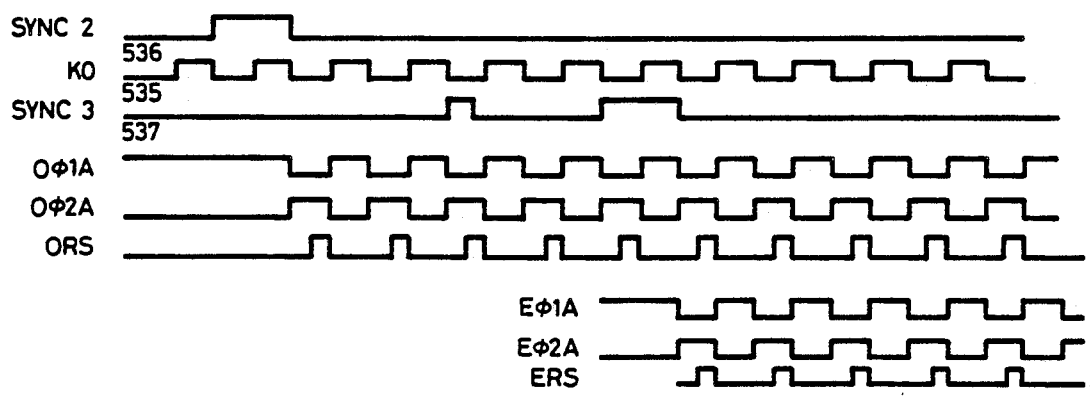
FIG. 7B is a timing chart illustrating timings of signals obtained at different portions of the circuit shown in FIG. 7A.

These pulses therefore can be produced by a common oscillation source OSC 58' (see FIG. 5). FIG. 7A is a block diagram of the circuit for generating the driving pulse groups ODRV 518 and EDRV 519, while FIG. 7B is a timing chart illustrating the operation of this circuit. This circuit is included by the system control pulse generator 57 shown in FIG. 5. The single oscillation source OSC 58' produces original clocks CLKO which are demultiplied to provide clocks KO 535 which are used as clocks for generating reference signals SYNC2 and SYNC3 which in turn are used in the determination of timings of generation of the driving pulse groups ODRV and EDRV. The timings of generation reference signals SYNC2 and SYNC3 are determined by values which are set in pre-settable counters 64 and 65 through a signal line 539 connected to the CPU BUS. These reference signals SYNC2 and SYNC3 are used for initializing demultipliers 66, 67 and the driving pulse generating portions 68, 69. Thus, the pulses of groups ODRV 518 and EDRV 519 are generated in synchronization without any jitter, because they are produced in accordance with synchronous clocks formed by demultiplying the original clock CLKO produced by a single oscillation source OSC in accordance with the horizontal synchronizing signal HSYNC input to this block, whereby any disturbance of signals attributable to interference between the sensor chips is eliminated. The sensor driving pulses ODVR 518 and EDRV 519 are respectively supplied to the odd-number sensor chips, i.e., the first, third and fifth sensor chips, and to the even-number sensor chips, i.e., the second and fourth sensor chips. In response to these driving pulses, the sensor chips 58, 59, 60, 61 and 62 independently produce video signals V1 to V5 in synchronization with the driving pulses. These video signals V1 to V5 are amplified to predetermined voltage levels by amplifier circuits 42 which are provided independently for the respective channels, and are input to the video processing unit through a coaxial cable 501 (see FIG. 1). More specifically, the video signals V1, V3 and V5 are input at a timing of OOS 529, while the video signals V2 and V4 are input at a timing of EOS 534.

Figure 8B:
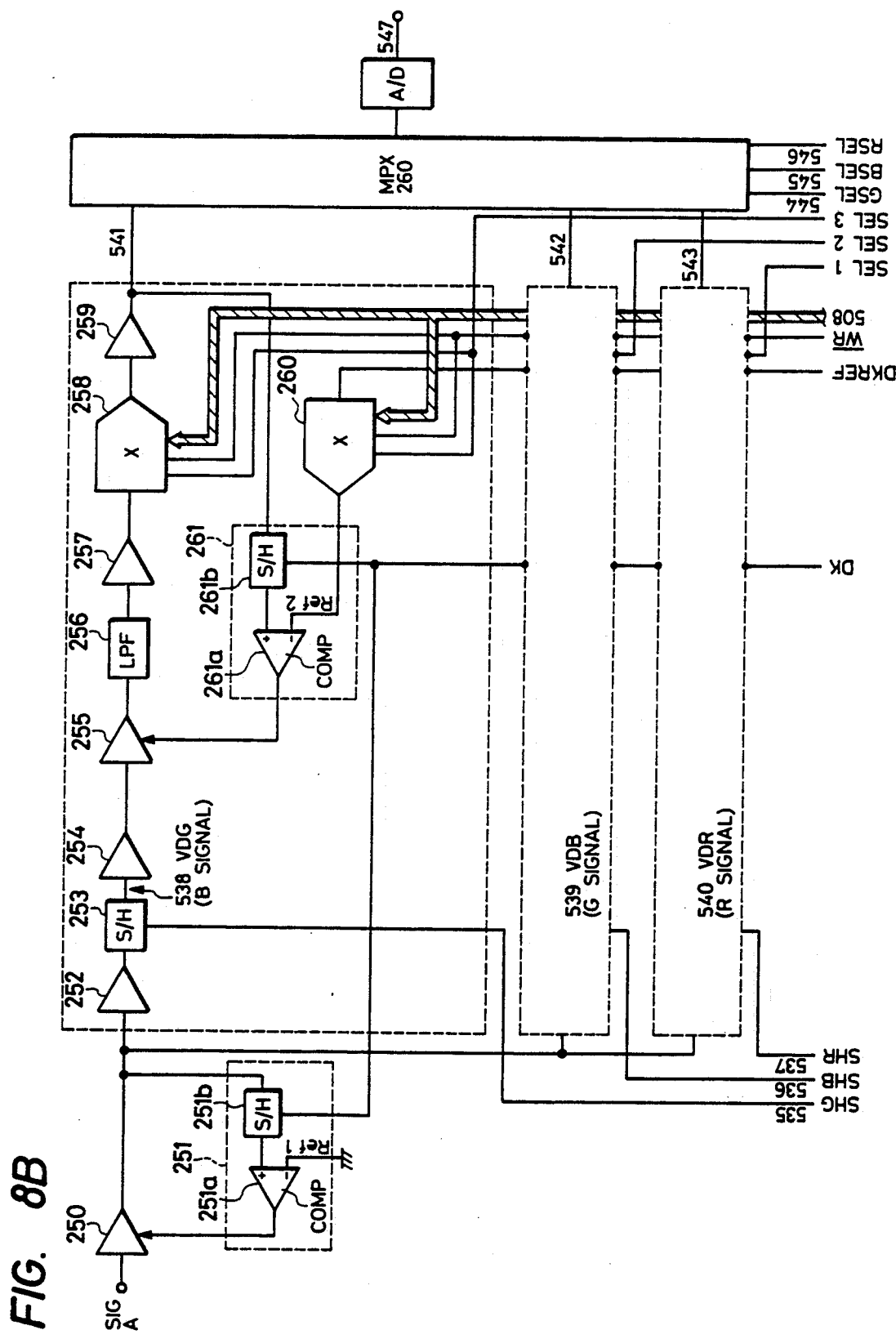
FIG. 8B is a circuit diagram showing the detail of one CCD channel in the block shown in FIG. 8A.

Thus, color image signals corresponding to the five sections of the original in the direction of main scan are read and input to the video processing unit 12. The thus formed color image signals are color-separated into three color components of G (green), B (blue) and R (red) by means of the sample hold circuit S/H 43. Thus, 15 ($3 \times 5 = 15$) signal processing systems are required for processing the image signals after the sample hold S/H. The construction and operation of the sample hold circuit S/H 43 will be explained later in more detail. As will be explained also with reference to FIG. 8B, the color image signals of the respective channels after the sample-hold processings are input to the A/D conversion circuit subsequently to amplification. The video signals input to the A/D conversion circuit are multiplexed to become digital data A/Dout. The timing of generation of the digital data Dout is shown in FIG. 8C, while FIGS. 8A and 8B show processing blocks.

The analog color video signals produced by the 5-chip real-size color sensor are input to the analog color signal processing circuits which are provided, as shown in FIG. 8A, for the respective channels. Since the circuits A to E of the respective channels have the same construction, the construction and operation of the circuit A will be explained by way of example, with reference to FIG. 8A showing the processing block diagram and FIG. 8C showing the timing chart.

Figure 8C:
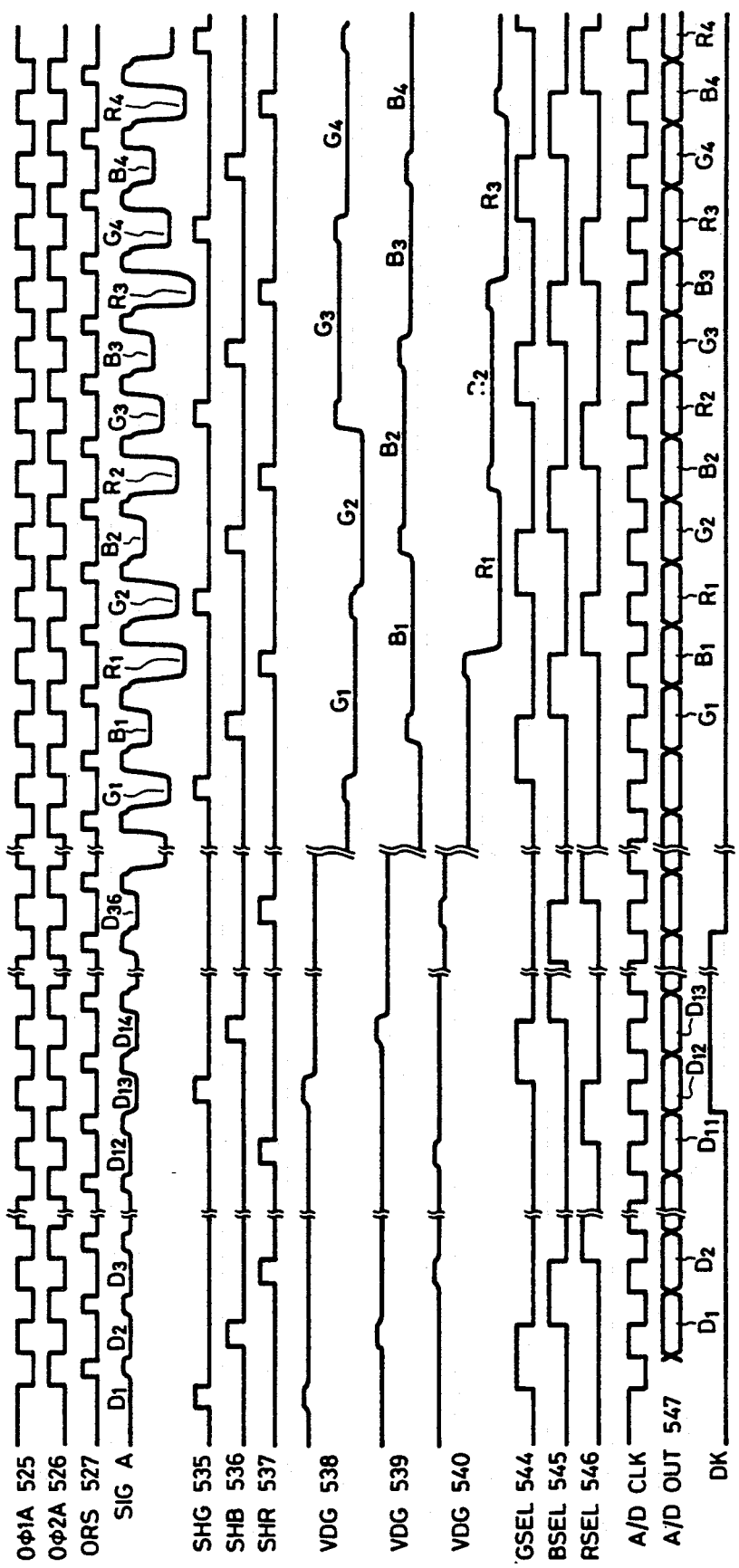
FIG. 8C is a timing charts showing the timings of signals in various portions of the blocks shown in FIGS. 8A and 8B.

Referring first to FIG. 8C, the analog color video signal SiG A includes G, B and R components which appear in the mentioned sequence. As will be seen from FIG. 8D, the analog color video signal is a composite signal which includes, in advance of the 3072 effective pixels, a vacant transport portion which is not connected to the photodiode of the color sensor and constituted by 12 pixels, a dark shielded by Al on the photodiode, and, after the effective pixels, 24 dummy pixels. Thus, the analog color video signal SiG A includes 3156 pixels in total.

The composite analog color video signal SiG A is input to the amplifier 250 and is amplified to a predetermined signal output level. At the same time, the component of this composite signal, which causes the DC level of this signal to oscillate in an AC-like manner, is removed. Then, a zero-level clamp is effected by the feedback clamp circuit 251 in order to fix the DC level of the signal SiG A at a level optimum for the operation of the amplifier 250. The feedback clamp circuit 251 is constituted by a sample hold circuit S/H 251b and a comparator amplifier 251a. In operation, the output level of the dark output portion (optical black) of the analog color video signal SiG A from the amplifier 250 is detected by the sample hold circuit S/H 215b and is compared by the comparator amplifier 251a with a reference voltage Ref 1 (Ref 1=GND in the described embodiment) which is received by the minus input of the comparator amplifier 251a. The difference determined through the comparison is fedback to the amplifier 250 so that the level of the dark output portion of the output from the amplifier 250 is always fixed at the level of the reference voltage Ref 1. A signal DK represents the length of the dark output portion of the analog color video signal SiG A. This signal is delivered to the sample hold circuit S/H 251b so that the DC level of the dark output portion of the signal SiG A is detected once per each period of horizontal scanning.

The output of the amplifier 250 is color-separated into G, B and R by the sample hold circuit S/H 43 and is amplified so as to suit to the dynamic range of the A/D conversion circuit. Since the same process is conducted for all color video signals, the process conducted on the B signal will be explained by way of example. Thus, the same process is conducted for the G and R signals. The composite output signal from the amplifier 250 is delivered through a buffer circuit 252 to the sample hold circuit S/H 253 which operates to sample only the pixel outputs corresponding to the B signals of the composite signal. The thus color-separated B signal 538 is input to a low-pass filter(LPG) 256 after amplification through amplifiers 254, 255. The low-pass filter 256 removes a component of frequency of the sampling pulse from the S/H output signal derived from the S/H circuit 253, whereby only the variance of the sampled S/H output signal is extracted. Representing the driving frequency of the CCD by fD, therefore, each color signal sampled by the sample hold circuit S/H 253 is a discrete signal having a frequency of fD/3. It is thus possible to obtain the above-described effect by using, as the filter 256, a nyquist filter having a cut-off frequency of $fc = (fD/3) \times \frac{1}{2} = fD/6$. It is thus possible to extract only the variance of the signal and to reduce the frequency band width of the subsequent signal processing systems.

Figure 8E:
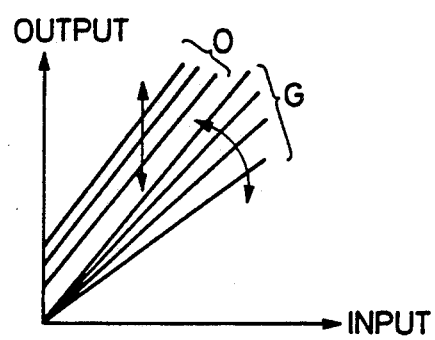
FIG. 8E is an illustration of input/output conversion characteristics.
Figure 52A:
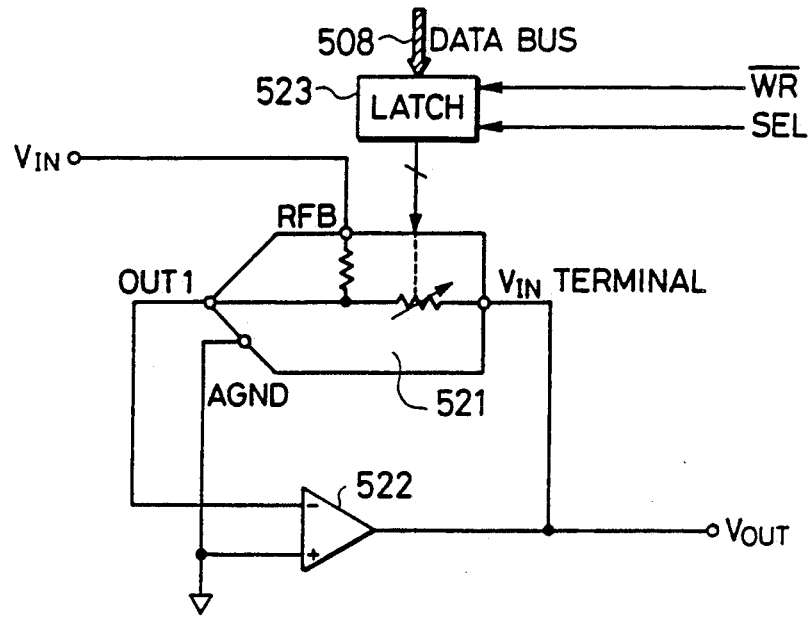
FIG. 52A is a circuit diagram showing the circuit of a multiplier 258 in the circuit shown in FIG. 8B.

As described, the low-pass filter 256 outputs a color signal of each color which contains only the signal component. This color signal is then processed through an amplifier 257, a white-correction multiplier 258 and a buffer amplifier 259 under the control of the CPU, whereby the gain of the signal is controlled as shown by G in FIG. 8E. The color signal of each color after the gain control is then clamped at any desired DC level by a feedback clamp system which is constituted by a black-level correction multiplier 260 and a feedback clamp circuit 261. The operation of this feedback clamp system is identical to that of the feedback clamp circuit 251. As will be seen from FIG. 52A, in this embodiment, the multiplier 258 is a multiplying DAC (D/A converter) which is constituted by a multiplying DAC 251, operation amplifier 522 and a latch 523, and is adapted to produce an output Vout which is given as $Vout = -V\ IN/N\ (0 < N < 1)$, where, N represents a binary fractional value of the input digital code. The function of a basic multiplying DAC circuit is similar to that of an analog potentiometer which is unloaded by an operation amplifier. In other words, this circuit is a voltage follower constituted by a feedback circuit and a trim circuit (variable resistor circuit) connected to the feedback circuit, the resistance value of the trim circuit being variable in accordance with data from the data BUS 508. Therefore, in a channel connecting correction which will be explained later, the image data produced by the scanning unit upon reading a white board is amplified to a level which is determined by the digital data set in an internal latch 523 through the data BUS of the CPU 22. FIG. 52B shows the relationship between this digital data and the gain of the multiplier 258. The latch 523 constitutes the I/O of the CPU 22. Setting of data in this latch is performed through the control lines WR and SEL.

A description will be made hereinunder as to the feedback clamp system constituted by the feedback clamp circuit 261. This feedback clamp system has a construction which is substantially the same as the feedback clamp circuit of the preceding stage. More specifically, the sole point of difference resides in that, in the feedback clamp system, the multiplier 260 controlled by the CPU is connected as the reference voltage Ref 2 of the feedback clamp circuit constituted by the sample hold circuit 261b and the comparator amplifier 261a. This arrangement is adopted for the purpose of enabling the color signals amplified through the amplifier 257, multiplier 258 and the buffer amplifier 259 to be clamped at the level of the reference voltage Ref 2 which is varied by the multiplier 260 in accordance with the level determined by the digital data set in the internal latch 537 through the data BUS 508 of the CPU 22, for the purpose of shifting the level of a black level signal which is produced by reading a black board in the channel connecting correction which will be explained later. This corresponds to the process 0 shown in FIG. 8A. The latch 537 is allocated as an I/O of the CPU 22, and setting of data therein is conducted through control lines WR and SEL.

As will be seen from FIG. 53A, the multiplier 260 is a four-quadrant mode multiplier composed of a multiplying DAC 531, operation amplifiers 532, 533, resistors 534, 535 having a resistance value R and a resistor 536 having a resistance value 2R. The multiplier 260 produces, as shown in FIG. 53B, a bi-polar voltage output in accordance with the 6-bit digital data which is set in the internal latch 537 by the CPU.

Thus, the color signals 541(G), 542(B) and 543(R) are gain-controlled and then clamped such that their black levels are set at a predetermined level. These color signals are then multiplexed into a single system signal by an MPX 260 in accordance with multiplex pulses GSEL, BSEL and RSEL (544 to 546), and the thus-formed single system signal is input into an A/D converter 45 so as to be converted into a digital signal in accordance with A/D clock 547, whereby digital data AGOUT 548 is obtained as the output. Representing the reference voltage of the A/D converter 45 by Vref, since the resolution of the A/D conversion is 8 bits, the A/D conversion is conducted under the condition of 1 LSB=Vref/$2^8$. According to this arrangement, the A/D conversion is conducted after the multiplexing operation performed by the MPX 260. Thus, five A/D converters each having three systems for three colors are used, and, hence, 15 signal processing system in total are employed. The described arrangement is adopted also for other circuits B to E in FIG. 8A.

Construction and Operation of FiFo Memory

Figure 9A:
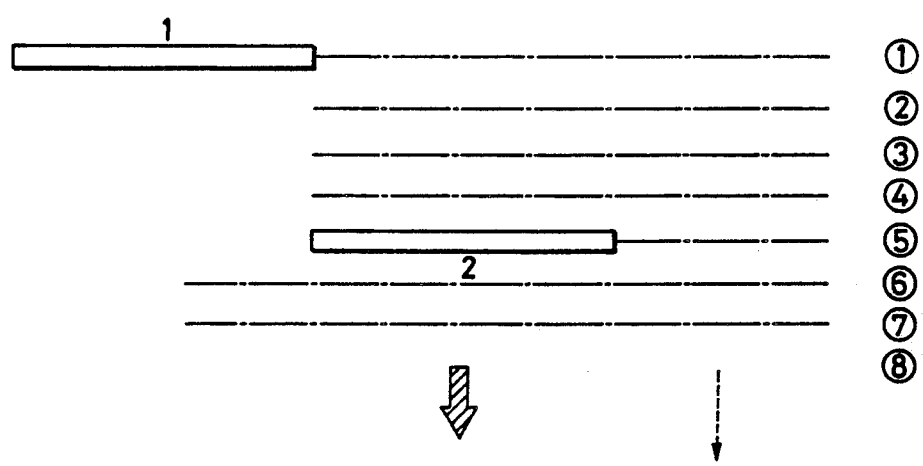
FIGS. 9A, 9B, 9C and 9D are illustrations of the manner in which line signals are obtained through staggered sensor elements.
Figure 9B:
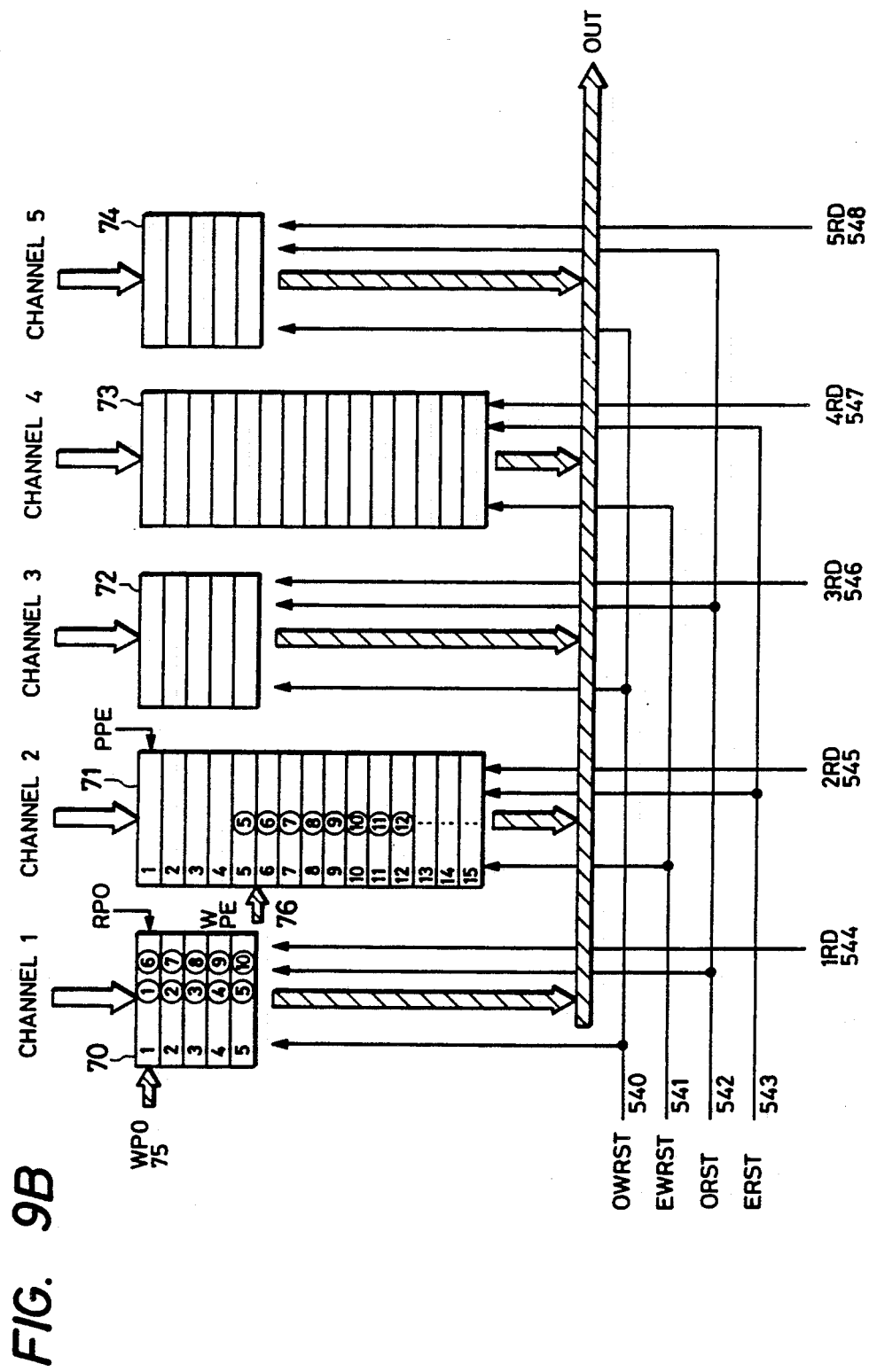

As will be understood from the foregoing description, in this embodiment of the present invention, the image of the original is read by a sensor which has five sensor chips which correspond to five sections of the original in the direction of the main scan and which are arranged in a staggered manner with an offset corresponding to four lines of main scan (62.5 μm×4=250 μm) in the direction of the sub-scan. In consequence, the leading channels constituted by the sensor chips 2,4 and the trailing channels 1,3,5 read different portions of the original image which are offset from each other in the direction of the main scan. In order to properly connect the data read by these two groups of channels, this embodiment of the invention employs a memory device capable of storing data corresponding to a plurality of lines. The construction of this memory device is shown in FIG. 9B. Namely, the memory device has a FiFo-type arrangement constituted by memories 70 to 74 each storing data corresponding to a plurality of lines. More specifically, the memories 70, 72 and 74 are capable of storing data corresponding to five lines each of which includes 1024 pixels, while memories 71 and 73 are capable of storing data corresponding to 15 lines. Writing of data is conducted in a line-by-line fashion from a point indicated by a last pointer WPO 75 and WPE 76. After writing of one-line data, the content of the line pointer WPO or WPE is incremented by +1. The line pointer WPO 75 is used commonly for the odd-number channels 1,3,5, while WPE 76 is used commonly for the even-number channels 2,4.

Figure 9C:
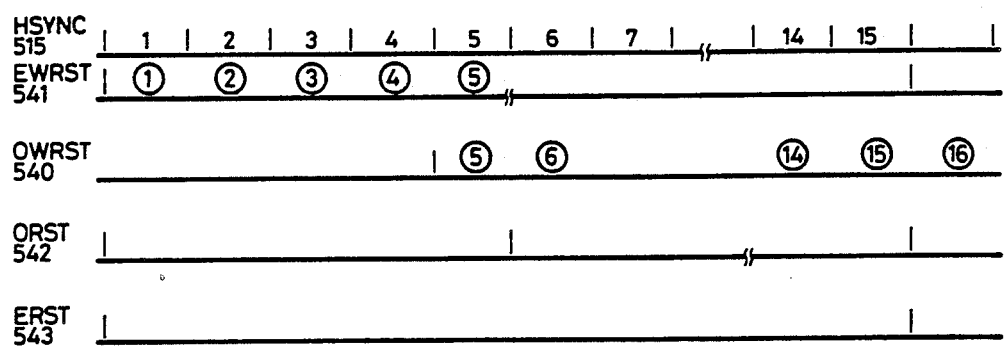
Figure 9D:
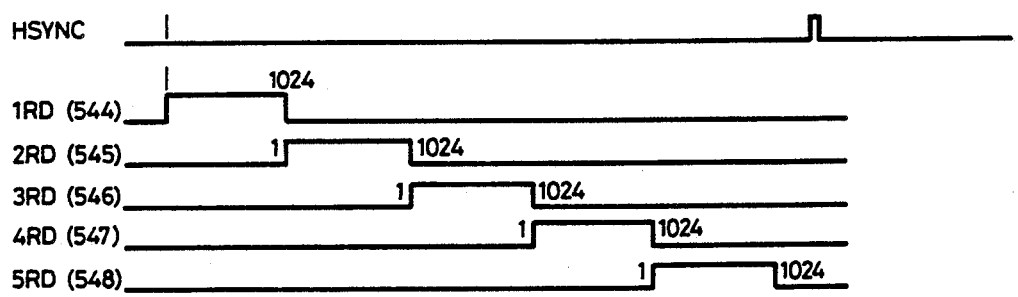

The values of the line pointers WPO 75 and WPE 76 are initialized to the starting values by signals OWRST 540 and EWRST 541. ORST 542 and ERST 543 are signals for initializing the read pointer to starting value. A description will be made as to the channels 1 and 2 by way of example. As will be seen from FIG. 9A, the channel 2 is ahead of the channel 1 by an amount corresponding to four lines. Therefore, the timing of reading of a line, e.g., line ⑤, by the channel 1 is delayed by a period corresponding to four scanning lines after the timing of reading of the same line ⑤ by the channel 2. It will be understood that, by putting the writing pointer WPE ahead of the writing pointer WPO by an amount corresponding to four scanning lines and then reading the content of the FiFo memory at the same timing, data concerning the same line are obtained from the channels 1,3,5 and the channels 2,4, whereby the offset of the sensor chips in the direction of the sub-scan is compensated. For instance, referring to FIG. 9B, the writing pointer WPO points the first line 1 for the channel 1, while the writing pointer WPE for the channel 2 points the fifth line 5. As the scanning is conducted from this state, the pointer WPE points 9 when 5 is pointed by the pointer WPO, and the data of the line ⑤ of the original is written on the regions of the memories corresponding to the pointer value 5 in each memory. Then, reading operation is conducted cyclically while advancing the read pointers PRO and PRE in the same manner. FIG. 9C is a timing chart for conducting the above-described control. The image data is delivered in a line-by-line fashion in synchronization with the synchronizing signal HSYNC. Signals EWRST 541 and OWRST 540 are generated with an offset of four lines from each other as illustrated. The signal ORST 542 is produced at an interval corresponding to the capacity of each FiFo memory 70, 72, 74, i.e., for every five scanning lines. Similarly, the signal ORST 542 is produced at an interval corresponding to the capacity of each FiFo memory 71, 73 i.e., for every fifteen scanning lines. The reading is commenced with the reading of one-line data from the channel 1 at a speed which is five time as high as the writing speed, followed by reading from the channel 2, channel 3, channel 4 and channel 5, whereby the signals read from the successive channels 1 to 5 are connected in series within the period of one horizontal synchronizing signal HSYNC. Referring to FIG. 9D, IRD to 5RD (544–548) are signals which represent valid regions of reading operation from the respective channels. The described control for connecting the video signals from the successive channels by means of the FiFo memory is conducted by a control signal which is produced in a memory control circuit 57' shown in FIG. 5. The circuit 57' is composed of a discrete circuit such as a TTL. Detailed description of this circuit is omitted because this circuit does not constitute any critical portion of the present invention. The memory mentioned before has three color components: namely, a blue component, a green component and a red component, although the description has been made with respect to one color component. It will be understood that the same arrangement is adopted for other color components of the memory.

Constructions and Operations of Black and White Level Correction Circuits

Figure 10A:
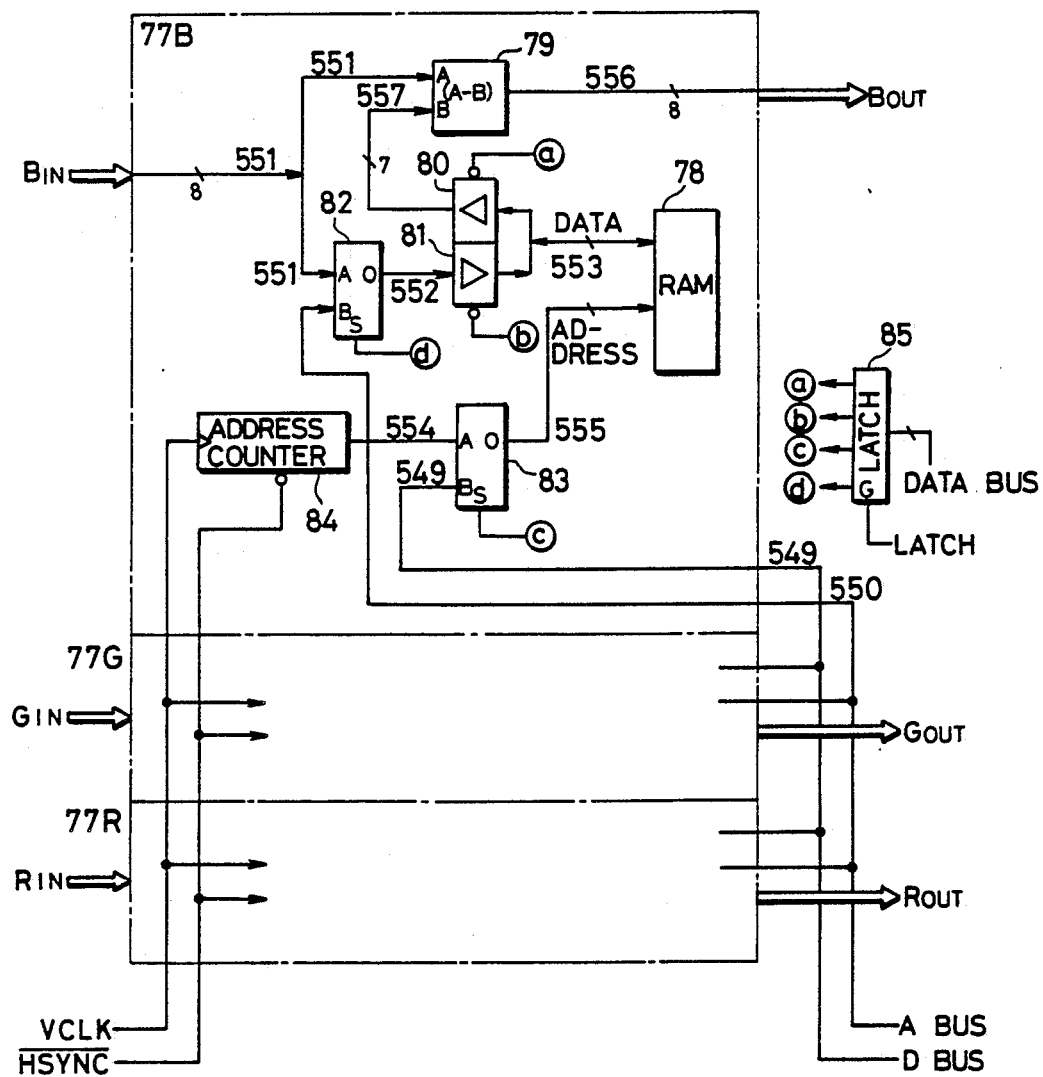
FIG. 10A is a circuit diagram showing the construction of a black level correction circuit.
Figure 10B:
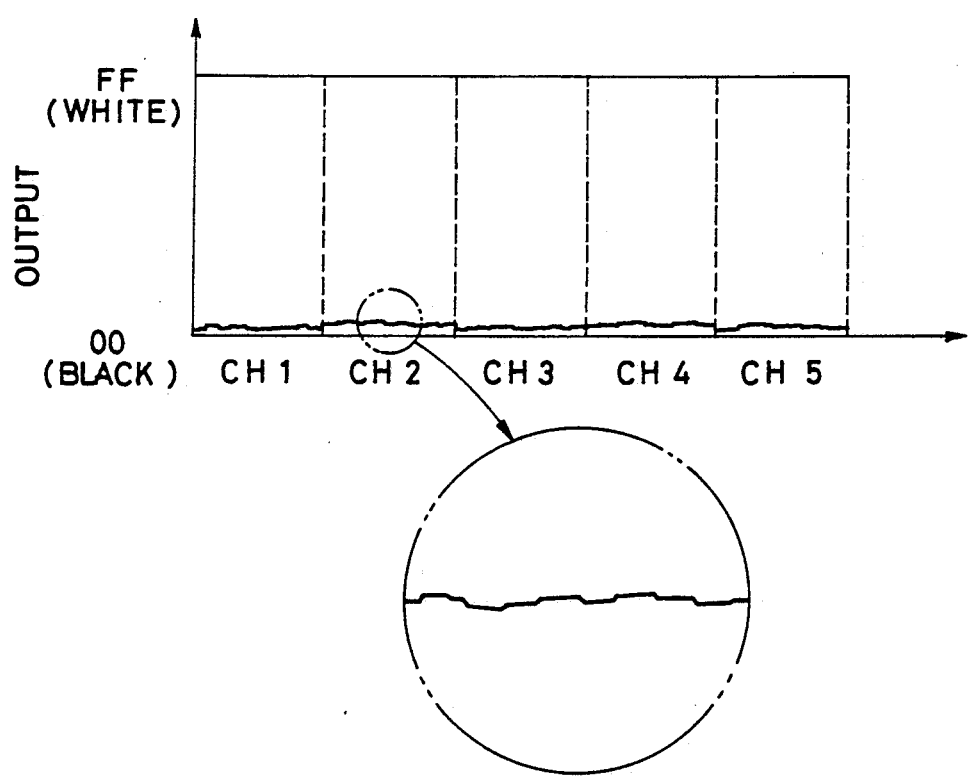
FIGS. 10B, 10C and 10D are illustrations of the manner in which the black level correction is effected.

FIG. 10A shows a black level correction circuit. When the quantity of light received by the sensor is small, the black level outputs from the channels 1 to 5 exhibit large fluctuation between chips and between pixels, as shown in FIG. 10B. If these outputs are directly used in the production of the output image, defects such as scores or local darkening is formed in the data area of the image. Such scores are generated in the regions of high density so that they are particularly noticeable due to visual characteristics of the human eyes, even if these scores are slight. It is therefore necessary to conduct the dark correction so as to compensate for the influence of the fluctuation in the black output. In the described embodiment, this correction is conducted by the black level correction circuit which will be explained hereinunder with reference to FIG. 10A. In advance of the copying operation, the original scanning unit is moved to the position of a black board (see FIG. 9) which is provided on the leading end of the original table and which has a uniform density of black color. Then, the halogen lamp is turned on so that the black level video signal is input to the black level correction circuit. More specifically, in order that a black level video signal corresponding to one scanning line is stored in a black level RAM 78, a selector 82 operates to select A ⓓ, white a gate 80 is closed ⓐ and a gate 81 is opened. In consequence, the data line 551 is connected to data line 553 through data line 552. On the other hand, a signal ⓒ is output so that the output of the address counter 84, which is initialized by HSYNC, is received by the address input of the RAM, whereby the black level signal corresponding to one scanning line is stored in the RAM 78. This mode of operation for storing the black level signal will be referred to as "black reference value pickup mode" hereinafter.

Figure 10C:
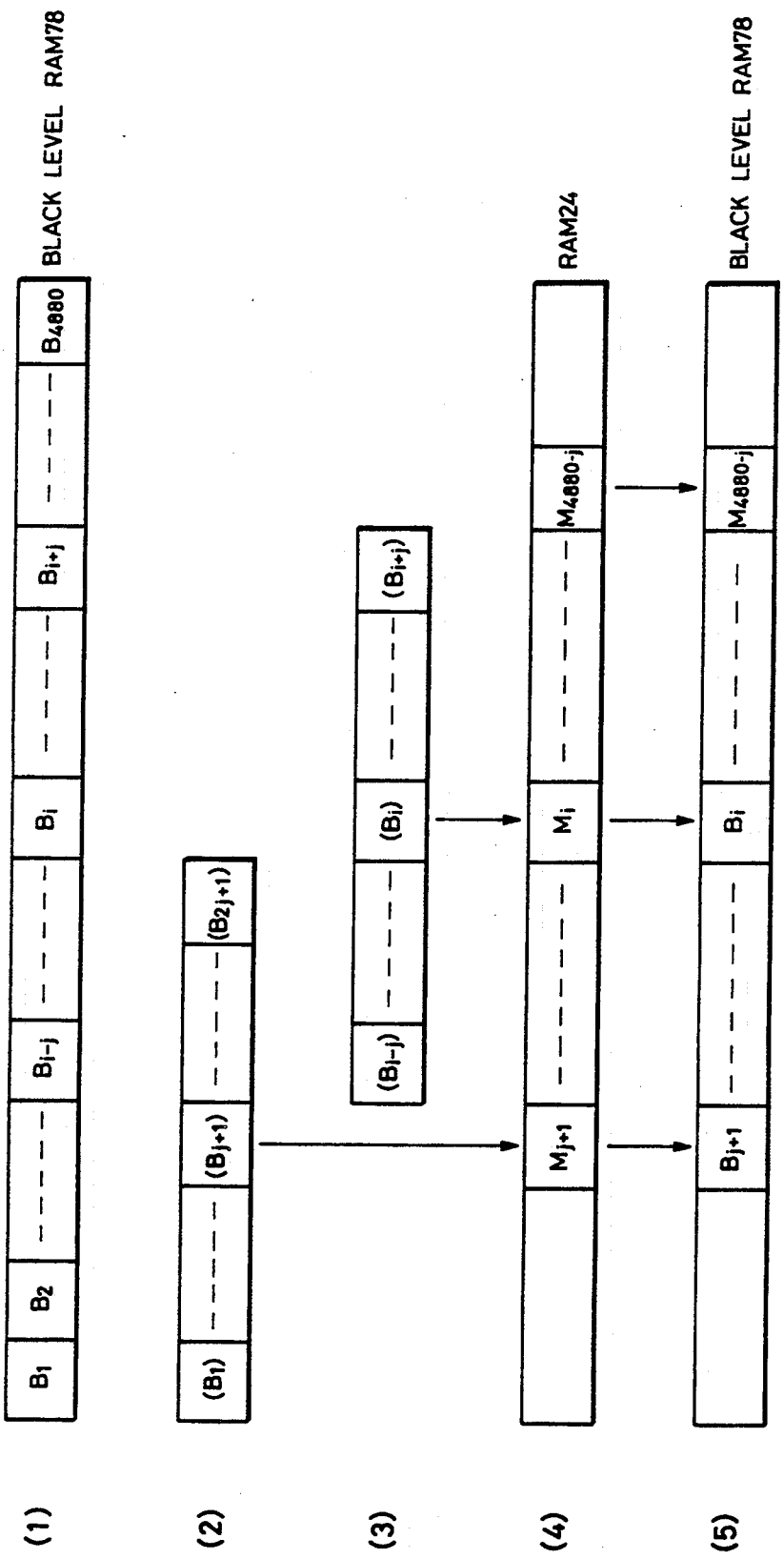
Figure 10D:
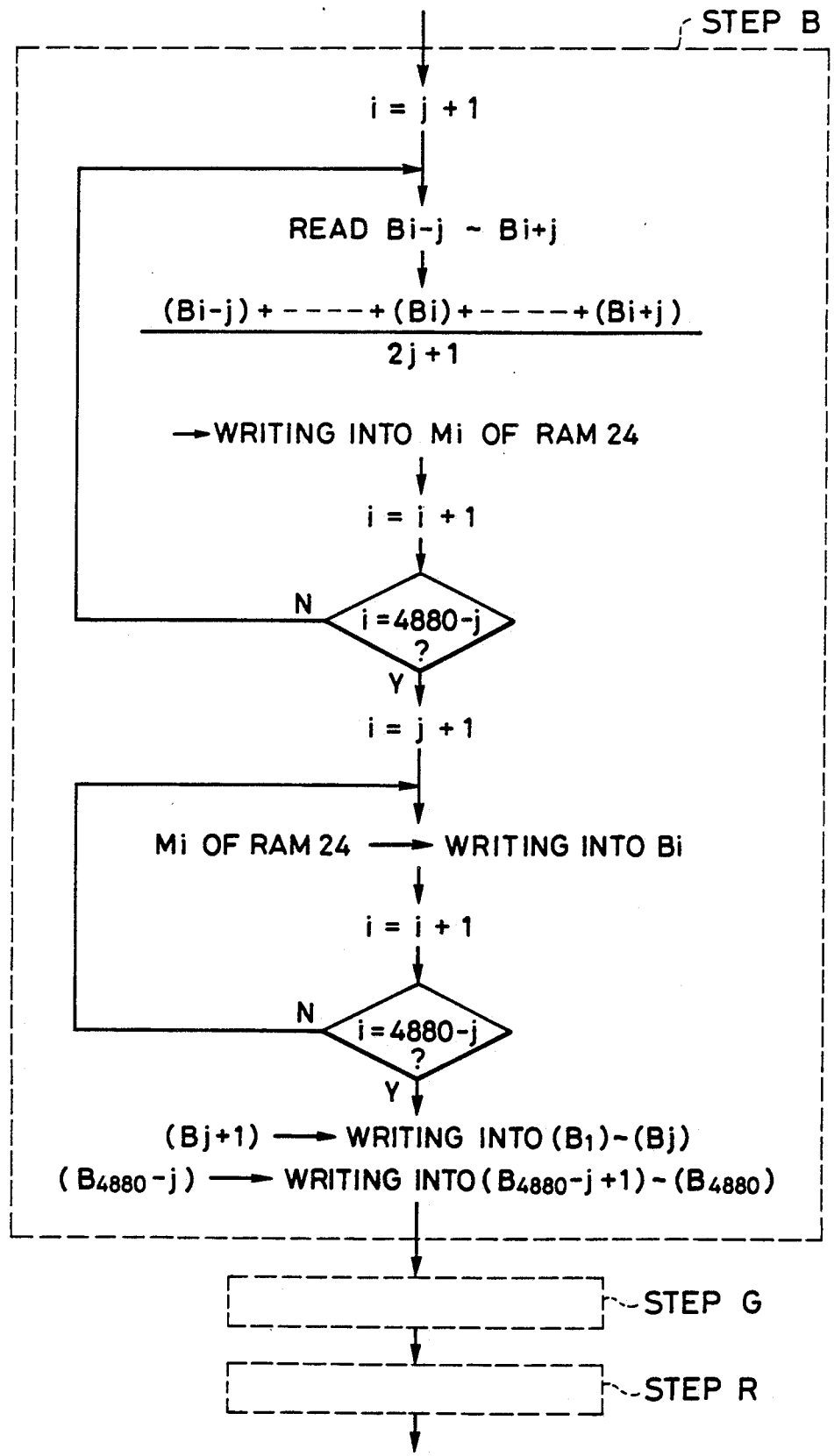

The amplitude of the thus picked-up black level data is extremely small so that it tends to be largely affected by noises which are introduced through various lines from the exterior or through radiation. The use of the thus picked-up black level data is not preferred because it causes the black image to be coarsened by the noises. To overcome this problem, the black level data stored in the RAM 78 as shown in FIG. 10C is subjected to a computation which is conducted in accordance with a flow chart shown in FIG. 10D, thereby to eliminate the influence of the noises. In FIGS. 10C and 10D, a symbol Bi represents the address in the RAM 78, while (Bi) represents the data contained in the address Bi of the RAM 78. It is assumed here that the original has a length corresponding to the length of an A-4 size paper in the direction of main scan. Thus, provided that the pitch of the pixel is 16 pel/mm, it is necessary to use 4752 pixels/color (16×297 mm=4752). In order to cover this length of the original, five CCD chips each being 61 mm long are arranged to form a linear sensor. Thus, the total number of pixels used is 4880 pixels/color (16×61×5=80). This means that the suffix i of the address Bi can take one of the values from 1 to 4880.

Referring to FIG. 10C, the CPU 22 opens the gate 80 and closes the gate 81 for the latch 85 and ⓐ, ⓑ, ⓒ and ⓓ and selects the selectors 82, 83 so that the black level data in the region between the addresses $B_{i-j}$ to $B_{i+j}$ of the black level RAM 78 shown in (1) of FIG. 10C is accessed and read into the work register (RAM 24) of the CPU 22 as shown in (3) in FIG. 10C. Then, the black level data $(B_{i-j})$ to $(B_{i+j})$ in the region between the addresses $B_{i-j}$ and $B_{i+j}$ are added and the sum is divided by the data number $2_{j+1}$ so as to be written in the address $M_i$ of the working RAM 24 as the value of the central pixel $B_i$. Similar computations are performed from $\{(B_1)+\ldots+(B_{j+1})+\ldots+(B_{2j+1})\}=(M_{j+1})$ to $\{(B_{4880-2j})+\ldots+(B_{4880-j})+\ldots+(B_{4880})\}=(M_{4880-j})$. In consequence, the data carried by the central pixel $B_i$ is written in the RAM 24 as the mean value of the data carried by the adjacent pixels $B_{i-j}$ to $B_{i+j}$, as shown in (4) in FIG. 10C. Finally, data corresponding to $i=j+1$ is written for the region from $i=1$ to $i=j$, and data corresponding to $i=4880-j$ is written for the region from $i=4880-j+1$ to $i=4880$. The pixels of addresses from $i=1$ to $i=j$ and the pixels of addresses from $i=4880-j+1$ to $i=4880$ are within the invalid regions which are on both ends of the sensor. (In the illustrated embodiment, j is assumed to be j=4880.) Then, data in the region between the addresses $M_{j+1}$ and $M_{4880-j}$ in the RAM 24 is written again in the region between addresses $B_{j+1}$ and $M_{4800-j}$ of the black level RAM 78, whereby black level data devoid of any noise is set.

After completion of the described operation for the blue component in Step B of FIG. 10D, similar computations are executed for the G signal representing the green component and for the R signal representing the red component, in Steps G and R, respectively. Although in the described embodiment the black level data is determined as a simple mean value of data carried by the central pixel and adjacent pixels without giving any weight, this is only illustrative and the black level data may be determined by introducing a concept of weight by multiplying the data of the respective pixels with different coefficients.

During reading of the image, the memory RAM 78 operates in data reading mode, so that the data is read from the RAM 78 in a line-by-line and pixel-by-pixel fashions and input to the B input of the subtractor 79 through data lines 553 and 557. Namely, in this mode, the gate 81 is closed ⓑ while the gate 80 is opened ⓐ. Therefore, in case of the blue signal for example, the black level correction circuit output 556 is determined, when the black level data DK(i) is given, as Bin(i)−DK(i)=Bout (i). Similar controls are performed for the green signal Gin and red signal Rin, by means of 77G and 77R. In order to execute the described operation, the control lines of the ⓐ, ⓑ, ⓒ and ⓓ of the respective selector gates are controlled by the CPU 22 (see FIG. 2) by means of the latch 85 which serves as an I/O of the CPU 22.

A description will be made hereinunder as to the white level correction (shading correction), with reference to FIG. 11-1. The white level correction is executed in accordance with white color data which is obtained by moving the scanning unit to the position of a white board of a uniform white color and illuminating this white board. The basic circuit arrangement for this correction is shown in FIG. 11-1A. This circuit arrangement is basically the same as that of the circuit shown in FIG. 10A, except that the white level correction employs a multiplier 79' in place of the subtractor 79 used in the black level correction. Other portions are materially the same so that detailed description thereof is omitted. The white level correction is conducted as follows. When the original scanning unit is stationed on the position of the uniform white board, i.e., when the unit is on the home position before commencing the copying or reading operation, the exposure lamp is lit on so that the video data of uniform white level is stored in a one line correction RAM 78'. For instance, when the original has a length corresponding to the length of an A-4 size paper in the direction of the main scan, 4752 pixels (16×297 mm=4752) are required provided that the pixel pitch is 16 pel/mm. This requirement is met by the use of five CCD sensor chips each having 976 pixels, because these five CCD sensor chips provide 976×5=4880 pixels in total. Thus, the RAM has at least 4880 bytes. Referring to FIG. 11-1B, representing the white board data of the i-th pixel by $W_i$ (i=1 to 4880), the RAM 78' stores data corresponding to the respective pixels as shown in FIG. 11C. When the white board data Wi is given, the data Do obtained after the correction should satisfy the condition of $D_o = D_i \times FFH/W_i$, with respect to the data of ordinary image read from the same i-th pixel. Therefore, the CPU 22 (see FIG. 2) operates to open the gate 81' while closing the gate 80 for the latch 85' ⓐ', ⓑ', ⓒ' and ⓓ' and and enables the selectors 82', 83' to select B, thereby enabling the CPU to make access to the RAM 78'. Subsequently, computations are executed such as $FFH/W_1$ for the initial pixel $W_1$, $FF/W_2$ for $W_2$ and so forth, thereby effecting substitution of data. When this operation is completed with respect to the blue component in Step B of FIG. 11-1D, similar computations are conducted for green and red components in Steps G and R, successively. Then, the gate 80' is opened ⓐ', while the gate 81' is closed ⓑ' and the selector 83' selects A, so that $D_o = D_i \times FFH/W_i$ is output for the original data $D_i$ which are input successively. The thus read coefficient data $FFH/W_i$ are transmitted through signal lines 553 and 557 and is multiplied with the original image data 551, whereby the product of the coefficient data and the original image data is output.

A description will be made hereinunder as to the channel connecting correction which is conducted for the purpose of ensuring that all the chips 58 to 62 of the color CCD 6 produce signals of the same level when they read the original images of the same density level, with reference to flow charts shown in FIGS. 11-2A and 11-2B. The black level processing of B signal for the channel connecting correction is executed in Step D-B. This operation is commenced with the processing of the black level of the B signal of the first channel CH1. To this end, in Step D-B1, the CPU 22 operates to set $D_1$ (80H in the illustrated embodiment) in the latch 537 (see FIG. 53A) in the multiplier circuit 260 (see FIG. 8B), through the data BUS 508, thereby setting the B signal offset of the first channel CH1 at the reference level, thus setting data for the multiplying D/A 531 (Step 1). In this state, a black level signal obtained through reading of the black board is stored in the black level RAM 78 as in the case of the black level correction explained before (Step 2). The black level data stored in the RAM 78 is shown in FIG. 11-2C. Subsequently, the value i of the content of the counter is initialized to 1, and FFH is set in the minimum value storage temporary memory address $M_1$ of the CPU working RAM 24 (Step 3). Subsequently, the data (Bi) in the black level RAM 78 is compared with the data ($M_1$) in the memory $M_1$. If the value of the data ($B_i$) is smaller than the value of the data ($M_1$), the data ($M_i$) of the address $M_1$ is changed to $B_i$), and this operation is repeated from $Bi=B_1$ to $B_i=B_{976}$, in Steps 4, 5 and 6. Consequently, the minimum value throughout the channel CH1 is stored in the memory $M_1$. Then, a judgment is conducted in Step 7 as to whether the minimum value data in the memory $M_1$ is equal to the reference value $D_2$ (08H in the illustrated embodiment) of the black level. If they are not equal, the process proceeds to Step 8 in which they are compared with each other to determined which one of them is greater. If the minimum value data $M_1$ is smaller than the reference value $D_2$, the process proceeds to Step 9 in which the CPU sets a value $D_{1+a}$ in the latch 537 of the multiplying circuit 260. The process then returns to Step 3 and proceeds to Step 7 in which the judgment is conducted again as to whether the condition of $(M_1)=D_2$ is met. Conversely, if the comparison conducted in Step 8 has proved that the condition of $(M_1)>D_2$ is met, the CPU 22 sets a value $D_{1-a}$ in the latch 537 of the multiplying circuit 260 so as to lower the offset level (Step 10). The process then returns to Step 3 and proceeds again to Step 7 in which the judgment is conducted again as to whether the condition of $(M_1)=D_1$ is met.

As will be seen from the foregoing description, the CPU repeatedly conducts the operation while varying the data $D_1$ by substituting $D_{1+a}$ or $D_{1-a}$ for the data to be input to the multiplying D/A 531 until the condition of $(M_1)=D_1$ is met. When this condition is met, the process proceeds from Step 7 to Step D-B2, in which the value of the content of the counter is initialized to 977 and the processing which is the same as that executed in Step D-B1 for the channel CH1 is conducted for the data from the channel CH2 in the RAM 78, thereby setting the minimum value at $D_2$. Similarly, Steps D-B3, D-B4 and D-B5 are executed to set the minimum values of the data from the channels CH3, CH4 and CH5 at $D_2$. The described process is executed in Steps D-G and D-R for the G and R signals, respectively, for each of the channels CH2, CH3, CH4 and CH5, thereby setting the minimum values of all color data of all channels at $D_2$.

Subsequently, Step W-B is executed for the purpose of white level processings of the B signal in the channel connecting white level processing. First of all, Step W-B1 is conducted for performing the white level processing of the B signal of the first channel CH1. To this end, the CPU 22 operates so as to set a level $D_3$ (AOH in the illustrated embodiment) in the latch 523 of the multiplying circuit 258, through the data S 508, thereby setting the gain of the B signal at a reference level, and so as to set the data of the multiplying D/A 521 (Step 11). In this state, the white level signal of the white board is set in the white level RAM 78' (Step 12) as in the case of the white level correction explained before (Step 11). The white level data stored in the RAM 78' is shown in FIG. 11-2C. Subsequently, the value i of content of the counter is initialized to 1, and OOH is set in the maximum value storage temporary memory address $M_2$ of the CPU working RAM 24 (Step 3). Subsequently, the data (Wi) in the white level RAM 78' is compared with the data ($M_2$) in the memory $M_2$. If the value of the data ($W_i$) is greater than the value of the data ($M_2$), the data ($M_2$) of the address $M_2$ is changed to ($W_i$), and this operation is repeated from $Bi=B_1$ to $Bi=B_{976}$, in Steps 14, 15 and 16. Consequently, the maximum value throughout the channel CH1 is stored in the memory $M_2$. Then, a judgment is conducted in Step 17 as to whether the maximum value data in the memory $M_2$ is equal to a reference value $D_4$ (AOH in the illustrated embodiment) of the white level. If the maximum value data ($M_2$) is greater than the reference value $D_4$, the process proceeds to Step 19 in which the CPU 22 sets a value $D_{4-\beta}$ in the latch 523 of the multiplying circuit 258 so as to lower the gain level. The process then returns to Step 13 and proceeds to Step 17 in which the judgment is conducted again as to whether the condition of $(M_2)=D_4$ is met. Conversely, if the comparison conducted in Step 18 has proved that the condition of $(M_2)<D_4$ is met, the CPU 22 sets a value $D_{3+\beta}$ in the latch 523 of the multiplying circuit 258 so as to raise the gain level (Step 20). The process then returns to Step 13 and proceeds again to Step 17 in which the judgment is conducted again as to whether the condition of $(M_2)=D_4$ is met.

As will be seen from the foregoing description, the CPU repeatedly conducts the operation while varying the data $D_4$ by substituting $D_{4+\beta}$ or $D_{4''\beta}$, until the condition of $(M_2)=D_4$ is met. When this condition is met, the process proceeds from Step 17 to Step W-B2, in which the value of the content of the counter is initialized to 977 and the processing which is the same as that executed in Step W-B1 for the channel CH1 is conducted for the data from the channel CH2 in the RAM 78', thereby setting the maximum value at $D_4$. Similarly, Steps W B3, W-B4 and W-B5 are executed to set the maximum values of the data from the channels CH3, CH4 and CH5 at $D_4$. The described process is executed in Steps W-G and W-R for the G and R signals, respectively, for each of the channels CH2, CH3, CH4 and CH5, thereby setting the maximum values of all color data of all channels at $D_4$.

The channel connecting process is executed following the flow chart shown in FIG. 11-3. After the power of the reader unit 1 is turned on, the process is started from Step S-m1 in which, if the original scanning unit 11 is not set at the position of the home position sensor S1, the CPU 22 operates so as to give a home position resetting instruction to the stepping motor driver (see FIG. 2) through the signal line 503, whereby the stepping motor 14 operates to reset the original scanning unit 11 to the home position. Then, in Step S-m2, the CPU produces a lighting instruction to the lamp driver 21 through the signal line 504, thereby to turn the halogen lamp 10 on. After turning the halogen lamp 10 on, the CPU 22 operates in Step S-m3 so as to set, in the driver 15, pulses of a number corresponding to the distance to be traveled by the original scanning unit 11 from the home position S1 to the position of the reference black board 9, thereby to drive the original scanning unit 11 to the position of the reference black board. The channel connecting black level processing explained in connection with FIG. 11-2A is conducted in this state (Step S-m4). Subsequently, the process proceeds to Step S-m5 in which the CPU sets in the driver 15 pulses of a number corresponding to the distance between the reference black board 9 and the reference white board 8, thereby driving the original scanning unit 11 to the position of the reference white board. The channel connecting white level processing explained in connection with FIG. 11-2B is conducted in this state (Step S-m6). Subsequently, the halogen lamp is turned off in Step S-m7 and the original scanning unit 11 is reset again to the home position in Step S-m8.

The channel connecting process is thus completed. It will be understood that the described arrangement and operation ensure a high speed of processing, while enabling correction on the basis of each pixel.

It is also to be noted that, in the described embodiment, one-line video data can be input at a high speed and can be accessed by the CPU for reading and writing. This makes it possible to detect the ratio of color components B, G and R of the video data on a point which is determined by coordinates (X mm, y mm) on the original, by driving the original scanning unit 11 in the x-direction by a distance corresponding to (16 x x) lines and then picking up the data of the (16 x y)-th pixel. This mode of operation will be referred to as "line pickup mode", hereinafter. It will be obvious to those skilled in the art that the described arrangement makes it possible to determine a mean density of a plurality of lines (referred to as "mean value computing mode") and to determine the density histogram (referred to as "histogram mode").

Logarithmic Conversion

Figure 13A:
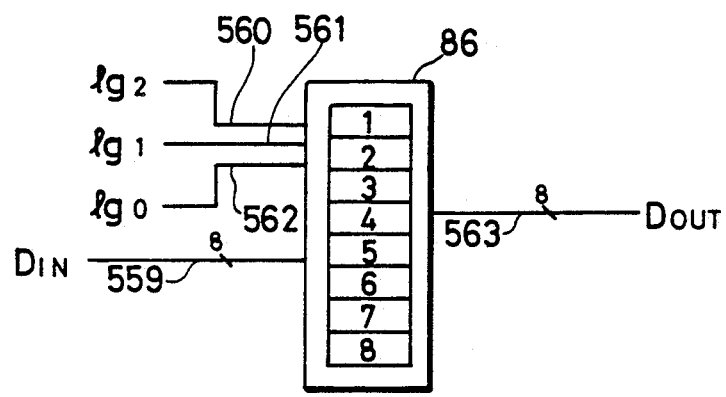
FIG. 13A is a circuit diagram of a logarithmic conversion circuit.
Figure 13B:
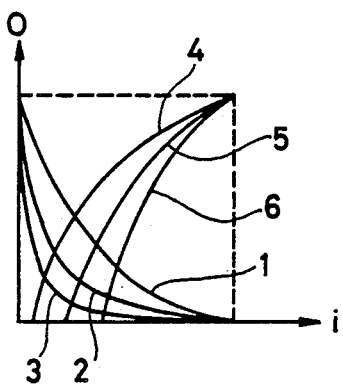
FIG. 13B is a diagram showing logarithmic conversion characteristic.

Through the processes explained hereinbefore, black level and white level corrections are effected to eliminate any influence of various factors such as fluctuations in the black level sensitivity of the video input system, dark current level, sensor output characteristics, light quantity in the optical system and white level sensitivity, whereby a color video data proportional to the input light quantity and uniformalized in the direction of main scan is obtained. The thus obtained color video data is input to a logarithmic conversion circuit 86 (see FIG. 5) conforming with the spectral luminous efficiency of human eyes. This circuit 86 is adapted to perform a conversion to set the white and black levels at 00H and FFH, respectively. The conversion is conducted by making selective use of a plurality of logarithmic conversion tables LUT (Look-up Table) as shown in FIGS. 13A and 13B, in accordance with the types of the image source such as ordinary reflective original, transparent originals such as those used in projectors including both negative and positive films, and films of different sensitivities and exposure conditions, because different types of image source provide different gamma characteristics. The change-over between different LUTs is conducted through signal lines lg0, lg1 and lg2 (560 to 562), in accordance with input given from the control unit through the I/Oport of the CPU 22. The levels of the data given for the B, G and R colors correspond to the density value of the output image. Thus, the output concerning B (blue) corresponds to the amount of yellow toner, the output concerning G (green) corresponds to the amount of magenta toner, and the output concerning R corresponds to the amount of cyan toner. In the following description, therefore, the color video data are expressed in terms of Y, M and C.

Color Correction

Figure 14:
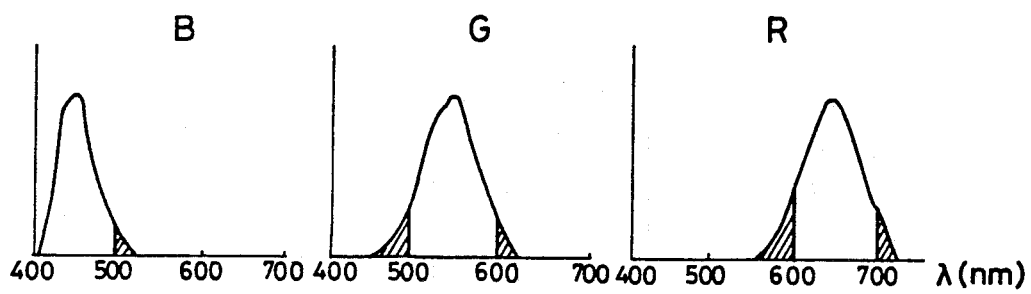
FIG. 14 is a diagram showing spectral characteristic of a reading sensor.
Figure 15:
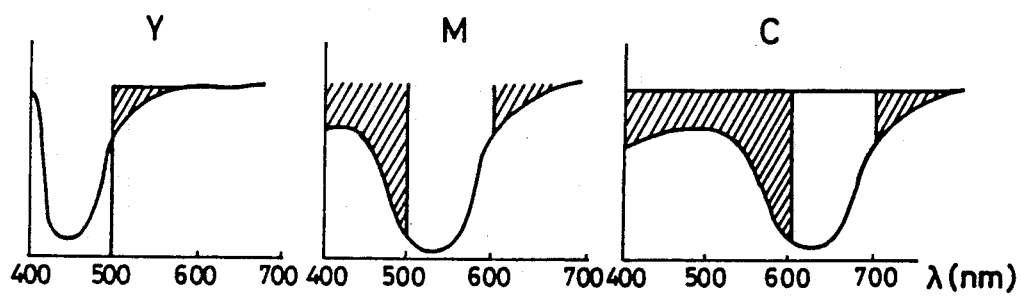
FIG. 15 is a diagram showing spectral characteristics of developing color agent.

The following color compensation is conducted for the color component video data, i.e., yellow component, magenta component and cyan component, obtained from the original image through logarithmic conversion. It is well know that the spectral characteristics of the color separation filter provided on the color reading sensor for each pixel has an unnecessary transmission area as hatched in FIG. 14. It is also well known that the color toners (Y, M, C) to be transferred to the transfer paper have unnecessary absorption components as shown in FIG. 15.

In order to eliminate unfavorable effects of these unnecessary transmission area and unnecessary absorption component, various color correction methods have been proposed and used. For instance, it is well known to conduct masking correction in which color correction is performed by computing the following first degree equation for each color component video data $Y_i$, $M_i$ and $C_i$.

$$\begin{bmatrix} Y_o \\ M_o \\ C_o \end{bmatrix} = \begin{bmatrix} a_{Y1} - b_{M1} - C_{C1} \\ -a_{Y2} \quad b_{M2} - C_{C2} \\ -a_{Y3} - b_{M3} \quad C_{C3} \end{bmatrix} \begin{bmatrix} Y_i \\ M_i \\ C_i \end{bmatrix}$$

Figures 16A, 16B:
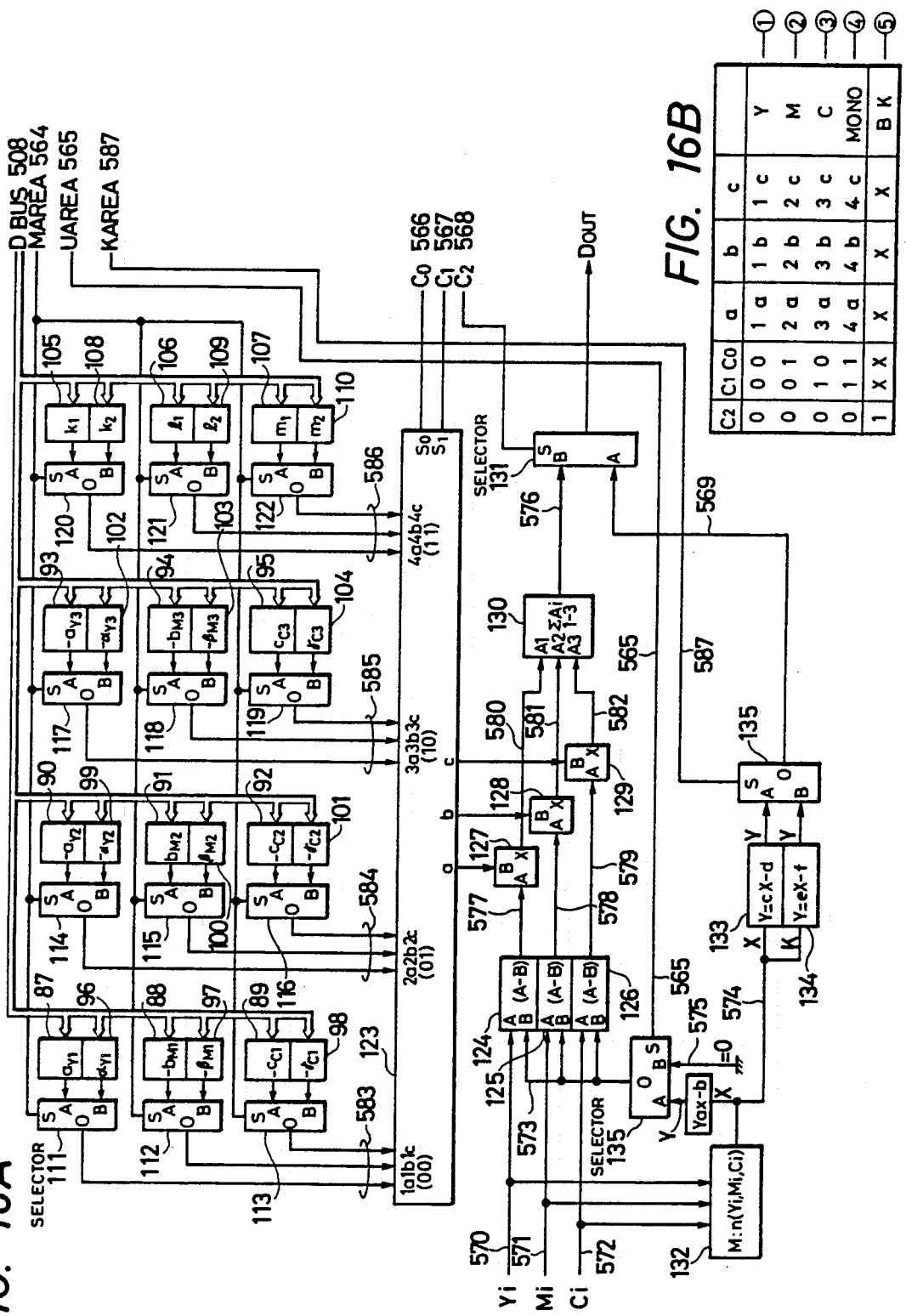
FIG. 16A is a circuit diagram of masking, inking and UCR circuits.
FIG. 16B is an illustration of the relationships between selection signals $C_0$, $C_1$ and $C_2$ and the color signal.

In a method known as "inking", the minimum values Min($Y_i$, $M_i$, $C_i$) Of the color component data $Y_i$, $M_i$, $C_i$ are computed and black toner is added by treating the minimum values as black level. An under-color removal (UCR) is also known in which the amounts of the respective color toners are reduced corresponding to the amount of the black component added. FIG. 16A shows the arrangement of circuits for the masking correction, inking and UCR operations. This circuit arrangement has the following features:

(1) Two masking matrix systems are used, and switching therebetween can be executed at a high speed by switching of the level of a signal line between "1" and "0".

(2) Switching between a mode which employs UCR and a mode which does not employ UCR is conducted at a high speed by switching of the level of a signal line between "1" and "0".

(3) There are two systems of circuit for determining the amount of inking, and switching therebetween is conducted at a high speed by switching of the level of a signal line between "1" and "0".

Before the commencement of the reading of the image, any desired first matrix coefficient $M_1$ and second matrix coefficient $M_2$ are set though a BUS connected to the CPU. In the described embodiment, the following coefficients $M_1$ and $M_2$ are set in registers 87 to 95 and registers 96 to 104, respectively.

$$M_1 = \begin{pmatrix} a_{Y1} - b_{M1} - c_{C1} \\ -a_{Y2} & b_{M2} - c_{C2} \\ -a_{Y3} - b_{M3} & c_{C3} \end{pmatrix} \quad M_2 = \begin{pmatrix} a_{Y1} - \beta_{M1} - \gamma_{C1} \\ -a_{Y2} & \beta_{M2} - \gamma_{C2} \\ -a_{Y3} - \beta_{M3} & \gamma_{C3} \end{pmatrix}$$

Numerals 111 to 122, 135 and 131 denote selectors each being adapted to select "A" and "B", respectively, when the level of the S terminal thereof is "1" and "0", respectively. Therefore, the matrix coefficients $M_1$ and $M_2$ are selected by setting the switching signal MAREA 564 at "1" and "0", respectively. Numeral 123 also designates a selector which provides one of outputs a, band c in accordance with a truth table shown in FIG. 16B, in response to selection signals $C_0$ and $C_1$ (566, 567). The selection signals $C_0$, $C_1$ and $C_2$ correspond to the color signals to be output. Namely, color-corrected Y, M, C and Bk color signals are obtained by setting the selection signals $C_0$, $C_1$ and $C_2$ as ($C_0$, $C_1$, $C_2$) = (0,0,0), (0,,0,1), (0,1,0) and (1,0,0), respectively. A color corrected monochrome signal is obtained by setting the selection signals $C_0$, $C_1$ and $C_2$ as ($C_0$, $C_1$, $C_2$) = (0,1,1). If the selection signals $C_0$, $C_1$ and $C_2$ are set as ($C_0$, $C_1$, $C_2$) = (0,0,0). While the MAREA is set as MAREA ="1", the contents of the registers 87, 88 and 89, i.e., ($a_{Y1}$, $-b_{M1}$, $-c_{C1}$) are obtained as the output (a,b,c) of the selector 123. On the other hand, the black component signal 574, which is computed as $Mn(Y_i, M_i, C_i)$ from the input signals $Y_i$, $M_i$, $C_i$, is subjected to a primary conversion which is conducted by 134 in accordance with a formula Y=ax−b (a and bare constants), and is input to the B inputs of subtractors 124, 125 and 126 through the selector 135. For the purpose of the under-color removal, the subtractors 124 to 126 execute computations of $Y = Y_i - (ak-b)$, $M = M_i - (ak-b)$ and $C = C_i - (ak-b)$, respectively. The results of the computations are input to the multipliers 127, 128 and 129 for the masking computations. The selector 135 is controlled by a signal UAREA 565 which is capable of conducting a high-speed switching between a mode which employs the under-color removal (UCR) and a mode which does not employ the UCR, by switching of its level between "1" and "0". Each of the multipliers 127, 128 and 129 receives at its A input the signal ($a_{Y1}$, $-b_{M1}$, $-c_{C1}$) and at its B input the signal $[Y_i(ak-b), M_i-(ak-b), C_i-(ak-b)] = [Y_i, M_i, C_i]$. Therefore, as will be seen from his figure, an output Yout $= Y_i \times (a_{Y1}) + M_i \times (-b_{M1}) + C_i \times (-c_{C1})$ is obtained at the output Dout, on condition of $C_2=0$ (select Y or M or C), whereby an yellow video data after masking color correction and under-color removal is obtained.

Similarly, outputs $Mout = Y_i \times (-a_{Y2}) + M_i \times (b_{M2}) + C_i \times (-c_{C2})$ and $C_{out} = Y_i \times (-a_{Y3}) + M_i \times (-b_{M3}) + C_i \times (c_{C3})$ are obtained at the output Dout. The color selection is controlled by the CPU 22 in accordance with the table shown in FIG. 16B by suitably setting the values ($C_0$, $C_1$, $C_2$) in the sequence of development performed by the color printer. The registers 105 to 107 and 108 to 110 are monochrome image forming registers and are obtained by weighted addition of the colors in accordance with the formula of MONO = $k_1 Y_i + l_1 M_i + m_1 C_i$. The switching signals MAREA 564, UAREA 565 and KAREA 587 are for conducting, respectively, the high-speed switching between the masking color correction coefficient matrixes $M_1$ and $M_2$, the high speed switching between the mode which employs UCR and the mode which does not employ the UCR, and the high-speed primary switching of the black component signal which is delivered from the Dout through the signal line 569 and the selector 131. More specifically, the KAREA 587 conducts a high-speed switching between Y=ck−d and Y=ek−f (c, d, e and f are constant parameters) for a given value $K=M_i n (Y_i, M_i, C_i)$. it is therefore possible to apply different masking coefficients to different areas of a single image or to vary the amount of UCR and amount of inking according to areas. This arrangement, therefore, can be used for synthesizing images derived from different image input sources of different color-separation characteristics or a plurality of images of different black tone levels, as in the described embodiment of the invention. The area signals MAREAm UAREA and KAREA 564, 565, and 587 are produced by an area signal generating circuit 51 (see FIG. 2) which will be detailed hereinunder.

Area Signal Generating Circuit

Figure 17A:
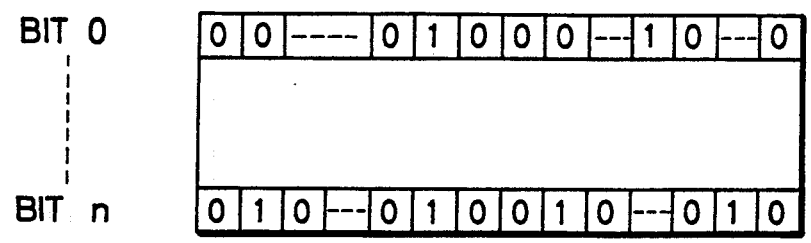
Figure 17B:
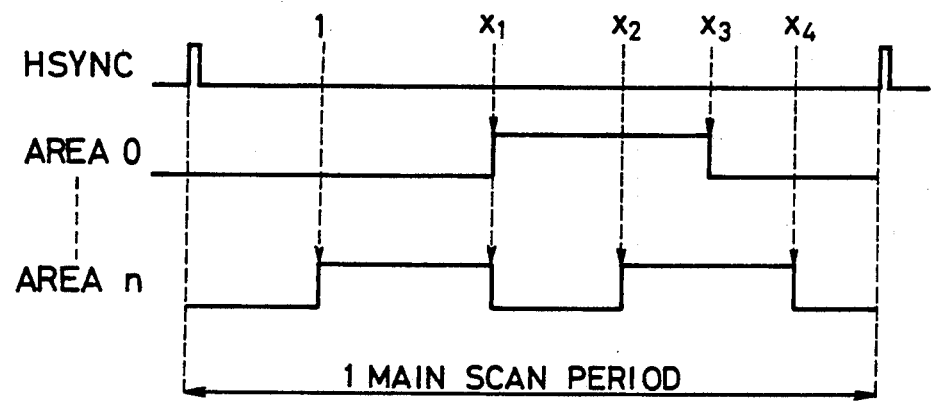
Figure 17C:
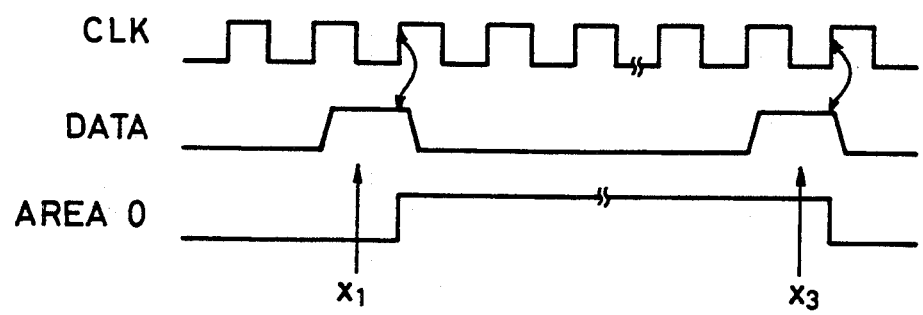
Figure 17D:
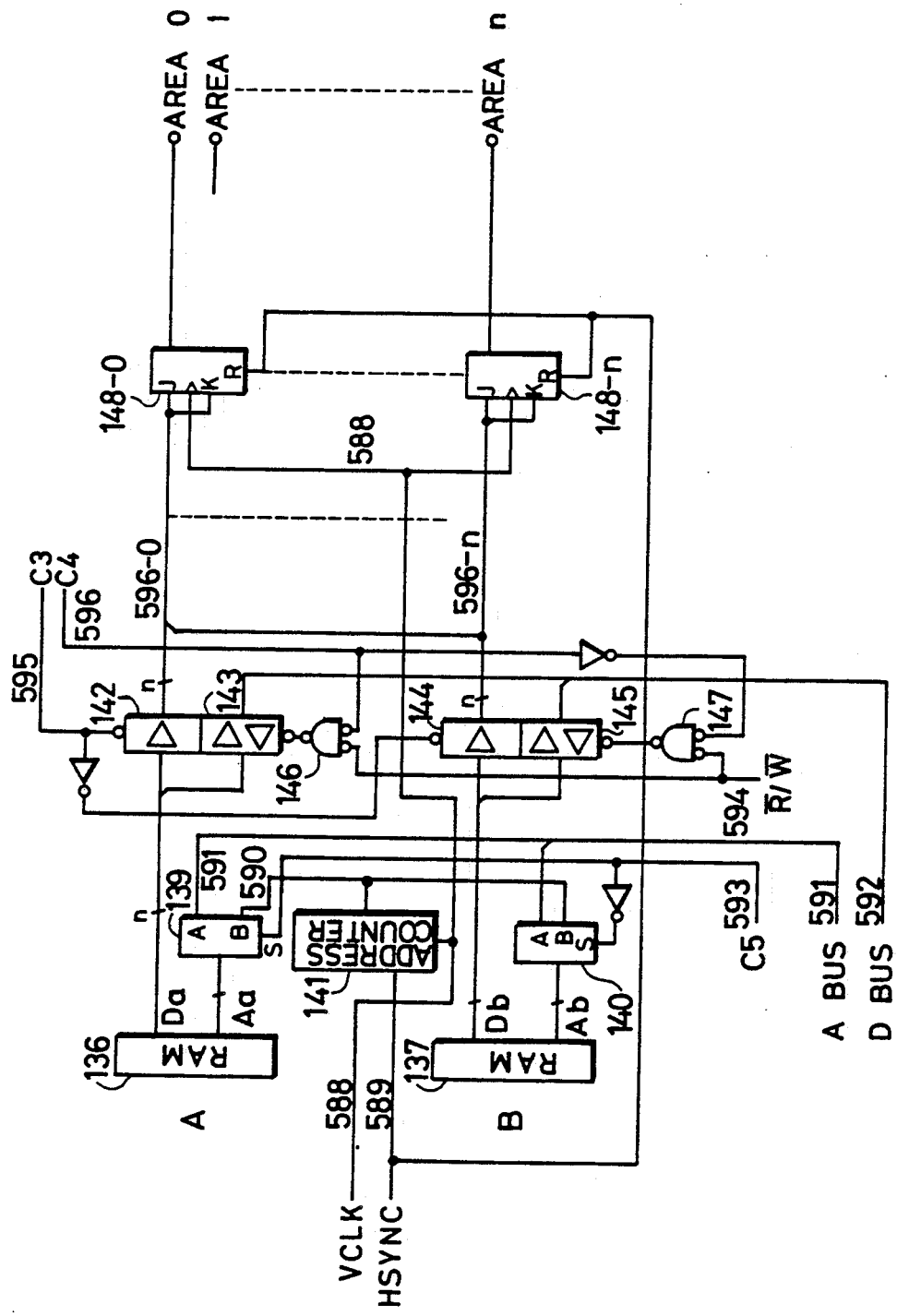

The principle of generation of the area signals such as MAREA 564, UAREA 565 and KAREA 587 will be explained with reference to FIGS. 17A to 17G. The term "area" is used to mean, for example, a region which is hatched in FIG. 17E. This area can be determined by generating a signal AREA at a timing shown in FIG. 17E in each scanning period in a region between A and B as measured in the direction of the sub-scan. Each area can by appointed by the digitizer shown in FIG. 1. FIGS. 17A to 17D show an arrangement which enables a multiplicity of area signals to be formed in a programmable manner by the CPU 22. With this arrangement, therefore, it is possible to provide a variable number of area signals at variable timings and with variable lengths. In this arrangement, each area signal is constituted by one bit of a RAM which is accessible by the CPU 22. For instance, a pair of RAMs 136, 137 (FIG. 17D) each having n. bits are used for the purpose of generating n-pieces of area signals AREA0 to AREAn. Thus, area signals AREA0 and AREAn as shown in FIG. 17B can be obtained by setting "1" in the bit 0 at the addresses $x_1$ and $x_3$ of the RAMs, while setting "0" in bits 0 at all other addresses. On the other hand, "1" is set in the bit n at addresses 1, $x_1$, $x_2$ and $x_4$, while "0" is set in bit n at all other addresses in the RAM. Then, by sequentially reading the data from the RAM in synchronization with clocks based on the signal HSYNC, data "1" is read at each of the addresses $x_1$ and $x_3$ as shown in FIG. 17C. The thus read data are input to J and K terminals of the J-K flip-flops 148-0 to 148-n shown in FIG. 17D so that a region signal such as AREA0, i.e., the area signal, is produced by a toggle operation, i.e., an operation which changes the output level from "0" to "1" and vice versa when CLK is input white "1" is read from the RAM. If data "0" is set in all addresses, the area signal is not generated so that no area is set. FIG. 17D shows the arrangement of this circuit having the RAMs 136 and 137. These two RAMs 136 and 137 are used alternately in such a manner that, while a line data is being read from the RAM 136, data for setting the area is set by the CPU into the other CPU 22 (see FIG. 2), thereby attaining a high-speed switching of the area length. For instance, when an area hatched in FIG. 17F is appointed, the RAMs A and B are switched from A to B, from B to A, from A to B and then from B to A. This operation will be explained in more detail with reference to FIG. 17D. When data ($C_3$, $C_4$, $C_5$) are set as ($C_3$, $C_4$, $C_5$) = (0, 1, 0), the output from the counter which counts in synchronization with VCLK is delivered as an address data to the RAM 136 through a selector 139 (Aa). At the same time, a gate 142 is opened white a gate 144 is closed so that the RAM 136 is used in the reading mode to allow data to be read therefrom, whereby n-bit data are input to the J-K flip-flops 148-0 to 148-n, whereby a region signal AREA0 to AREAn is generated in accordance with the value set in the RAM 136. Meanwhile, writing of the data by the CPU to the RAM B is conducted through an address BUS A-hatched Bus and data BUS D-Bus, in accordance with an access signal R/W. The generation of the region signal on the basis of the data set in the RAM B 137 is conducted in the same manner, by setting the data ($C_3$, $C_4$, $C_5$) as ($C_3$, $C_4$, $C_5$) = (1, 0, 1). Meanwhile, data is written by the CPU into the RAM A 136. These two RAMs will be referred to as A-RAM and B-RAM, respectively, while the data $C_3$, $C_4$, $C_5$ will be collectively referred to as AREA control signal (ARCNT). The AREA control signal $C_3$, $C_4$, $C_5$ are generated through the I/O port of the CPU. FIG. 17G illustrates a table which contains correlations between the bits and the names of signals.

Color Conversion

Figure 18A:
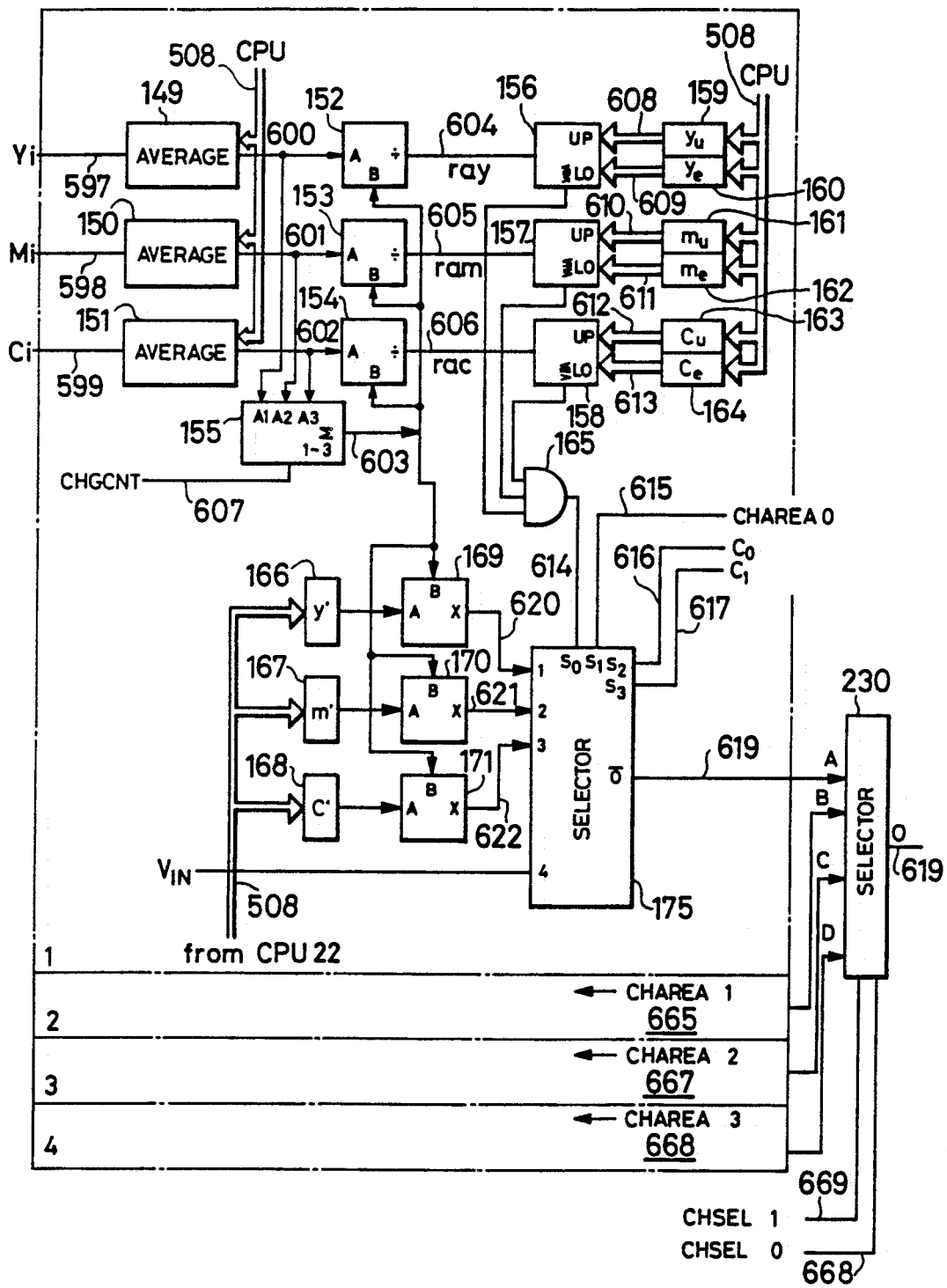

The circuit arrangement for color conversion will be explained hereinunder with reference to FIG. 18. The term "color conversion" is used to mean a replacement of an input color component data ($Y_i$, $M_i$, $C_i$) of a specific density or color component ratio with another color. Practically, this operation is conducted for changing, for example, the red color of hatched area of the original shown in FIG. 18C into, for example, blue color.

The respective color data ($Y_i$, $M_i$, $C_i$) input to this circuit are first delivered to averaging circuits 149, 150 and 151. The mean pixel numbers are set through a CPU BUS from an operation or control panel which will be described later. Practically, the mean pixel numbers are set in window comparators 156 to 158 through the CPU BUS. The setting of the mean pixel number is conducted in relation to the width between a comparison upper limit and a comparison lower limit. When the width is small, the mean pixel number is set to be large in order to avoid erroneous detection which may otherwise be caused by, for example, presence of a half-tone image. Conversely, when the width is large, the mean pixel number is set to be comparatively small, in order to avoid erroneous detection of, for example, fine lines. The average data from the averaging circuits are input to an adder 155 which computers ($Y_i + M_i + C_i$) and delivers the same to the B inputs of the dividers 152, 153 and 154. The outputs from the averaging circuits also are input to the A inputs of these dividers, whereby color ratios including the yellow ratio ray = $Y_i/(Y_i + M_i + C_i)$, magenta ratio ram = $M_i/(Y_i + M_i + C_i)$ and the cyan ratio rac = $C_i/(Y_i + M_i + C_i)$ are derived through signal lines 604, 605 and 606, respectively, and are input to the window comparator 156 to 158. These window comparators 156 to 158 are adapted to produce outputs of "1" level on conditions that the values of the color ratios fall within a ranges between the upper and lower limits ($y_u$, $m_u$, $C_u$), ($Y_l$, $m_l$, $c_l$). Namely, outputs "1" are obtained from the respective window comparators on conditions of $y_l \leq$ ray $< y_u$, $m_l \leq$ ram $< m_u$ and $c_l \leq$ rac $< c_u$. The CPU judges that the input color is the very one which has been expected, when all of these three conditions are met. When all of these three conditions are met, a 3-input AND gate 165 produces an output of "1" level. This output is input to the $S_0$ input of a selector 175. When the level of the signal output from the I/O port of the CPU and carried by a signal line CHGCNT 607 is "1", the adder 155 produces an output $$603 = \sum_{i=3} A_i$$

When the same signal is "0", the adder produces an output $603 = 1$. Therefore, when the level of the above-mentioned signal is "0", the dividers 152, 153 and 154 directly deliver the signals received by their A inputs. Thus, color density data rather than the desired color component ratio are set in the registers 159 to 164. The selector 175 mentioned above has four input lines and one output line. The inputs 1, 2 and 3 of the selector 175 receive the Y, M and C components as the color data of the color to be obtained after the color conversion. Meanwhile, the input 4 receives the data $V_{in}$ which has been obtained by conducting masking color correction and UCR in the read original image data. Thus, the input 4 is connected to the output Dout shown in FIG. 16A. The switching input $S_0$ takes a level "1" when the color detection is "true", i.e., when a predetermined color is detected, otherwise a level "0". A symbol $S_1$ is an area signal CHAREA0 615 produced in the area generating circuit shown in FIG. 17D. This signal takes "1" level for the data within an appointed area and "0" for the data which are out of the area. Thus, the color conversion is conducted only when this signal $S_1$ is set at "1". The inputs $S_2$ and $S_3$ ($C_0$ and $C_1$) 616 and 617 are the same as the signals $C_0$ and $C_1$ shown in FIG. 16A. The color printer performs formation of an yellow image, magenta image and cyan image conditions of ($C_0$, $C_1$) = (0, 0), ($C_0$, $C_1$) = (0, 1) and ($C_0$, $C_1$) = (1, 0), respectively. FIG. 8B shows the truth table for the selector 18B. The color component ratios to be obtained after the color conversion or the color density data to be obtained after the color conversion are set in registers 166 to 168 by the CPU. In the area where y', m' and c' are color component ratios, since the CHGCNT 607 has been set to "1", the output 603 of the adder 155 represents ($Y_i + M_i + C_i$) which is input to the B inputs of the multipliers 169 to 171. In consequence, the selector inputs 1, 2 and 3 receive, respectively, signals ($Y_i + M_i + C_i$) × y', ($Y_i + M_i + C_i$) × m' and ($Y_i + M_i + C_i$) × c', whereby color conversion is executed in accordance with the truth table shown in FIG. 18B. In contrast, when y', m' and c' are color component density data, the CHGCNT is set as CHGCNT = "0", so that the signal 603 takes "1" level. Therefore, the inputs 1, 2 and 3 of the selector 175 directly receive the data (y', mm', c') thereby causing a color conversion through replacement of the color component density data. As explained before, the area signal CHAREA0 615 allows the region length and region number to be set freely. It is therefore possible to apply the color conversion only to a plurality of regions $r_1$, $r_2$, $r_3$. It is also possible to conduct a high-speed and real-time color conversion in a plurality of regions with a plurality of colors, e.g., from red to blue in the region $r_1$, from red to yellow in the region $r_2$ and from white to red in the region $r_3$, by using a plurality of circuits shown in FIG. 18A. Namely, a plurality color detection and conversion circuits of the same construction as that explained above are prepared, and a selector 230 selects the desired output from among the outputs A, B, C and D of these circuits in accordance with signals CHESEL0 and CHSEL1 and the thus selected output is delivered through an output 619. The area signals CHAREA0 to CHAREA3 applied to the respective circuits, as well as CHSEL0 and CHSEL1, are generated by the area generating circuit 51 as shown in FIG. 17D.

Gamma Conversion Circuit

Figure 19A:
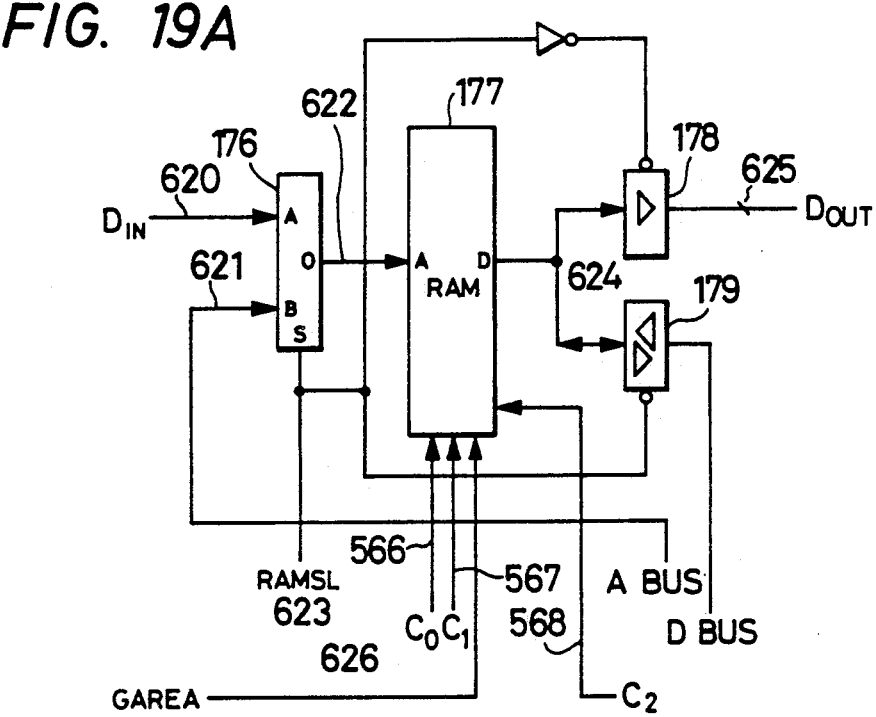
Figures 19B, 19C:
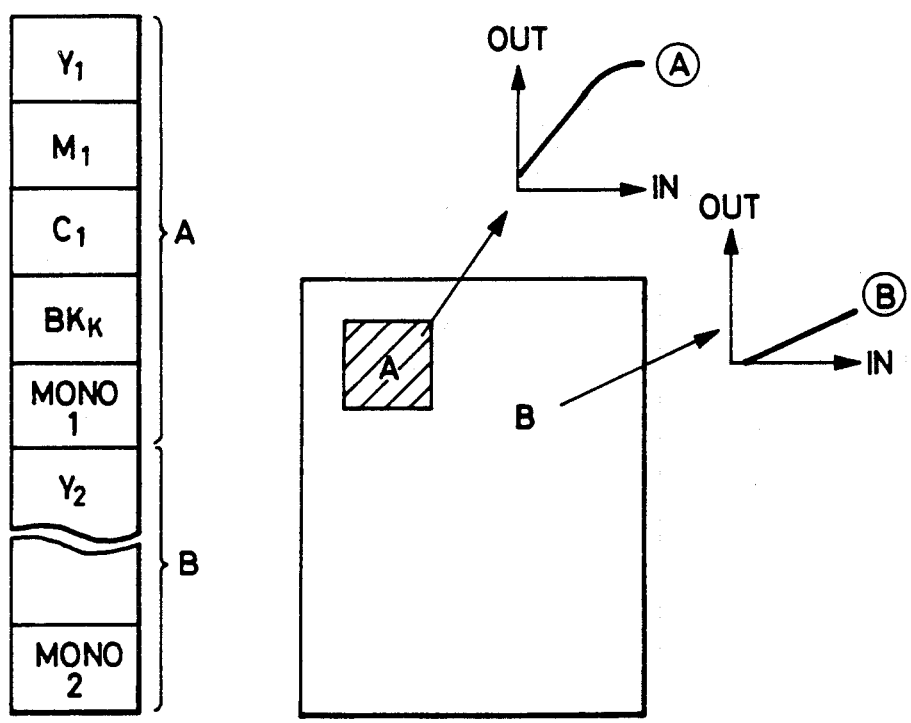

FIG. 19 shows a gamma conversion circuit which is used for the purpose of controlling the color balance and the color densities of the output image in the described system. The gamma conversion basically relies upon data conversion by means of an LUT (Look-Up Table). The data contained in the LUT can be rewritten in accordance with input from the control unit. Writing of data in the RAM 177 constituting the LUT is conducted as follows. By setting the level of the signal on the selection signal line RAMSL 623 at "0", the selector 176 selects the B input so that the gate 178 is closed while the gate 179 is opened, whereby the BUSes ABUS and DBUS (address data) leading from the CPU 22 are connected to the RAM 177, thus enabling wiring or reading of data into and from the RAM 177. Once the conversion table is formed, the RAMSL is set to "1" so that the video input from the Din 620 is input to the address input of the RAM 177 so that addressing can be done by the video data, whereby the desired data is input through the open gate 178 to the magnification control circuit of the next stage. At least two types of gamma characteristics (A and B in FIG. 19B) are provided in the gamma RAM for five color types of yellow, magenta, cyan, black and MONO. As in the case of the operation explained in connection with FIG. 16, the switching of each color is executed in terms of the data $C_0$, $C_1$, $C_2$ (566, 567, 568). In addition, as shown in FIG. 19C, the area A is provided with a gamma characteristic A, while the area B is provided with a gamma characteristic B, in accordance with an area signal GAREA 626 generated by the area generating circuit (see FIG. 17), whereby both areas of different gamma characteristics form corresponding images in a single print.

Thus, the gamma RAM has two types of magnification characteristics A and B which are switchable at a high speed for independent regions. Obviously, high-speed switching between three or more magnification characteristics is obtainable by increasing the type of the magnification characteristic. The output Dout 625 in FIG. 19A is connected to the input Din 626 of the magnification control circuit (see FIG. 20A) of the next stage.

As will be seen from the drawings, the described gamma conversion RAM is constructed to enable the gamma conversion characteristics to be changed for independent colors. The contents of the RAM can be rewritten by the CPU in relation to the operation of liquid-crystal touch panel key on the control panel.

Procedure of Gamma Conversion

Figure 37:
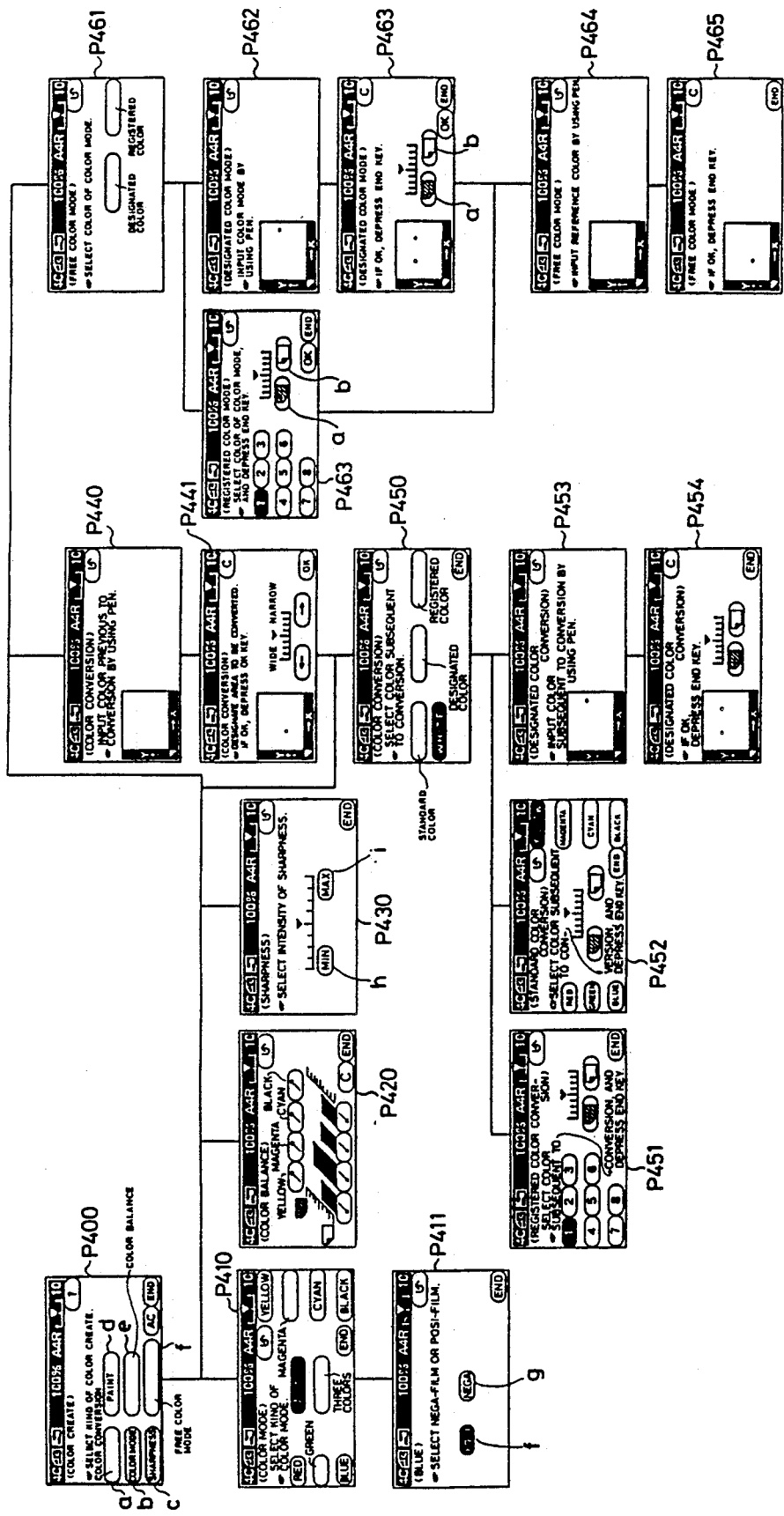
FIG. 37 is an illustration of operation of the apparatus in color create mode.

Assume here that a density adjusting key e or f on a standard picture P000 (see FIG. 33) is touched by the operator. If the key touched by the operator is the key e, the setting is shifted to the left as from $-1$ to $-2$, as will be seen from FIGS. 19D and 19E. The characteristics set in the RAM 177 also is shifted correspondingly from $-1$ to $-2$, from $-b\,2$ to $-3$, from $-3$ to $-4$ and so on. When the key touched by the operator is the key f, the characteristics are shifted as from $+1$ to $+2$, from $+2$ to $+3$, from $+3$ to $+4$ and so forth, thus rewriting the content of the RAM 177. Thus, the whole table (RAM 177) for the Y, M,C, Bk or MONO can be rewritten by touching the key e or the key f on the standard picture mentioned above, whereby the density of the image can be changed without causing any change in the color tone. FIG. 37 shows a picture P 420 displaying a color balance control function in <color create> mode. The function enables the data for the independent colors Y, M, C and Bk only within the area of the RAM 177, so as to enable the color balance to be controlled. For instance, when it is desired to change the color tone of the yellow component, the black display belt on the picture P 420 is extended upward in response to pressing of a touch key $y_1$ so that the conversion characteristic is changed in the $y_1$ direction as indicated by $-Y$ in FIG. 19F, whereby the density of the yellow color component is increased. Conversely, when the touch key $y_2$ is pressed, the characteristic is shifted in the direction $y_2$, whereby the density of the yellow color component is decreased. Thus, the color balance function enables the color tone to be changed through a change in the density of each color component.

The free color mode, which is set through the picture P 361 in FIG. 36 (free color mode in area appointing mode) can be realized by rewriting the gamma conversion RAM in a manner which will be described later. The free color mode is a mode which has a function for producing an image of a single hue with gradation, as in the case of production of a black monochromatic copy image with gradation by a monochromatic copying apparatus from a full-color original image. The free color mode employed in this embodiment, however, enables a free selection of the single hue of the single hue image in converting the original color image into a monochromatic or single hue copy image, as one of its critical features.

A description will be made hereinunder as to how the free color mode is realized, with reference to FIG. 54A. The description will be made on an assumption that the user wishes to obtain a copy image in the hue of blue color from an original image. The desired hue can be conducted by appointing the corresponding color on the original through the picture P 360 shown in FIG. 36 to enable the apparatus to read the color, or by appointing the hue which has been registered in the picture P 360 of FIG. 36.

Figure 36:
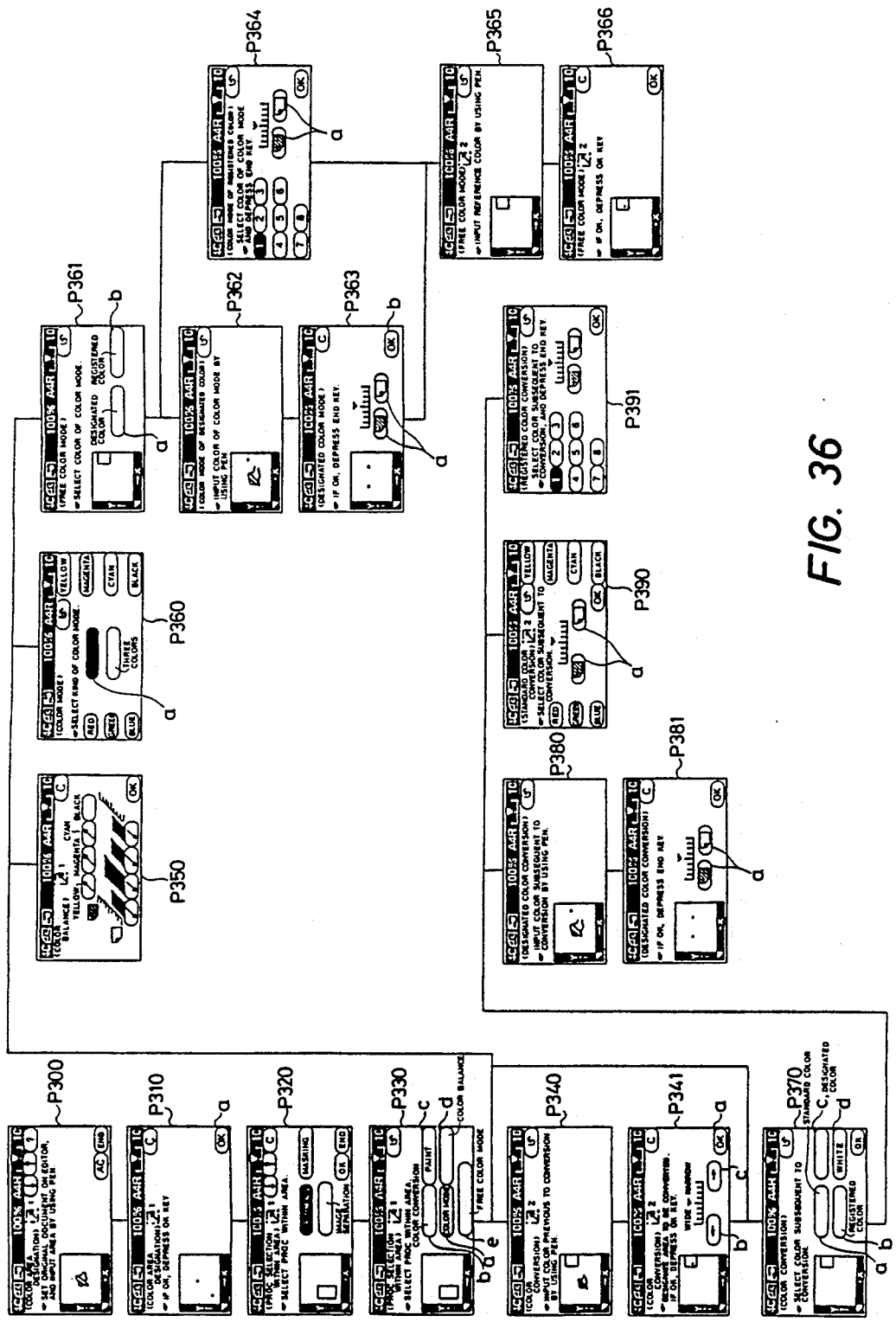
FIG. 36 is an illustration of operation of the apparatus in area appointing mode.
Figure 54A:
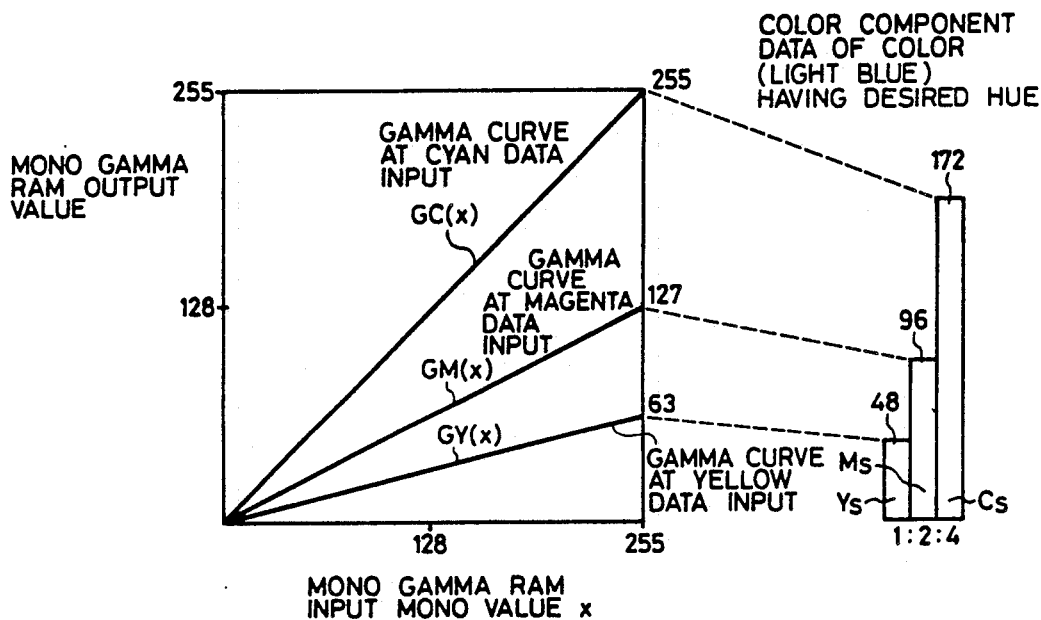
FIGS. 54A, 54B, 54C, 54D and 54E are illustrations of free color mode.

The graph appearing on the right side of FIG. 54A shows the color component data ($Y_s$, $M_s$, $C_s$) of the color having the desired hue (light blue in this case) appointed through the picture P 362 or P 364 of FIG. 36. From this graph, it is understood that the desired hue (light blue) has a component ratio of $Y_s:M_s:C_s = 1:2:4$. The graph on the left side of FIG. 54A shows gamma characteristics which are set in the MONO gamma RAM in the formation of yellow, magenta and cyan images, for the purpose of enabling conversion of image in hues of component ratios as shown by the right-side graph while preserving the gradation of the original image.

Representing the maximum value among $Y_s$, $M_s$ and $C_s$ by MAX, the gamma characteristic functions GY(x), GM(x) and GC(x) for the yellow, magenta and cyan are formed in the following manner.

$$GY(x) = X \cdot \frac{Y_s}{MAX}$$

$$GM(x) = X \cdot \frac{M_s}{MAX}$$

$$GC(x) = X \cdot \frac{C_s}{MAX}$$

where, MAX is not equal to 0.

The free color mode is realized by subjecting the thus obtained MONO gamma RAMs to gamma conversion while changing the gamma characteristics for yellow, magenta and cyan colors, respectively.

In fact, the following condition is obtained for all MONO values X so that the formed image has the same ratio with respect to yellow, magenta and cyan, thus realizing the same hue.

$$GY(x):GM(x):GC(x) = x \cdot \frac{Y_s}{MAX} : x \cdot \frac{M_s}{MAX} : x \cdot \frac{C_s}{MAX}$$
$$= Y_s:M_s:C_s$$

Figure 54B:
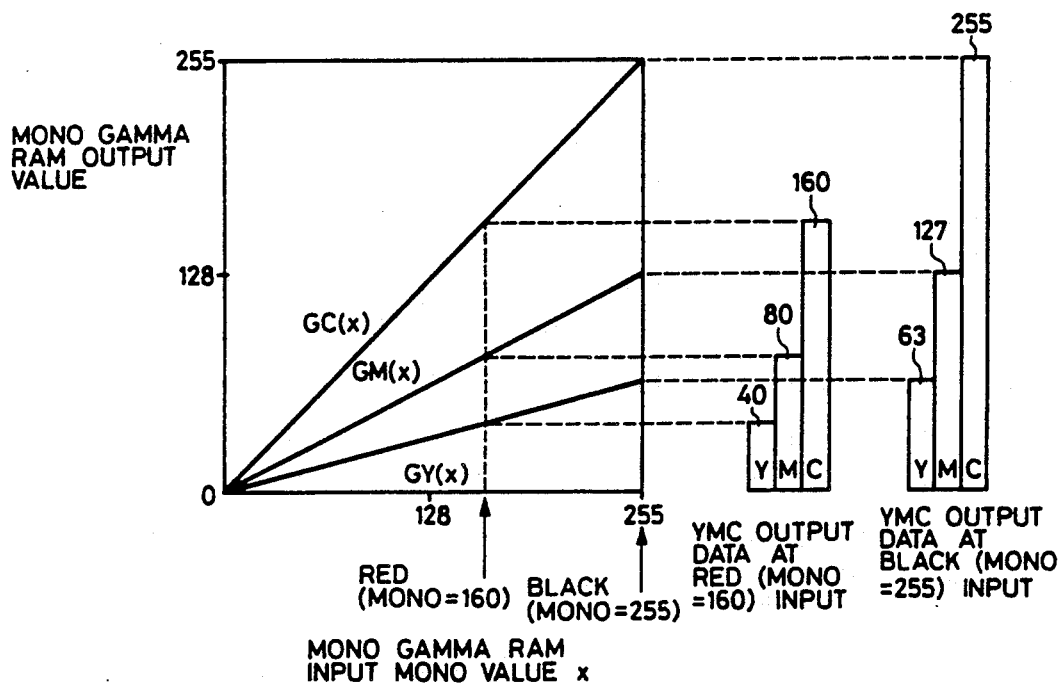

FIG. 54B shows the color components of the color in which the image is formed in the free color mode from an original having a black portion (MONO=255) and a red portion (MONO=160). It will be seen that the image of the portion of high MONO value on the original is formed with a high density, whereas the image of the portion of low MONO value is formed in a low density, while keeping the same hue.

This method, however, does not enable free selection of density of the image of desired portion of the original image. Actually, it is often experienced that the density is controlled in such a manner that the image of the black portion of the original image is formed with reduced density of the desired hue, while the image of the red portion is formed with increased density of the desired hue.

Figure 54C:
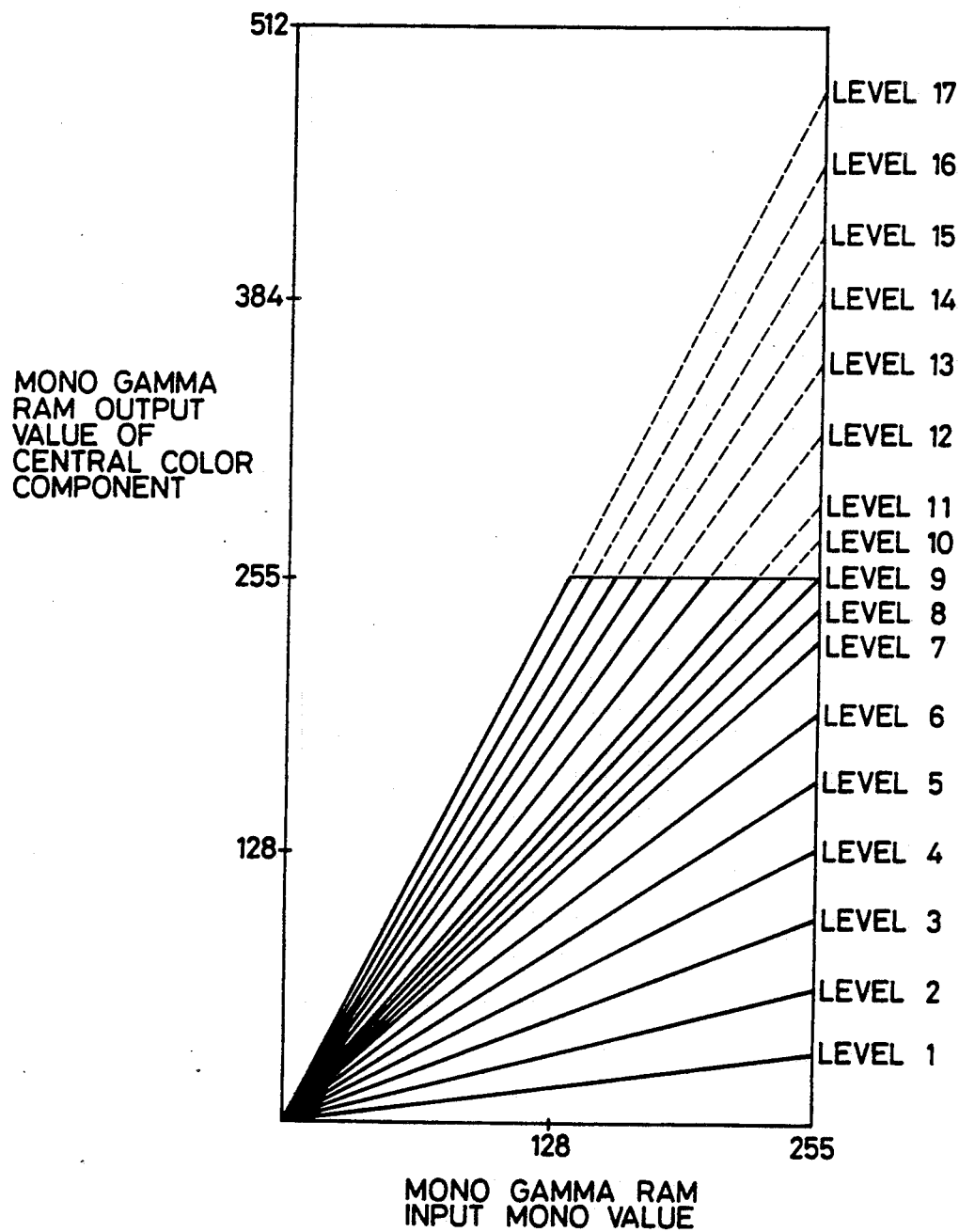

To this end, the described embodiment is so designed as to enable the density level to be varied over 17 levels, i.e., from level 1 to level 17, by manipulating the density control key a on the picture P 363 or P 364 of FIG. 36 (free color mode in <area appointing> mode). In accordance with the selected density level, the gamma curve (see FIG. 54A) of the color component having the greatest proportion (referred to as "main color component") is changed as shown in FIG. 54C. The standard level of the density is the level 9. When this density level has been selected, the gamma curve of FIG. 54C coincides with the gamma curve of FIG. 54A.

The gamma characteristic function $GMAIN_i$ of the main color component is determined by the following formula for each of the constants $M_i(M_0$ to $M_{17})$ $(M_s=255)$ given for the respective density levels.

$$data = x \cdot \frac{M_i}{255}$$

-continued $$GMAIN_i(x) = \begin{cases} data & (data \leq 255) \\ 255 & (data > 255) \end{cases}$$

In this embodiment, the upper limit is set to be 255 because the gamma RAM produces an 8-bit output (0 to 255).

According to the present invention, the inclination of the gamma curve of the main color component is varied in accordance with the density level and the inclinations of other color components also are varied in accordance with the inclination of the gamma curve of the main color component so as to maintain the predetermined ratios, whereby the density is adjusted without changing the hue.

Figure 54D:
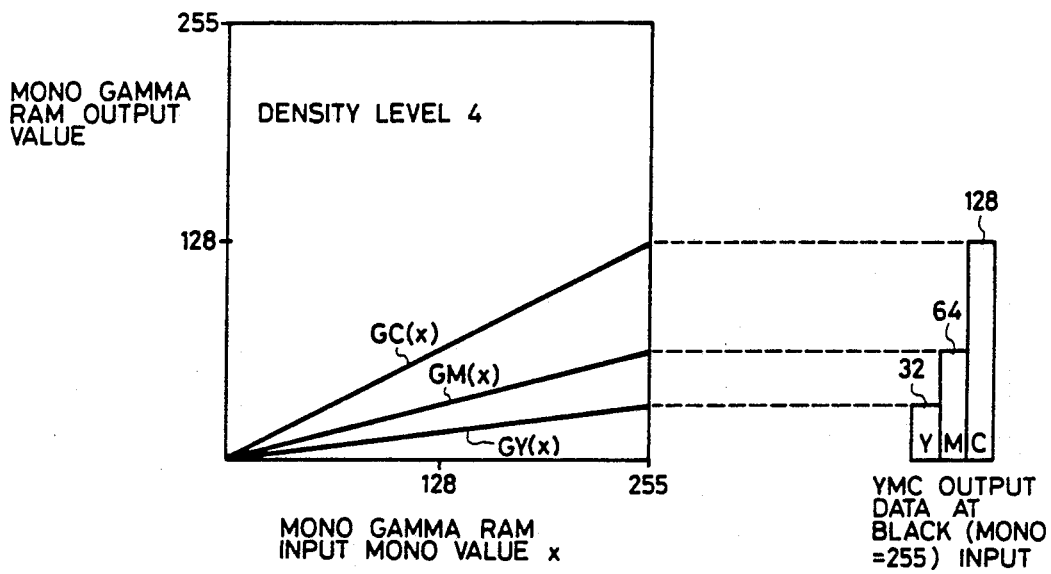

FIG. 54D shows a gamma curve as obtained when the example of FIG. 54A is changed to the density level 4. It will be seen that the image of the black portion of the original is formed in the same hue with reduced density, while maintaining the ratio of Y:M:C=1:2:4.

Figure 54E:
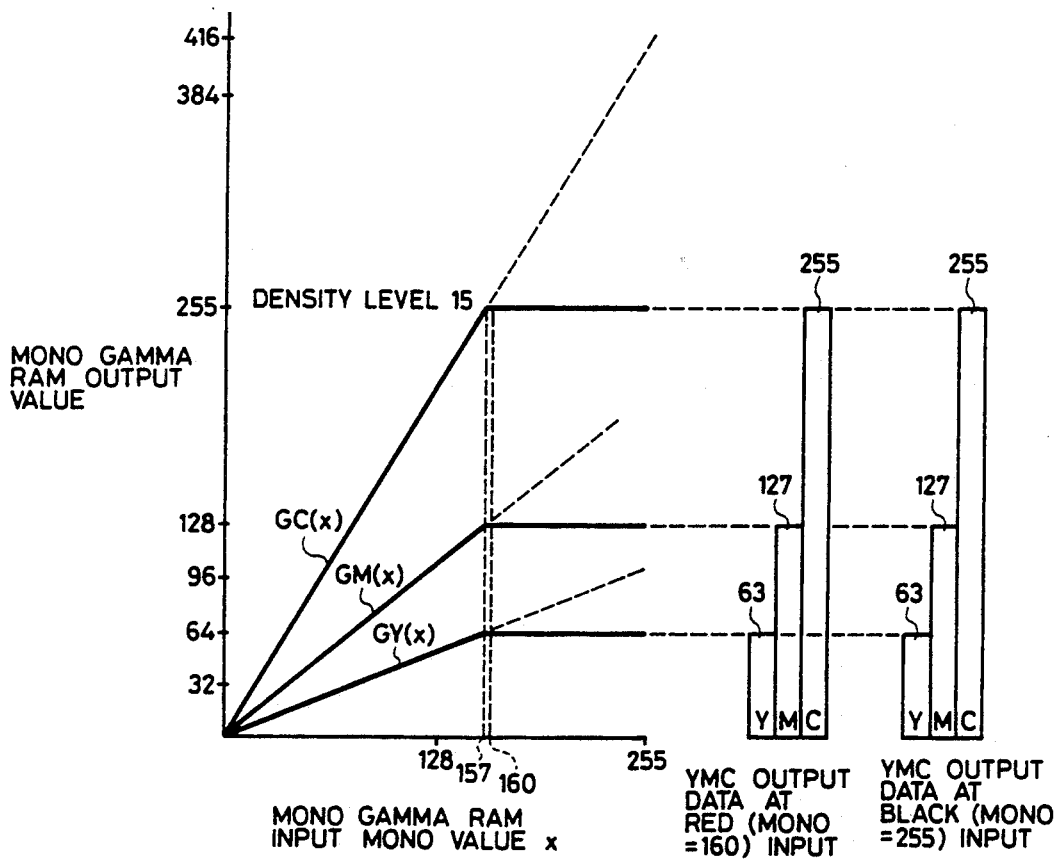

FIGS. 54E shows the gamma curve as obtained when the example of FIG. 54A is varied to the density level 15. In order to maintain the constant value of the color component ratio, the control is conducted such that, when the main color component has reached the upper limit (255 in this case) and maintained constant, other color components also are set at constant levels. With this density level, it is possible to convert the red component of the original into a color of the same hue but having a higher density. Needless to say, the ratio of the output data of Y:M:C =1:2:4 is maintained for all MONO input values.

It is also possible to effect the density control by pointing, on the picture P 365 of FIG. 36 (free color mode in <area appointing> mode), the portion of the image which the user wishes to convert into the same density as the color ($Y_s$, $M_s$, $C_s$) having the desired hue which has been appointed through the picture P 362 or P 364 in FIG. 36.

Practically, this is conducted by reading the MONO value (reference MONO value) of the point pointed on the original, and setting the gamma curves of the respective color components in the MONO gamma RAMs such that $Y_s$, $M_s$ and $C_s$ are output when the read MONO value is input. When the reference MONO value is comparatively small, the gradient is large as shown in FIG. 54E, whereas, when the reference MONO value is large, the gradient becomes small as shown in FIG. 54D.

As explained before, the free color mode can be realized by three image forming operations for Y,M and C. However, when the image formation of Bk color is required due to simultaneous use of another operation mode, the gamma curve for the Bk color should be set such that 0 is output for all input values.

Magnification Control

Figure 20A:
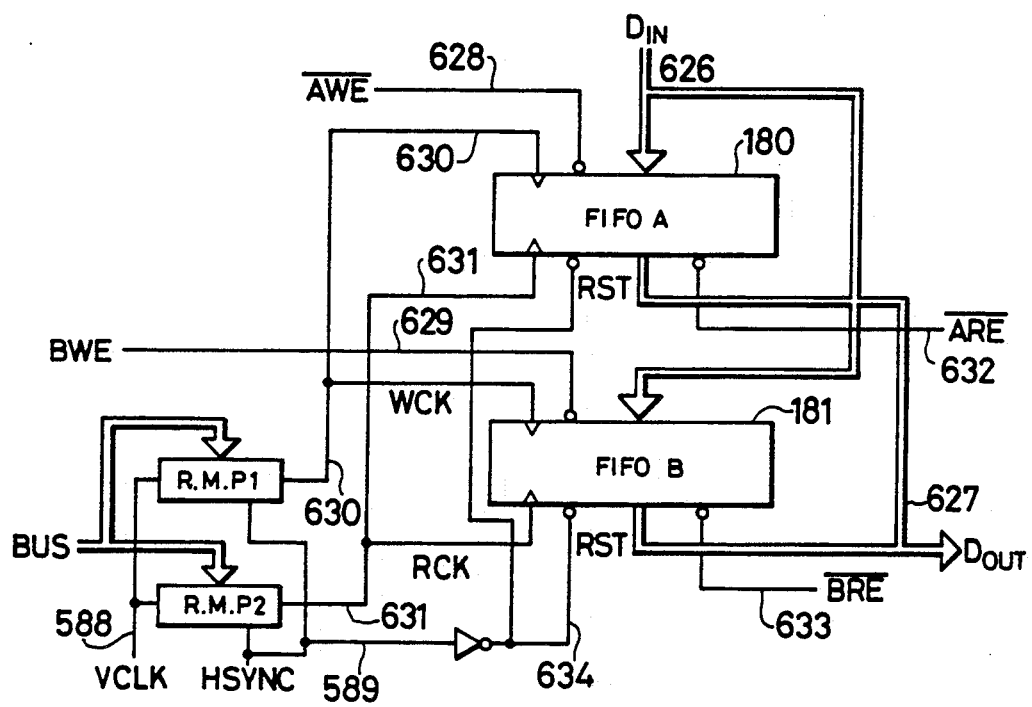
FIGS. 20A, 20B, 20C, 20D, 20E, 20F and 20G are illustrations of zooming control operation.
Figure 20B:
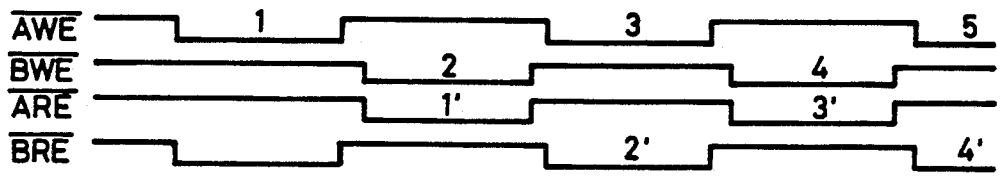
Figure 20C:
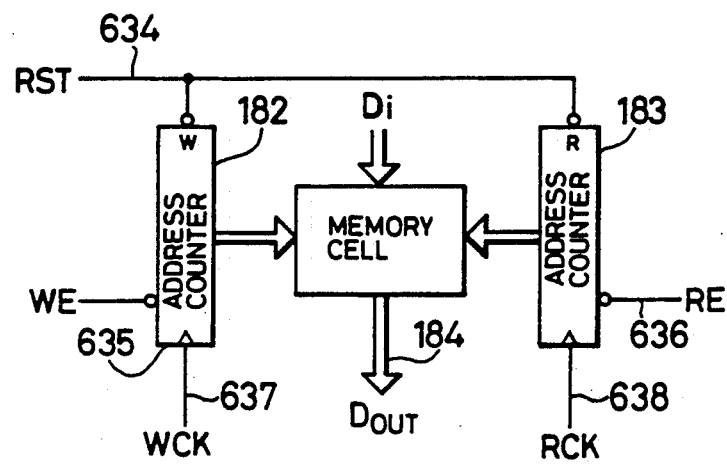

Referring to FIG. 20A, numerals 180 and 181 denote FiFo memories each having a capacity of 16×297=4752 pixels (pixel pitch of 16 pel/mm over a length of 297 mm corresponding to length of A-4 size paper) in the direction of the main scan. As will be seen from FIG. 20B, each FiFo memory conducts writing of data into the memory throughout a period of AWE, BWE="Lo" and reading of data throughout the period of ARE, BRE="Lo". The output A and the output B of the memory is changed into high-impedance state on condition of ARE="Hi" and BRE=Hi, respectively. The wired OR of these outputs A and B is then output as the output Dout 627. Each of the FiFo A 180 and FiFo B 181 is constructed such that the position of an internal counter is advanced in accordance with the write address counter and read address counter (see FIG. 20C) which operate in response to write and read clocks WCK and RCK. It is therefore possible to reduce the size of the output data from this circuit as compared with the input data, by delivering, as the clock WCK, a clock CLK which is produced by thinning out the video data transfer clock CCLK 588 by means of a rate multiplier 630, while directly using the clock VCLK as the clock RCK without an thinning. Conversely, the size of the output date is increased as compared with the size of the input data, if the clock VCLK is directly used as the WCK while the thinned out clock CLK is used as the clock RCK. This operation for increasing and decreasing the size of the data is well known. The FiFo A and FiFo B conduct the reading and writing operations alternately.

Figure 20D:
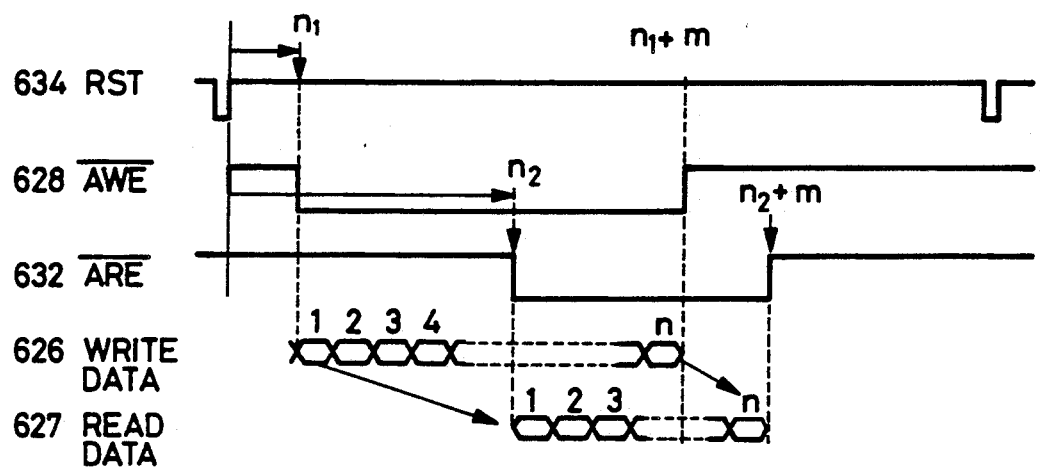
Figure 20E:
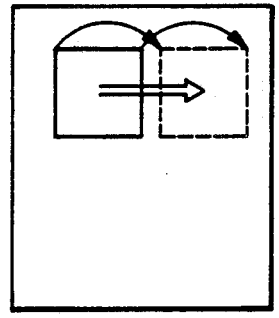
Figure 20F:
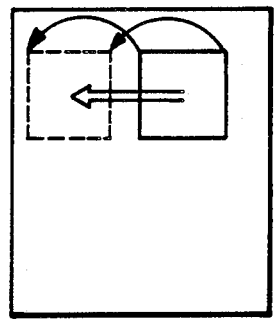
Figure 20G:
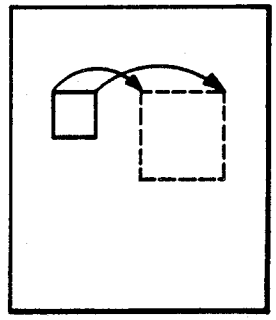

The W address counter 182 and the R address counter 183 in the FiFo memories 180 and 181 can conduct up-counting only when the enable signals WE, RE 635, 636 are "Lo" and are initialized in response to a reset signal RST 634="Lo". For instance, referring to FIG. 20D, signal AWE (and BWE) are set as AWE="Lo"for a period corresponding to m pixels as counted from $n_1$-th pixel after the resetting by RST which is, in this case, the synchronizing signal HSYNC for attaining synchronization in the direction of main scan), thereby writing pixel data. Then, the data is read by setting the signal ARE (and BRE) are set as ARE="Lo"for a period corresponding to m pixels as counted from $n_2$-th pixel. In consequence, the data is shifted from the position shown in WRITE DATA in FIG. 20D to the position of READ DATA in the dame figure. It is therefore possible to shift the image as desired in the direction of the main scan as shown in FIGS. 20E, 20F and 20G, by varying the positions and durations of the signals AWE (and BWE) and ARE (and BRE). This shifting of image can be combined by the aforementioned magnification control which is effected by selectively using the clocks produced by thinning and the clocks without thinning as the writing and reading clocks WCK and RCK, whereby shifting of image in combination with a change in the magnification can be conducted easily. The signals AWE, ARE, BWE and BRE which are input to this circuit are generated by the area generating circuit in FIG. 17D as described before.

Edge Stressing and Smoothing

Figures 21A, 21B:
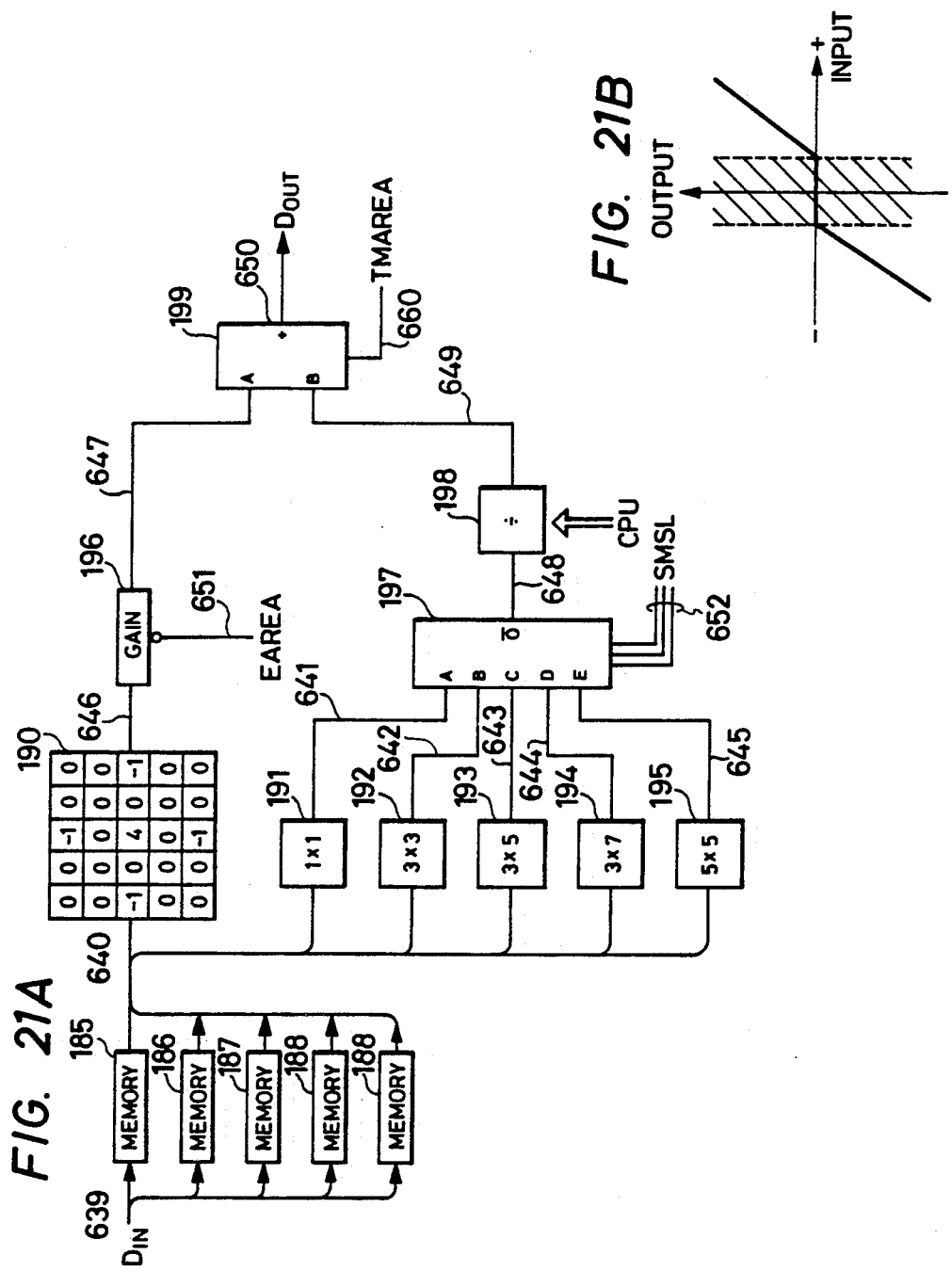
FIGS. 21A, 21B, 21C, 21D, 21E, 21F and 21G are illustrations of edge stressing and smoothing processings.
Figure 21C:
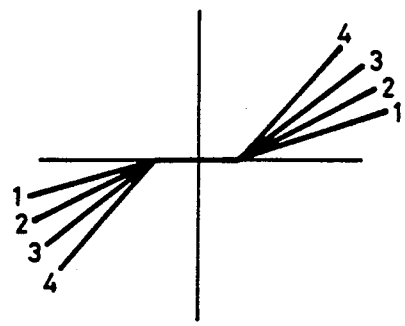
Figure 21D:
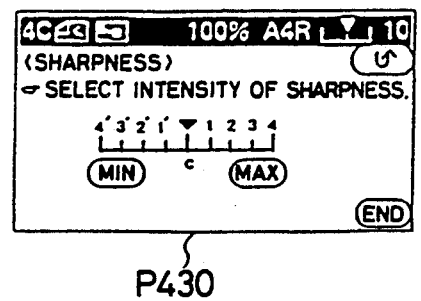

After the magnification control in the direction of the main scan conducted in the manner described above, the stressing (emphasizing) and smoothing operations are executed in a manner which will be described hereinunder with reference to FIGS. 21A to 21G. FIG. 21A is a block diagram of a circuit which performs the edge stressing and smoothing operations. Each of memories 185 to 189 has a capacity corresponding to one line of main scan. These memories are arranged as a FiFo type memory which is capable of cyclically storing data corresponding to five main scan lines and capable of outputting the stored data in a parallel manner. A reference numeral 190 designates a quadratic differentiation spatial filter which is used ordinarily. Upon detection of an edge component, this filter produces an output 646 which is gain-controlled by a characteristic shown by 196 in FIG. 21B. The hatched region in FIG. 21B is clamped at "0" level so as to remove smaller components of the edge stressing outputs, i.e., noise components. The buffer memory output corresponding to five lines is input to smoothing circuits 191 to 196 each of which is capable of computing averages on the basis of five sizes of pixel block from $1 \times 1$ to $5 \times 5$, thereby outputting smoothed outputs 641 to 645. Then, a selector 197 selects the desired one of the smoothed outputs 641 to 645. An SMSL signal 651 is output from the I/O port of the CPU 22 and is controlled in relation to the appointment given through the control panel, as will be explained later. A reference numeral 198 designates a divider. For instance, when the selected smoothing block size is $3 \times 5$, the CPU sets "15" in the divider 198, whereas, when the selected smoothing size is $3 \times 7$, the CPU sets "21" in the divider 198, thereby effecting the smoothing on the basis of the selected block size.

Figure 21E:
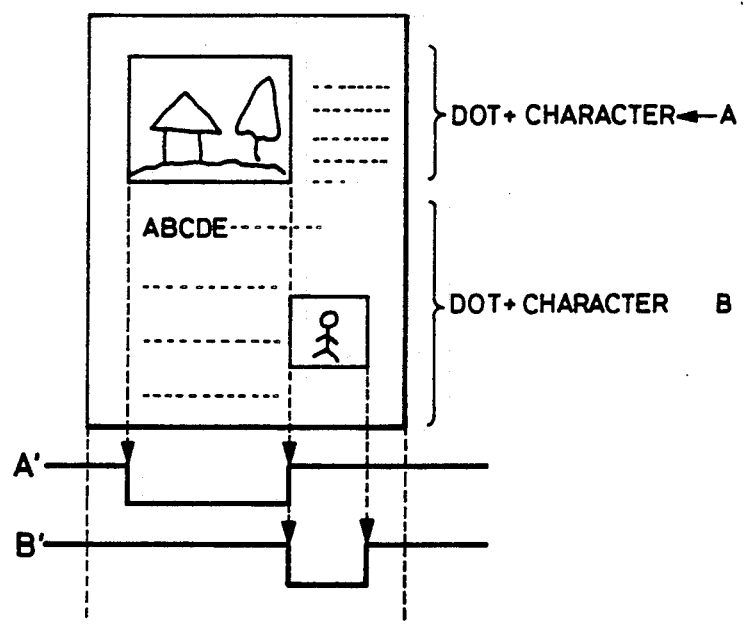
Figure 21F:
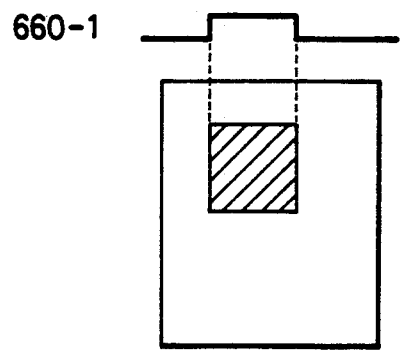
Figure 21G:
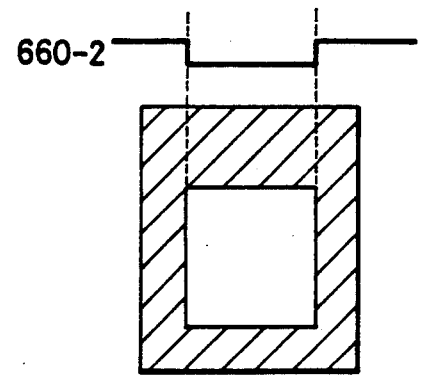

A gain circuit 196 is constituted by a look-up table LUT which is a RAM into which data is written by the CPU 22 as is the case of the gamma circuit shown in FIG. 19A. When the input EAREA 652 is set to "Lo", the gain circuit 196 produces an output "0". The edge stressing control and the smoothing control described hereinabove are related to the liquid-crystal touch panel on the control panel. More specifically, as the operator operates the touch panel to increaser the <SHARPNESS> from 1 to 2, from 2 to 3 from 3 to 4 and so forth on the picture frame of FIG. 21D (P 430 in FIG. 2-7), the conversion characteristic of the gain circuit is rewritten by the CPU 22 in a manner shown in FIG. 21C. Conversely, when the touch panel is operated by the operator to reduce the <SHARPNESS> as from 1' to 2', from 2' to 3', from 3' to 4' and so forth, the smoothing block size is progressively increased as from $3 \times 3$ to $3 \times 5$, from $3 \times 5$ to $3 \times 7$, from $3 \times 7$ to $5 \times 5$ and so forth, in accordance with the switching signal SMSL of the selector 197. The block size $1 \times 1$ is selected at the center point C, so that the gain circuit input EAREA 651 is set as EAREA 651="Lo", so that the input Din is directly output as the output Dout of the adder 199, without being subjected to smoothing and edge-stressing. Any influence of moire generated when, for example, a halftone original image is read is suppressed by the smoothing operation, while the sharpness of characters and lines is improved by the edge-stressing. In general, however, elimination of influence of moire and improvement in the sharpness are incompatible because the former essentially requires smoothing at a cost of reduced sharpness of characters and lines, while the latter essentially requires edge stressing which strengthens the moire. The described embodiment overcomes this problem as follows. Namely, the smoothing block size $3 \times 5$ is selected by the signal SMSL 652 through controlling the signals EAREA 651 and SMSL 652 generated in the area generating circuit shown in FIG. 17D, so that areas A' and B' are generated by the EAREA 651 as shown in FIG. 21E. When these areas are applied to the reading of an original which has both a half-tone image and character image, the influence of moire is reduced in the half dot region of the original image while the sharpness is improved in the character image portion of the original image. A signal TMAREA 660 is generated by the area generating circuit 51 as in the case of the EAREA 651. When the signal TMAREA is set as TMAREA="1", the output Dout is obtained as Dout="A+B", whereas, when the signal TMAREA is set as TMAREA="0", the output Dout is obtained as Dout="0". Therefore, by forming a signal 660-1 (FIG. 21F) through suitable control of the signal TMAREA 660, it is possible to conduct a trimming by extracting the hatched area within the rectangle. Similarly, by forming a signal 660-2 as shown in FIG. 21G, it is possible to trim the hatched area outside the rectangle, i.e., white blanking of the area within the rectangle.

Referring to FIG. 22, a reference numeral 200 denotes an original coordinates recognition circuit capable of recognizing coordinates of four corners of the original placed on the original table. The coordinates are stored in an internal register which is not shown, and are read by the CPU 22 after a pre-scan which is conducted for recognizing the position of the original. This circuit is not described in detail because it is disclosed in the specification of the United States Patent Application Ser. No. 946,093. In the pre-scan for the recognition of the original position, the black level correction and the white level correction explained with reference to FIGS. 10 and 11A are conducted and masking computation coefficients $k_1$, $l_1$, $m_1$ for the monochrome image data are selected. At the same time, the signal UAREA 565 is set to "Lo" so as not to effect the UCR operation. In consequence, a monochrome video data is input as the original position data into the original position recognition circuit 200.

Control Panel

FIG. 22 shows the control panel, particularly a portion for controlling the liquid crystal display and a key matrix. This control panel is operated in accordance with instructions given through the CPU BUS 508 (see FIG. 5) to the I/O port 206 for controlling the liquid crystal controller 201 (see FIG. 22) and for controlling the key matrix 209 which is used for key-input and touch-key-input. Fonts to be displayed on the liquid crystal display are stored in a FONT ROM 205 and are transferred as desired to a refresh RAM 204 in accordance with a program in the CPU 22. The liquid crystal controller delivers display picture data to the liquid crystal display 203 through the liquid crystal driver 202, thereby presenting the desired picture on the display. On the other hand, all the key-inputs are controlled by the I/O port 206. When a key is pressed, an ordinary key scanning operation is executed to detect the pressed key and the data concerning this key is input to the CPU 22 through the receiver 208 via the I/O port.

Operation of Apparatus When Used Together With Projector

Figure 23:
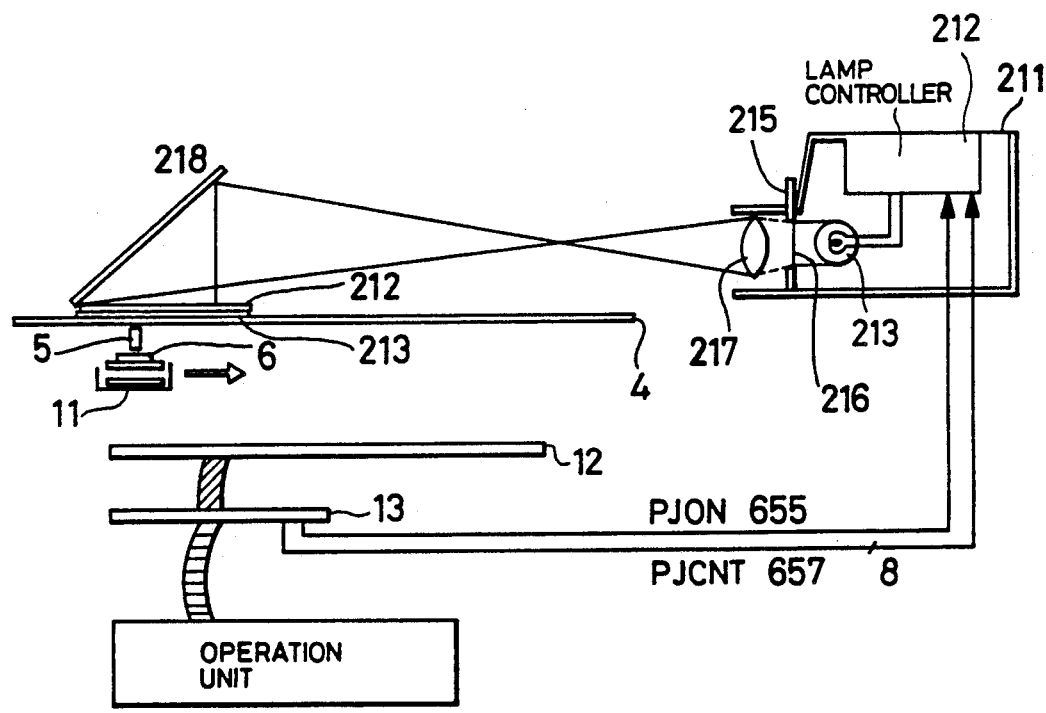
FIG. 23 is an illustration of a film projector.

FIG. 23 shows an arrangement in which a film projector 211 is mounted on and connected to the system of the invention shown in FIG. 1. Thus, the same reference numerals are used in this figure to denote the same parts or members as those in FIG. 1. A mirror unit composed of a reflecting mirror 218, Fresnel lens 212 and a diffusion plate 213 is placed on the original table 4. The image of light projected by a film projector 211 and transmitted through a film 216 is scanned by the original scanning unit in the direction of the arrow so that the light image is read in the same manner as the reflective original image. The film 216 is fixed in a film holder 215, while the lamp 212 is turned on and off by a lamp controller 212 in accordance with signals PJON 655 and PJCNT 657 input through the I/O port of the CPU 22 (see FIG. 2) in the controller 13. As will be seen from FIG. 24, the lamp lighting voltage is determined by the lamp controller 212 in accordance with the 8-bit input PJCNT 657. Usually, the lamp lighting voltage is set within a range between Vmin and Vmax. Digital data of the input in this state are represented by $D_A$ to $D_B$. FIG. 25A shows the flow for reading an image from the film projector, while FIG. 25B schematically shows the timing chart. In Step S 1, the operator sets the film 216 in the film projector 211. Then, the lamp lighting voltage Vexp is determined through later-mentioned shading correction (Step S 2) and AE (Step S3) in accordance with a procedure input from the control panel in a manner explained later. Then, the printer 2 is started up in Step S 4. Prior to the signal ITOP (image leading end synchronizing signal) transmitted from the printer, the signal PJCNT is set at a level Dexp which is a voltage corresponding to the optimum exposure, whereby the light quantity is optimized and stabilized when the image is formed. Then, a Y image is formed in accordance with the signal ITOP and the light is kept on with reduced intensity by DA corresponding to the minimum exposure voltage till the next exposure. Since the lamp is kept on, any deterioration of the filament which otherwise may be caused by rush current when the lamp is turned on is suppressed so as to ensure a longer life of the filament. Subsequently, M image, C image and black image are formed in the same manner as the Y image in Steps S7 through S 12. Thereafter, the signal PJCNT is set to "00" thereby turning the lamp off.

Procedure of AE and Shading Correction Under Use of Projector

Figure 29B:
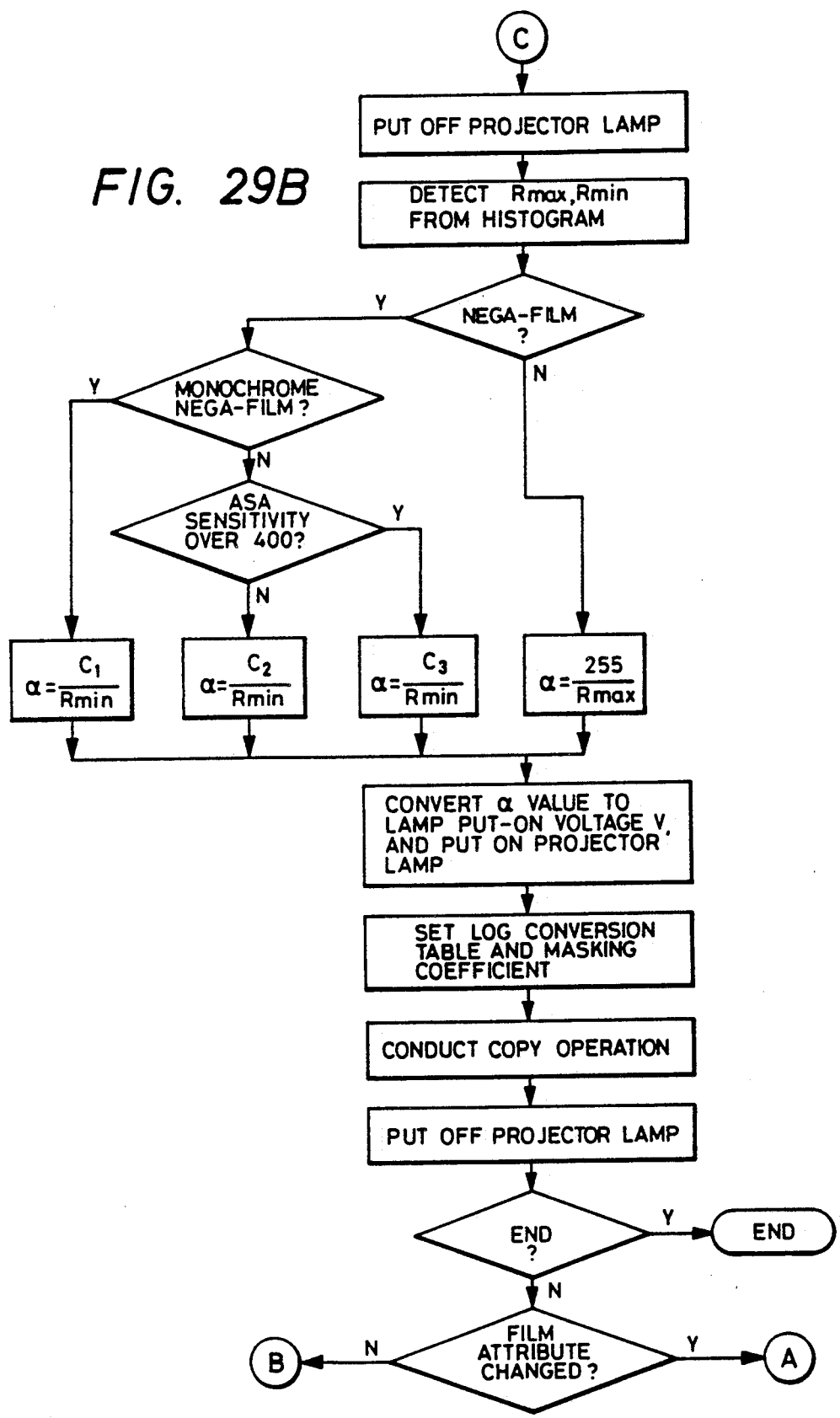

A description will be made hereinunder as to the AE and shading correction in the projector mode of operation of the system, with specific reference to FIGS. 29A and 29B. The operator selects the projector mode through the control panel. The operator then detects the type of the film used, e.g., whether the film is a positive film or a negative film or whether the film is a color positive film, monochrome negative film or a monochrome positive film. When the film is a color negative film, the operator sets on the projector a film carrier 1 with a cyan color correction filters and fixes the unexposed portion (film base) of the film in the film holder. Then, a judgment is conducted as to whether the ASA value of the film is not below 100 and less than 400 or not below 400, and then presses a shading start button, so that the projector lamp is turned on at the standard .. lighting voltage $V_1$. The orange base portion of the color negative film is cut by the cyan filter so that the color balance of the color sensor having R, G and B filters is adjusted. According to this embodiment, the shading data is picked up from the unexposed portion of the film so that a wide dynamic range is obtained even when the film is a negative film. When the film is of a type other than the color negative film, the operator presses the shading start key on the liquid crystal touch panel after setting a film carrier 2 with an ND filter or without any filter. In consequence, the projector lamp lights up at a standard lighting voltage $V_2$. The arrangement may be such that the switching between the lighting voltages $V_1$ and $V_2$ can be conducted automatically upon recognition of the type of the film carrier in response to the discrimination by the operator between negative and positive films. Subsequently, the scanner unit is moved to the central portion of the area where the image is projected. In this state, mean values of the R, G and B color datas over a single or a plurality of lines of scan by the CCD are input to and stored in the RAM 78' (see FIG. 11A) as the shading data. The projector lamp is then turned off.

Subsequently, the film which carries the image to be copied is set in the film holder 215. If any focusing operation is necessary, the image is focused through a visual observation after turning the projector lamp on. The operator turns this lamp off after the image has been satisfactorily focused.

Figure 25A:
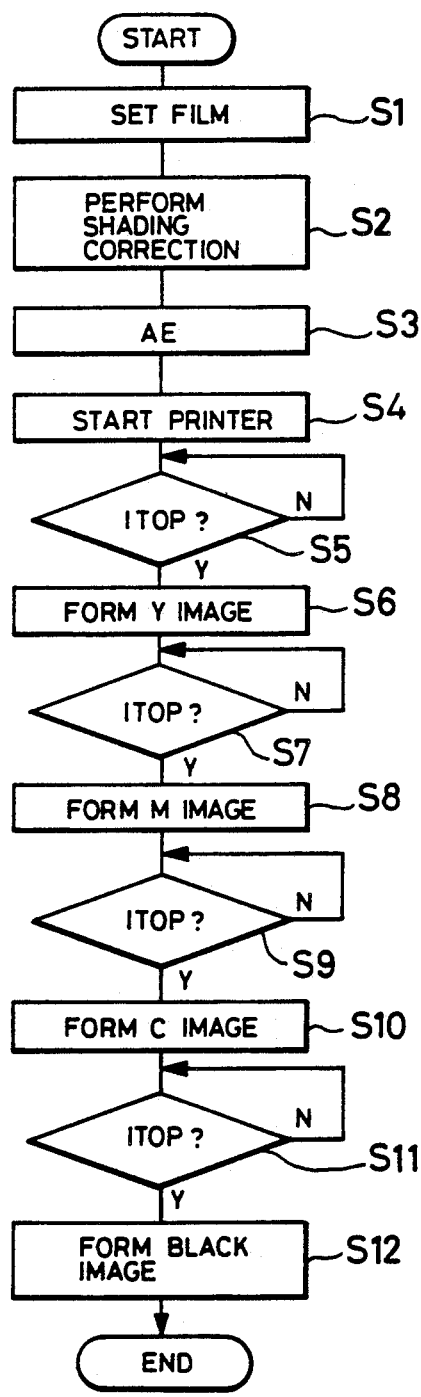
FIGS. 25A, 25B and 25C are illustrations of the manner in which the film projector is used.
Figure 25B:
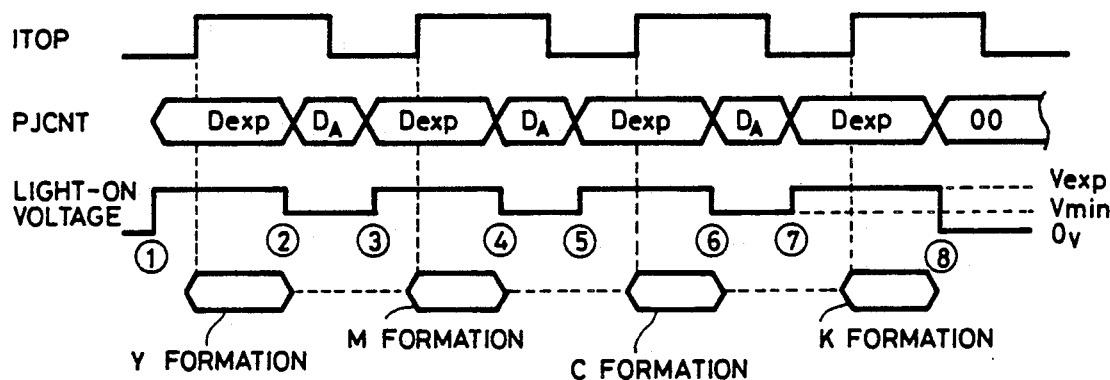
Figure 25C:
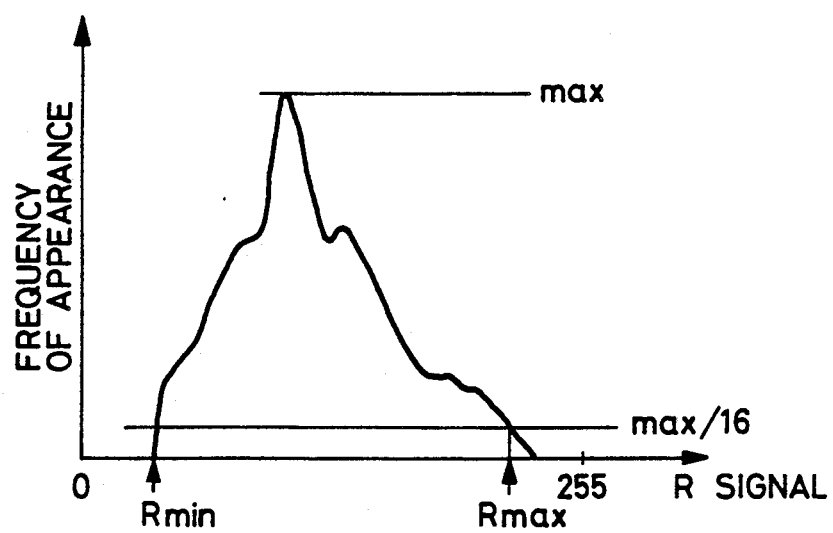

When a copy button is turned on, the projector lamp is automatically turned on or off either at the voltage $V_1$ or the voltage $V_2$ in accordance with the result of the judgment as to whether the film is a color negative film or not, followed by a pre-scan (AE) of the area where the image is projected. The pre-scan is conducted for the purpose of judging the level of the photographing exposure, and is conducted in accordance with the following procedure. As the first step, R signals from predetermined lines in the area where the image is projected are input by means of the CCD, and the correlation between the R signals and frequency of appearance are accumulated so as to form a histogram as shown in FIG. 25C. (see "histogram forming mode" in FIG. 11) The max value shown in the figure is determined from this histogram, and the maximum and minimum R signal values $R_{max}$ and $R_{min}$ are determined as points where the histogram crosses the level which is 1/16 of the max value. Subsequently, a lamp light-quantity multiplication factor $\beta$ is computed in accordance with the type of the film initially selected by the operator. The value $\beta$ is computed as $\beta=255/R_{max}$ for a color or monochrome positive film, $\beta=C_1/Rmin$ for a monochrome negative film, and $\beta=C_2/Rmin$ for a color negative film having an ASA value below 400 and $\beta=C_3/Rmin$ for a color negative film having an ASA value not smaller than 400. Coefficients $C_1$, $C_2$ and $C_3$ are beforehand determined in accordance with the gamma characteristic of the film. These coefficients can take any value from among 255 values, though usually they fall within a range between 40 and 50. Thus, the $\beta$ value can be converted through a predetermined look-up table into an output data to be delivered to the variable voltage source of the projector lamp. The projector lamp is then turned on with the thus determined lamp lighting voltage V, and one of the logarithmic conversion table (see FIG. 5) is selected in accordance with the type of the film. At the same time, the masking coefficients of the color correction circuit (see FIG. 5) are set suitably so as to match for the type of the film. Thereafter, copying operation is executed in an ordinary manner so as to copy the light image projected by the projector. As will be seen from FIG. 13A, logarithmic conversion table is selectable from eight tables 1 to 8 in accordance with a 3-bit change-over signal. For instance, a logarithmic conversion table 1 is used for reflective originals, table 2 is used for color positive films, table 3 is used for monochrome positive films, table 4 is used for color negative films having ASA values below 400, table 5 is used for color negative films having ASA values not smaller than 400 and table 6 is used for monochrome negative film. The content of each table can be revised for each of colors independently. FIG. 13B shows an example of the content of the table shown in FIG. 13A. In this figure, axis of ab.scissa represents the input while the axis of ordinate represents the output.

The copying operation is thus completed. Before commencing the copying of a next film, the operator judges whether any change exists between the preceding film and the next film in regard to the nature of the film, e.g., negative or positive, color or monochrome, and so forth. When there is any change, the process returns Ⓐ in FIG. 29A. Conversely, when there is no change, the process returns to Ⓑ and, thereafter, the described copying operation is executed.

It is thus possible to obtain, in the projector mode of operation of the system, a print output corresponding to the type of the film set in the film projector 211, e.g., a negative film, a positive film, a color film and a monochrome film. As will be understood from FIG. 23, in the described system, the image of the film is projected on the original table through magnification of the image size. Usually, image projected through a film contains only a small character portion. In addition, it is usually necessary that the reproduction be made with smooth change of gradation. In this system, therefore, the gradation processing conducted at at the output side of the color LBP in the projector mode is modified from that executed in printing of image from an ordinary reflective original. This gradation processing is performed by a PWM circuit 778 in a printer controller 700.

PWM Circuit

Figure 26A:
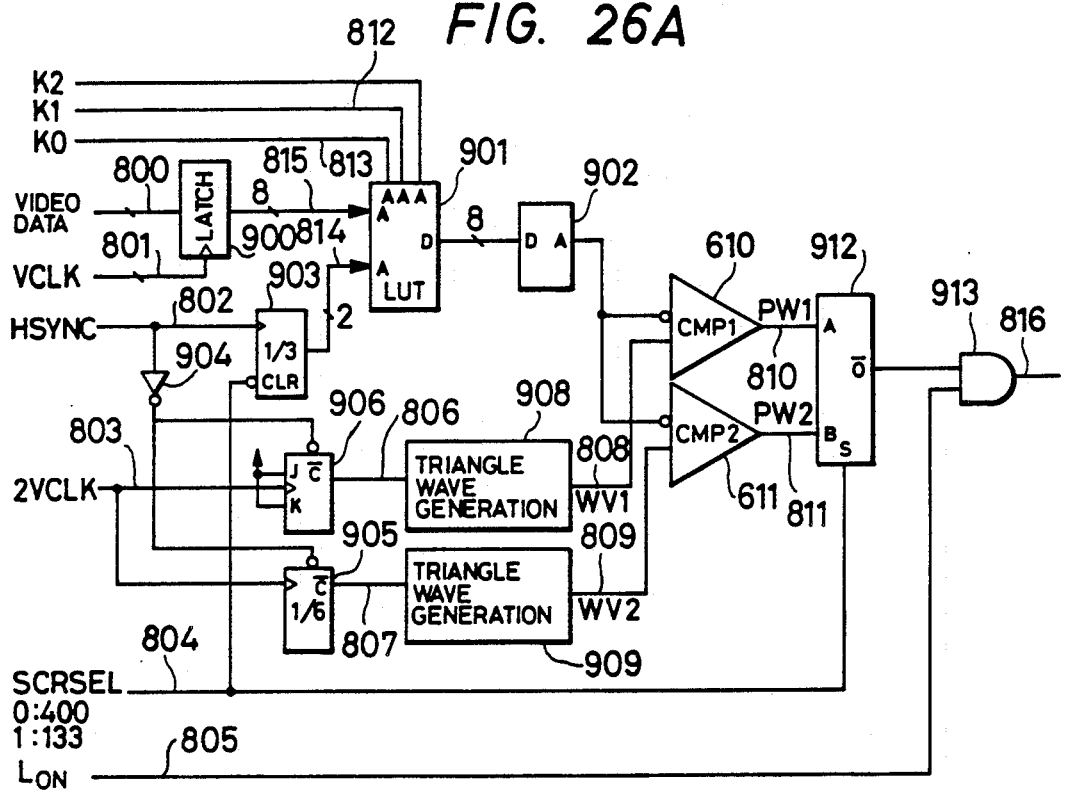
FIGS. 26A, 26B and 26C are illustrations of the construction and operation of a PWM circuit.
Figure 26B:
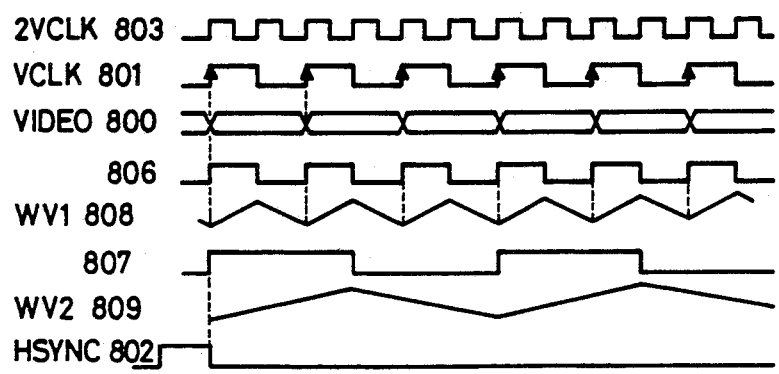

FIG. 26A shows a block diagram of the PWM circuit, while FIG. 26B shows a timing chart.

The VIDEO DATA 800 input to this circuit is latched by a latch circuit 900 at a timing on current with the rise of the clock VCLK 801 so as to be synchronized with this clock, (see 800 and 801 in FIG. 26B) The VIDEO DATA 815 output from the latch circuit is subjected to a gradation correction which is effected by an LUT (look-up table) constituted by a ROM or a RAM, followed by a D/A (digital-to-analog) conversion performed by a D/A converter 902, whereby a single analog video signal is formed. The thus formed analog video signal is input to comparators 910 and 911 of the next stage so as to be compared with triangular waves signals 808, 809 which are received by other inputs of these comparators and generated independently in synchronization with the clock VCLK.

Figure 26C:
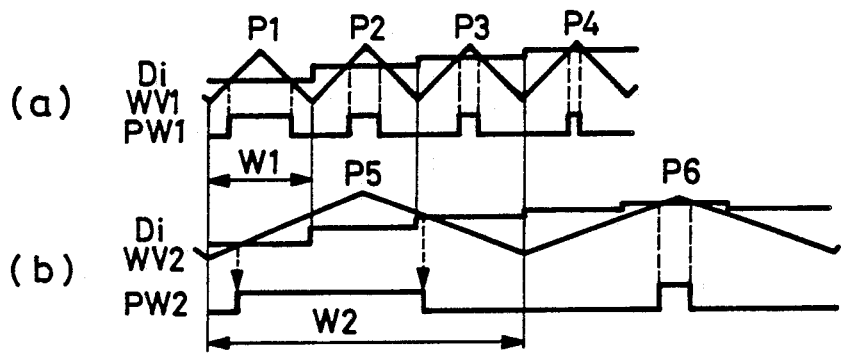

More specifically, a synchronizing clock 2VCLK 803 is formed by doubling the frequency of the clock VCLK 801. One of the above-mentioned triangular wave signals is a signal WV1 which is generated by a triangular wave generating circuit 908 in accordance with the triangular wave generation reference signal 806 which in turn is obtained by demultiplying the synchronizing clock 2VCLK 803 by two by means of the J=K flip-flop 906. The other triangular wave signal is a signal WV2 which is generated by a triangular wave generating circuit 909 in accordance with a signal 807 (see 807 in FIG. 26B) which in turn is obtained through demultiplication of the synchronizing clock 2VCLK into 1/6 by a 1/6 demultiplier circuit 905. Thus, both triangular wave signals and the VIDEO DATA are generated in synchronization with the clock VCLK, as will be seen from FIG. 26B Furthermore, the circuits 905 and 906 are initialized by a signal HSYNC 802 which is generated in synchronization with the clock VCLK, so that the triangular wave signals and the VIDEO DATA are synchronized by the signal HSYNC 802. In consequence, signals of pulse widths as shown in FIG. 26C are obtained at the outputs 810 and 811 of CMP 1 910 and CMP 2 911, in accordance with the value of the input VIDEO DATA 800. More specifically, in this system, the laser is turned on when the level of the output from the AND gate 913 shown in FIG. 26A is "1", so that dots are printed on the print paper. Conversely, when the output of the gate 913 is "0", the laser is not turned on so that no printing is conducted on the print paper. It is therefore possible to control the turning off of the lamp by the control signal LON 805. FIG. 26C shows the manner in which the level of the video signal D is changed from "black" to "white" from the left-hand side to the right-hand side. The "white" and "back" are input to the PWM circuit as "FF" and "00", respectively, so that the output of the D/A converter 902 is changed as indicated by $D_i$ in FIG. 26C. In contrast, the triangular wave signal is the signal WV1 in (a) and WV2 in (b), so that the width of the output pulse from each of the comparators CMP1 and CMP2 is progressively decreased as indicated by PW1 and PW2, as the video signal level shifts from "black" to "white". As will be seen from this figure, when PW1 is selected, the dots on the print paper are formed at a pitch aS expressed by $P_1$, $P_2$, $P_3$ and $P_4$. Thus, the variance of the pulse width has a dynamic range of W1. On the other hand, when PW2 has been selected, the dots are formed at a pitch expressed by P5 and P6. In this case, the dynamic range of pulse width is W2 which is about three times as large as that of PW1. For instance, the printing density (resolution) is about 400 lines/inch when PW1 has been selected and about 133 lines/inch when PW2 has been selected. As will be clearly understood from this fact, when PW1 is selected, the resolution can be increased by about three times as compared with that obtained when PW2 is selected. Conversely, when PW2 has been selected, the gradation is remarkably improved because this signal PW2 has a dynamic range of pulse width which is about three times as large as that provided by the signal PW1. In this embodiment, therefore, a selecting input signal SCRSEL 804 is given from an external circuit so as to select the signal PW1 when a high resolution is desired and to select the signal PW2 when a high level of gradation characteristic is to be obtained. More specifically, referring to FIG. 26A, a selector 912 selects the "A" input when the level of the signal SCRSEL 804 is "0" so that the signal PW1 is output from the output terminal O. Conversely, when the level of the signal SCRSEL 804 is "1", the signal PW2 is output from the output terminal O. In consequence, the laser lights up for the period corresponding to the finally obtained pulse width, thereby printing dots.

The LUT 901 constituted by a table conversion ROM used for the purpose of correcting the gradation is adapted to receive the $K_1$ and $K_2$ data 812, 813, a table changing signal 814 and a video signal 815, and produces a corrected VIDEO DATA through and delivers the same through its output. For instance, when the signal SCRSEL 804 is set at "0" so as to select PW1, all the outputs from a ternary counter 903 are set to "0". thereby enabling the correction table for the signal PW1 from among the tables stored in the LUT 901. The data $K_0$, $K_1$ and $K_2$ are changed in accordance with the color of the signal to be output. For instance, when the data $K_0$, $K_1$ and $K_2$ are set as "0, 0, 0,", an yellow color output is obtained. Similarly, magenta color output, cyan color output and black color output are obtained by setting the data $K_0$, $K_1$ and $K_2$ are set as "0, 1, 0,", "1, 0, 0," and "1, 1, 0,", respectively. Thus, the gradation correction characteristic is changed depending on the color in which the print is to be made, thereby compensating for any variation in the gradation characteristics attributable to variation in the image reproducing characteristic according to colors to be printed by the laser beam printer. Then, the signal SCRSEL is set at "1" in order to select the signal PW2. As a result, the ternary counter 603 counts the number of the synchronizing signals of the line so as to output a signal "1→2→3" and "1→2→3" to the address 814 of the UT. This operation enables the gradation correction table to be changed according to line, so that the gradation characteristic is further improved.

Figure 27A:
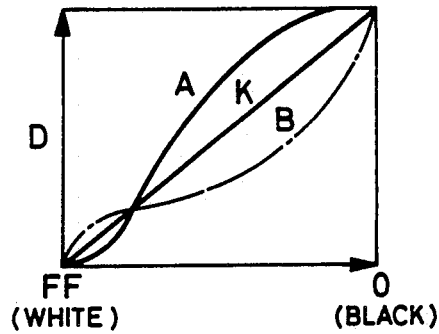
FIGS. 27A and 27B are illustrations of gradation correction characteristics.
Figure 27B:
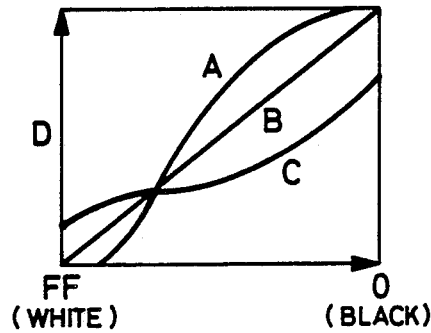

This operation will be described in more detail with reference to FIG. 27A onwards. In FIG. 27A, a curve A represents input-data vs print density characteristic as obtained when the input data is changed from "FF" (white) to "0" (black) after selecting PW1. As a standard, the characteristic K is preferably selected. Therefore, a characteristic B which is formed by inverting the characteristic A is set in the gradation correction table. In FIG. 27B, curves A, B and C represent, respectively, gradation correction characteristics for each line as employed when the signal PW2 has been selected. Thus, the pulse width is variable in the direction of the main scan (direction of scan by laser beam) by the use of the triangular wave signal, and the gradation is changeable in three stages in the direction of sub scan (direction of feed of image), whereby the gradation characteristic is further improved. More specifically, the characteristic A becomes dominant in the region where the change in the density is steep so as to reproduce the image with a steep gradation. The gradation characteristic C is used for reproducing the image with a gentle gradation. The characteristic B is an intermediate one which effectively reproduces the gradation in the region where the density of image is changed at a medium rate.

Figure 28A:
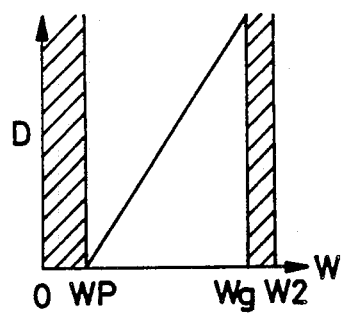
FIGS. 28A and 28B are illustrations of the relationship between triangular waves and laser lighting time.
Figure 28B:
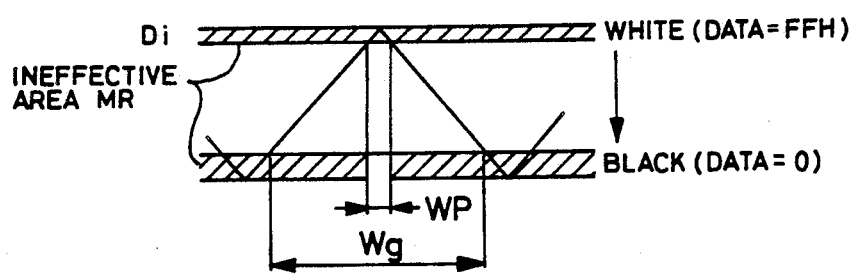

Thus, in the embodiment, the gradation of a certain level is ensured even when the signal PW1 has been selected, and a further improvement in the gradation characteristic is obtainable by the use of the signal PW2. Ideally, the pulse width W is selected to meet the condition of $0 \leq W \leq W2$. Actually, however, there is a range ($0 \leq W \leq wp$ in FIG. 28) where dots cannot be printed, i.e., the printer does not respond, when the pulse width is reduced below a predetermined value, as well as a region ($wq \leq W \leq W2$ in FIG. 28) in which the density is saturated. The presence of these regions are inevitable due to the electrophotographic characteristic of the laser beam printer and the response characteristic of the laser driving circuit. In this embodiment, therefore, an adjustment is done such that the pulse width varies within a valid region represented by $wp \leq W \leq wq$ in which the pulse width and the density have linear changing characteristics. That is, when the level of the input data as shown in FIG. 28B is changed from "0" (black) to FFH (white), the pulse width is changed from wp to wq, whereby the linearity of the relationship between the input data and the density is ensured.

The video signal thus converted into pulse width is supplied through a line 224 to the laser driver 711L thereby modulating the laser beam LB.

The signals $K_0$, $K_1$, $K_2$, SCRSEL and LON shown in FIG. 26A are output from a control circuit (not shown) in the printer controller 700 shown in FIG. 2, and are output in accordance with the aforesaid serial communication between the reader unit 1 and the printer unit 2. The signal SCRSEL is set at "0" and "1", respectively, in the reflective original mode and in the film projector mode of operation of the system, thereby ensuring a higher smoothness of the gradation.

Image Forming Operation

Figure 30:
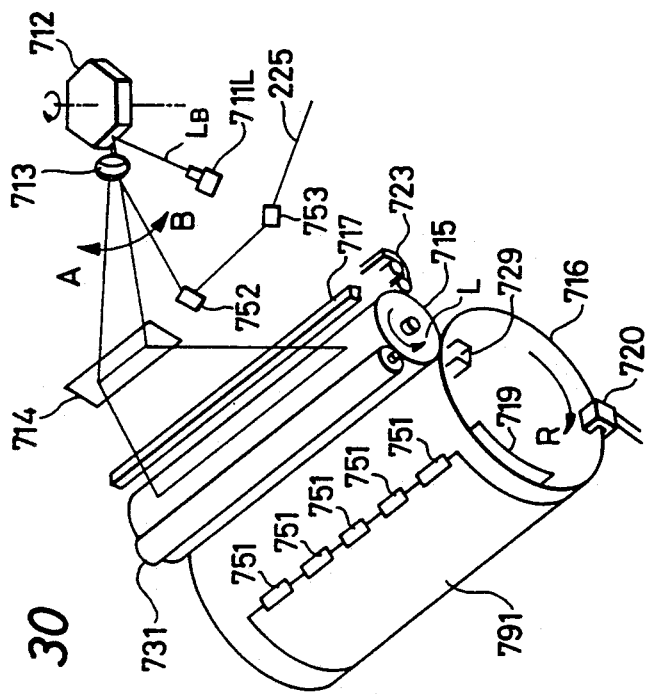
FIG. 30 is a perspective view of a laser printer unit.

The laser beam LB modulated in accordance with the image data is reflected by the polygon mirror 712 which rotates at a high speed, thereby conducting a high-speed scanning in the horizontal direction over a width represented by arrows A-B in FIG. 30. The laser beam is focused on the surface of the photosensitive drum 715 through the $f/\theta$ lens 13 and the mirror 714, thereby to effect dot exposure corresponding to the video data. One horizontal scan of the laser beam corresponds to one horizontal scan on the original image. In the described embodiment, this corresponds to the width of 1/16 mm in the feeding direction (sub-scan direction).

Meanwhile, the photosensitive drum 715 rotates at a constant speed in the direction of an arrow L in FIG. 30. Therefore, the main scanning on the surface of the drum 715 is effected by the oscillation of the laser beam in the horizontal direction, while the scanning in the direction of sub-scan is effected by the rotation of the drum 715 at the constant speed, whereby a planar image is successively exposed to form a latent image. The photosensitive drum is uniformly charged by a charger 717 in advance of the exposure. Thus, a developing process includes a series of steps including the uniform charging of the photosensitive drum 715, exposure of the photosensitive drum 715, and toner development by the developing sleeve 731. For instance, if the development is conducted with yellow toner from the developing sleeve 731Y in response to the first exposure scanning by the color reader, a toner image corresponding to the yellow component of the original 3 is formed on the photosensitive drum 715.

Subsequently, the yellow toner image is transferred from the photosensitive drum 715 to a copy paper 791 which is wound on a transfer drum 716 with its leading edge gripped by a gripper 751, by means of a transfer charger 729 which is disposed at the area of contact between the photosensitive drum 715 and the transfer drum 716, whereby an yellow image is formed on the copy paper 791. This process is repeatedly conducted so as to successively form and transfer toner images in M (magenta), C(cyan) and Bk (black) colors. These color toner images are precisely superposed on the copy paper 791, whereby a full-color image is formed on the copy paper 791 by four color toners.

Subsequently, the copy paper 791 is separated from the transfer drum 716 by means of the movable separation claw 750 (see FIG. 1) and is conveyed to an image fixing section 743 by means of the conveyor belts 743, whereby the toner image on the copy paper 791 is fused and fixed onto the latter by heat and pressure applied by means of the heat-pressing rollers 744, 745.

Explanation of Control Section

Figure 31:
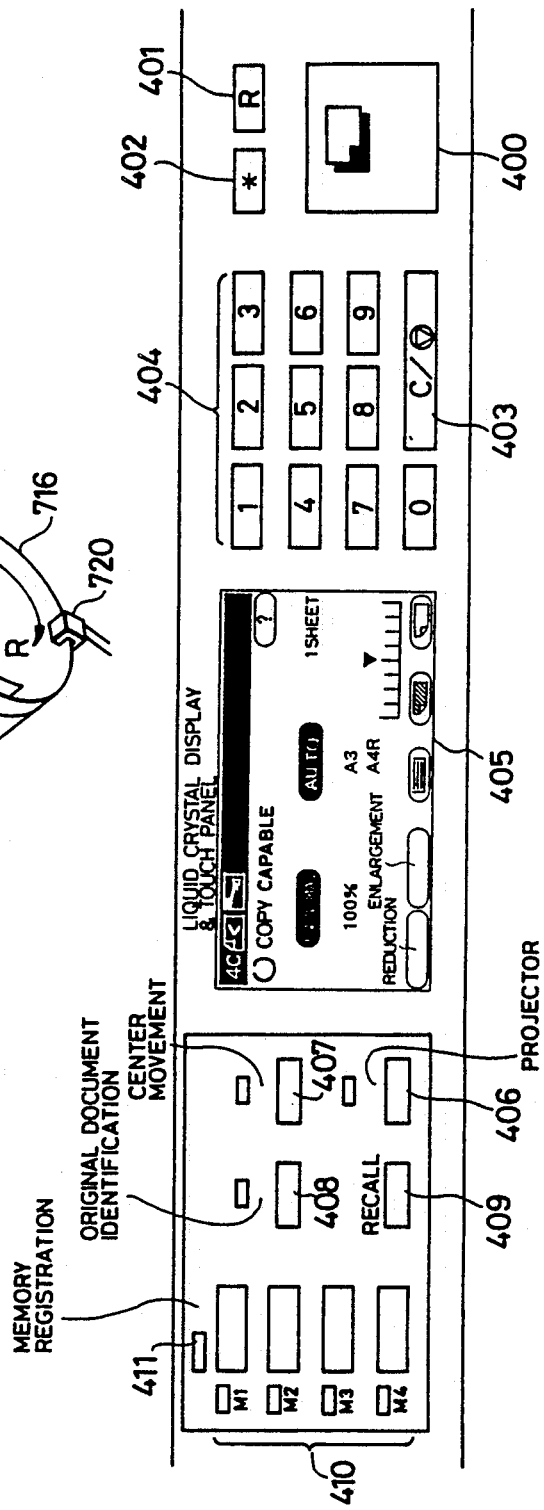
FIG. 31 is a top plan view of the operation unit.

FIG. 31 is an illustration of the control section of the color copying apparatus of the described embodiment. The control section 401 has various keys including a reset key 401 for resetting the operation mode to the standard mode, an enter key 402 for setting a later-mentioned registration mode or a later mentioned service mode, a ten-key device 404 for inputting numerical data such as the number of copies to be produced, a clear/-stop key for clearing remaining number of copies and stopping continuous copying operation, and keys 405 on the touch panel key for setting various modes and the state of the printer 2. A key 407 is a center shift key which is used for shifting an image to the central position in a later-mentioned shift mode. A key 408 is an original recognition key which is used for automatically detecting the size and position of the original in advance of the copying operation. A key 406 is a projector key which is used for appointing a later-mentioned projector mode. A key 409 is a recall key for recovering the conditions set for the preceding copying operation. A key 410 is a memory key for reading various set values programmed beforehand and for setting various values in memories (M1, M2, M3, M4). A key 411 is a registration key for allowing data to be registered in the respective memories.

Digitizer

Figure 32:
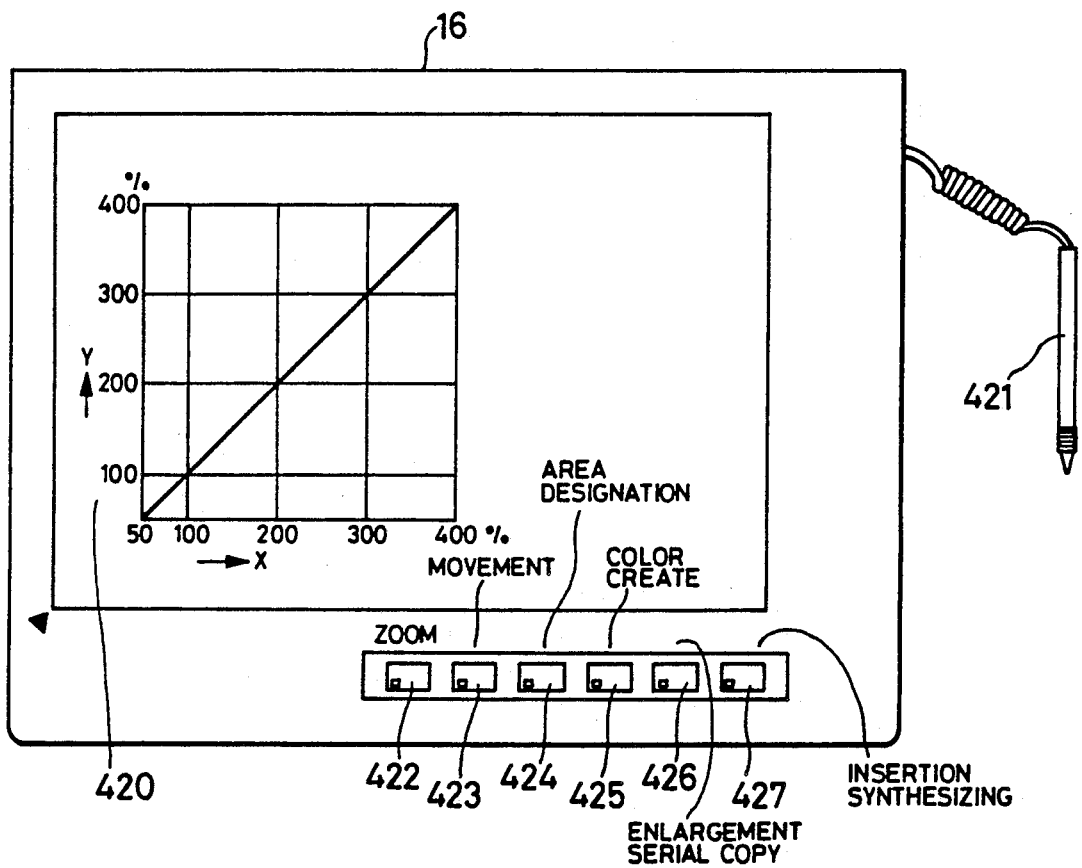
FIG. 32 is a top plan view of a digitizer.

FIG. 32 is a view schematically showing the appearance of the digitizer 16. The digitizer 16 has entry keys 422, 423, 424, 425, 426 and 427 for setting later mentioned operation modes. The digitizer 16 also has a coordinates detection plate 420 which is used in appointing any desired region on the original or in setting magnification. The appointment of the coordinates values is conducted by a point pen 421. The data input through these keys, as well as the coordinates data, are exchanged between the digitizer 16 and the CPU 22 through the BUS 505 and are stored in the RAM 24 and the RAM 25.

Explanation of Standard Picture

FIG. 33 illustrates a standard picture. The standard picture P000 is put on display when neither the copying operation nor the setting operation is conducted. This picture is presented for the purpose of enabling setting of various operation factors such as the magnification, selection of paper type and density control. The left lower corner portion of the picture is adapted for giving an instruction for effecting so-called real-form magnification changing operation. For instance, when a touch key a (contraction) is touched, the change in the size and the magnification are displayed as shown in the picture P010. Similarly, when a touch key b (enlargement) is touched, the size and the magnification are displayed as in the case of the contraction. In the copying apparatus of the described embodiment, the original image size can be increased in three stages and reduced also in three stages. The operator can reset the operation to the real size mode (100% magnification), by touching a touch key h(real size). The user can also select one of an upper cassette and a lower cassette by pressing a touch key c on the center of the display. It is also to set an APS (Automatic Paper Select) mode in which a cassette containing copy papers of a size which best matches for the original size is selected automatically. This mode can be selected by pressing a touch key d. Keys e and f on the right portion of the display are keys for controlling the density of the print image. Instructions given through these keys are valid even during copying. A touch key g is for displaying a picture which illustrates a guide menu explaining how to operate touch keys and how to operate the copier, as a guidance for the operator. The operator therefore can operate the system without difficulty, upon consultation with the display of this guide menu. The guide menu is provided not only for the standard picture but also for various operation modes for the purpose of explaining these modes. The states of setting of various modes are displayed on the black belt-like strip area on the top portion of the display, so as to enable the operator to confirm the states of setting of moves thereby to avoid any wrong operation. A message display area provided under the stripe portion displays the state of the color copier as shown in the picture P 020, as well as suitable messages for informing the operator of any erroneous operation. In order to give messages concerning jamming of paper and shortage of toners, the shape of the printer unit is displayed on the whole display area and a sign is displayed to visually indicate the portion of the printer where the jam is taking place, as well as which one of color toners is to be supplied.

Zooming Mode

The zooming (zoom magnification change) mode M 100 is a mode in which the image of the original is printed through suitably changing the size of the original. There are two types of zooming mode' one is a manual zooming mode M 110, while the other is an auto-zooming mode M 120.

When the manual zooming mode M 110 is selected, the magnification of the image is varied independently both in X direction (sub-scan direction) and Y direction (main scan direction) on 1% basis as desired, by means of an editor or the touch panel. The auto-zooming mode M 120 is a mode in which a suitable magnification is computed automatically in accordance with the size of the original image and the size of the selected copy paper. This auto-zooming mode M 120 can be realized in four forms including an X-Y independent auto-zooming mode, an X Y equal auto-zooming mode, X auto-zooming mode and Y auto zooming mode. When the X=Y independent auto-zooming mode is selected, magnifications are independently and automatically controlled both in X and Y directions such that the size of the original or the size of an appointed region on the original is deformed in conformity with the size of the selected copy paper. When the X-Y equal auto zooming mode is selected, the original image size is changed at the same magnification both in X and Y directions, the magnification being the smaller one of the results of the X-Y independent auto-zooming computation. The X auto-zooming mode and the Y auto-zooming mode are the modes in which the original image size is changed only in the X and Y directions, respectively.

The method of operating the apparatus in the zooming mode will be described hereinunder with reference to the display on the liquid crystal panel. When the user presses the zoom key 422 on the digitizer 16, the content of the display is changed to a picture P 100. If the user wishes to select the manual zooming mode, the user points the point of intersection of X and Y magnifications written on the coordinates detecting plate 420 on the editor 16, by means of the point pen 421. As a result, the display is changed to P 110 so that the appointed magnifications in X and Y directions are displayed. When a minute or fine adjustment of the displayed magnifications is necessary, the user presses one of up and down keys on the left and right sides of the touch key b, if the adjustment is necessary only in the X direction. When the fine adjustment is to be made at the same rate both in the X and Y directions, the user touches one of the keys on the left and right sides of the touch key d, so that the image size is increased or decreased at the same rate both in the X and Y directions.

When the user wishes to select the auto-zooming mode, he can appoint this mode by means of the digitizer 16 in the same manner as that described before when the picture P 100 is on the display, or proceeds the display to the picture P 100 by pressing the touch key a. The four forms of the auto-zooming mode also are selectable through key operation. For instance, the X-Y independent auto-zooming mode is appointed when the use presses both the touch key b and c simultaneously, while the X-Y equal auto-zooming mode is selectable by pressing of the touch key d. The X auto-zooming mode and the Y auto-zooming mode are appointed by pressing the touch keys b and c, respectively.

Shift Mode

The shift (movement) mode M 200 includes four types of modes: namely, a center shift mode M 210, a corner shift mode M 220, destination shift mode M 230 and a binding margin shift mode M 240. The center shift mode M 210 is a mode in which the image is shifted such that the image of the selected region on the original is printed on the center of the selected copy paper. The corner shift mode M 220 is a mode in which the whole original image or the image of a selected region in the original is moved to one of four corners of the copy paper. It is to be understood that this shift mode enables the image to move from an appointed corner, even when the size of the print image is larger than the size of the selected copy paper. The destined shift mode M 230 is a mode which enables the image of the whole original or the image of a selected region on the original to be moved to any desired destined position on the original. When the binding margin shift mode M 240 has been selected, the image is automatically moved such as to leave binding margins along left and right edges of the selected copy paper.

A description will be made hereinunder as to the practical manipulation or operation of the color copying apparatus of this embodiment, with specific reference to FIG. 35A. As the operator presses the shift key 423 on the digitizer 16, the content of the display is changed and a picture P 200 is put on display. This picture P 200 enables the use to select one from among the four forms of the shift mode explained before.

The center shift mode can be appointed simply by pressing the touch key a on the picture P 200. When the user wishes to select the corner shift mode, he presses the touch key b so that the display is changed to a picture P 230 which enables the user to select one of four corners. It is to be understood that the relationship between the direction with respect to the actual print paper and the direction on the picture P 230 is the same as that obtained by placing the selected paper cassette on the digitizer 16 without changing orientation of the cassette as shown in FIG. 35B. When the user wishes to select the destined shift mode, he presses the touch key c on the picture P 200 so that the display is changed to a picture P 210 on which the user can appoint the destination by means of the digitizer 16. In this state, the display is changed to a picture P 211 which has up/down keys for enabling the user to effect a fine adjustment of the destination. When the binding margin shift mode is to be selected, the user presses the touch key d on the picture P 200 and appoints the lengths of the margin by means of the up/down keys on the picture P 220.

Explanation of Area Appointing Mode

When the area appointing (area designation) mode M 300 has been selected, the user can appoint one or areas on the original. One of three modes, i.e., trimming mode M 310, masking mode M 320 and image separation mode M 330, can be adopted for each of the appointed areas. The trimming mode M 310 is a mode in which only the image portion within the appointed area is copied. The masking mode M 320 is a mode in which the copy is produced such that the appointed area is covered by a white blank. The image separation mode M 330 is further divided into a color mode M 331, a color conversion mode M 332, a paint mode M 333 and a color balance mode M 334. The operator can select any one of these four modes. When the color mode M 331 has been selected, the appointed area can be copied in any of nine colors: namely, 4-full-color 3-full-color, Y, M, C, Bk, RED, GREEN, and BLUE.

The free color mode M 335 makes it possible to select, within the designated or appointed area, a mono-color image in a color other than the seven mono-colors which have been registered beforehand.

The color conversion mode M 332 is a mode which conducts the copying operation while replacing a portion of the appointed area having a color falling within a predetermined density level with any other desired color.

When the paint mode M 333 has been selected, a copy is obtained in which the appointed area is uniformly "painted" with any desired color. The color balance mode M 334 is a mode which performs adjustments of densities of Y. M, C and Bk colors in the appointed area, thereby to produce a copy in which the appointed area is printed with a color balance (color tone) which is different from that of the image portions other than the appointed area.

A description will be made hereinunder as to the practical way for operating the apparatus in the area appointing mode M 300, with specific reference to FIG. 36. The user first presses the area appointing key 424 on the digitizer 16, so that the content of the liquid crystal display is changed to a picture P 300. The user places the original on the digitizer 16 and points the desired area by means of the point pen 421. When two points in the area are presses by the point pen 421, the content of the display is changed to a picture P 310. If the area has been appointed correctly, the user presses the touch key a on the picture P 310. Then, the user selects one of the trimming mode, masking mode and the image separation mode which are displayed in the picture P 310 and presses a key corresponding to the selected mode. If the trimming mode or the masking mode has been selected, the user presses the touch key a on the picture P 320 so that the process proceeds to a next step for appointing the area. On the other hand, if the mode selected on the picture P 320 is the image separation mode, the content of the display is changed to a picture P 330 which enables the use to select one from the four modes: namely, the color conversion mode, paint mode, color mode and the color balance mode. For instance, if the user wishes to print the image in the appointed area in 4-full-color consisting of Y. M. C and Bk, he presses the touch key a (color mode) on the picture P 330 so as to select the 4-full color mode from the nine color modes, thus completing the operation for appointing printing of the appointed area in 4-full-color.

If the user has pressed the key b on the picture P 330, the content of the display is changed to P 340 which enables the user to appoint a point in the appointed area having the color information which is to be converted by means of the point pen.

The color conversion is effected in accordance with this color information. The color range to be subjected to the color conversion can be varied as desired by means of a conversion range appointing key which is on the center of the picture P 341. The term "conversion range" is used to mean the range of the color information which is regarded as being the same as the color information of the appointed point. When a touch key b is pressed, the range of conversion is widened so that the conversion is effected to include also regions which have different density levels and hues. On the other hand, when a touch key c is pressed, the range of conversion is narrowed so that the conversion is effected to include only the region having the appointed density level and hue.

If this point is pointed correctly, the user presses the touch key a of the picture P 341, so that the display proceeds to a picture P 370. The picture P 370 is intended for allowing the user to appoint the color to which the color of the point appointed on the picture P 340 is to be converted i.e., the color to be obtained after the color conversion. In this case, the user can select one from four types of color, i.e., standard color, designated colors, registered colors and white, as the color after the conversion. When a standard color is to be selected as the color to be obtained after the conversion, the user presses the touch key a on the picture P 70 so as to appoint one of standard colors displayed on the picture P 390. These colors are: yellow, magenta, cyan, black, red, green and blue. Thus, the standard colors are color informations peculiar to the copying apparatus. In the illustrated embodiment, the standard colors have ratios as shown in FIG. 45 so that the print image is formed with a medium level of color density. It is, however, quite natural that the user wishes to increase or decrease the color density from the previously set density. In such a case, the user an appoint any desired density of the color after the conversion, by pressing a density appointing key on the center of the picture P 390.

If the user has pressed the key c (designated color) on the picture P 370, the content of the display is changed to a picture P 380. The user then appoints a point having a color information to be obtained after the conversion by means of the point pen, in the same manner as the appointment of the color coordinates of the color information before the conversion. If the user wishes to vary only the density without changing the color coordinates, he presses the density control key a on the center of the picture P 381 thereby to set the density of the color to be obtained after the conversion at any desired level.

When the desired color is not found on the original nor in the list of the standard colors, the user can effect the color conversion by making use of the color information which is registered through the process of the later-mentioned color registration mode. To this end, the user presses the touch key c on the picture P 370 and then presses the touch key of the No. corresponding to the color number to be used, from among the colors registered through the picture P 391. It is possible to change only the density of color without changing the ratios of the color components, also in this mode. When the touch key c (white) is pressed on the picture P 370, the effect same as that produced by the operation in the masking mode M 310.

When the user wishes to appoint the paint mode M 33 in the image separation mode M 330, he presses the touch key c on the picture P 330 so that the content of the display is changed to a picture P 370. Then, the painting color is appointed in the same manner as that of the procedure which is conducted in the color conversion mode M 332 after the display of the picture P 370.

When the user wishes to print only the appointed area in a desired color balance (color tone), he presses a touch key d (color balance), so that the content of the display is changed to a picture P 350 which enables the user to control the densities of color components, i.e., yellow, magenta, cyan and black, by means of an up-/down key. In the picture P 350, the states of appointment of the density levels are indicated by black bar graphs together with a gradation or scale.

When a touch key e is pressed on the picture P 330 so as to appoint the free color mode, the display is changed to a picture P 361 which enables the user to select whether an appointed color or a registered color is to be used as the color of the MONO color.

Namely, when the user has pressed the key a to select the appointed color, the display is changed to a picture P 362 and the user appoints, by means of the point pen, a point on the image to be copied having the desired monocolor information. The display then proceeds to a picture P 363. In this state, if the user wishes to effect a monocolor copying through varying only the density while maintaining the hue of the mono-color, he can select the free color mode and to obtain a copy of the desired density of the same hue, by pressing the density control key a on the picture P 363.

When an OK key b is pressed on the picture P 363, the display proceeds to a picture P 365. The use can input, by means of the point pen, the position of the reference color information which he wishes to convert into the same density as the density of the color information appointed through the picture P 362, whereby a free color mode is executed to produce a copy image of the desired density.

Conversely, when the user has pressed the touch key b to select the registered color, the display proceeds to a picture P 364 to enable the user to use the color information of the desired one of a plurality of registered colors. Conversion of the density alone, i.e., conversion without changing the hue, can be effected also in this case. As the OK key on the picture P 364 is pressed, the display proceeds to a picture P 365 which enables the user to select the free color mode in which the user can make the density of the standard color appointed on the picture P 365 coincide with the registered color appointed on the picture P 364.

Explanation of Color Creation Mode

Figure 41:
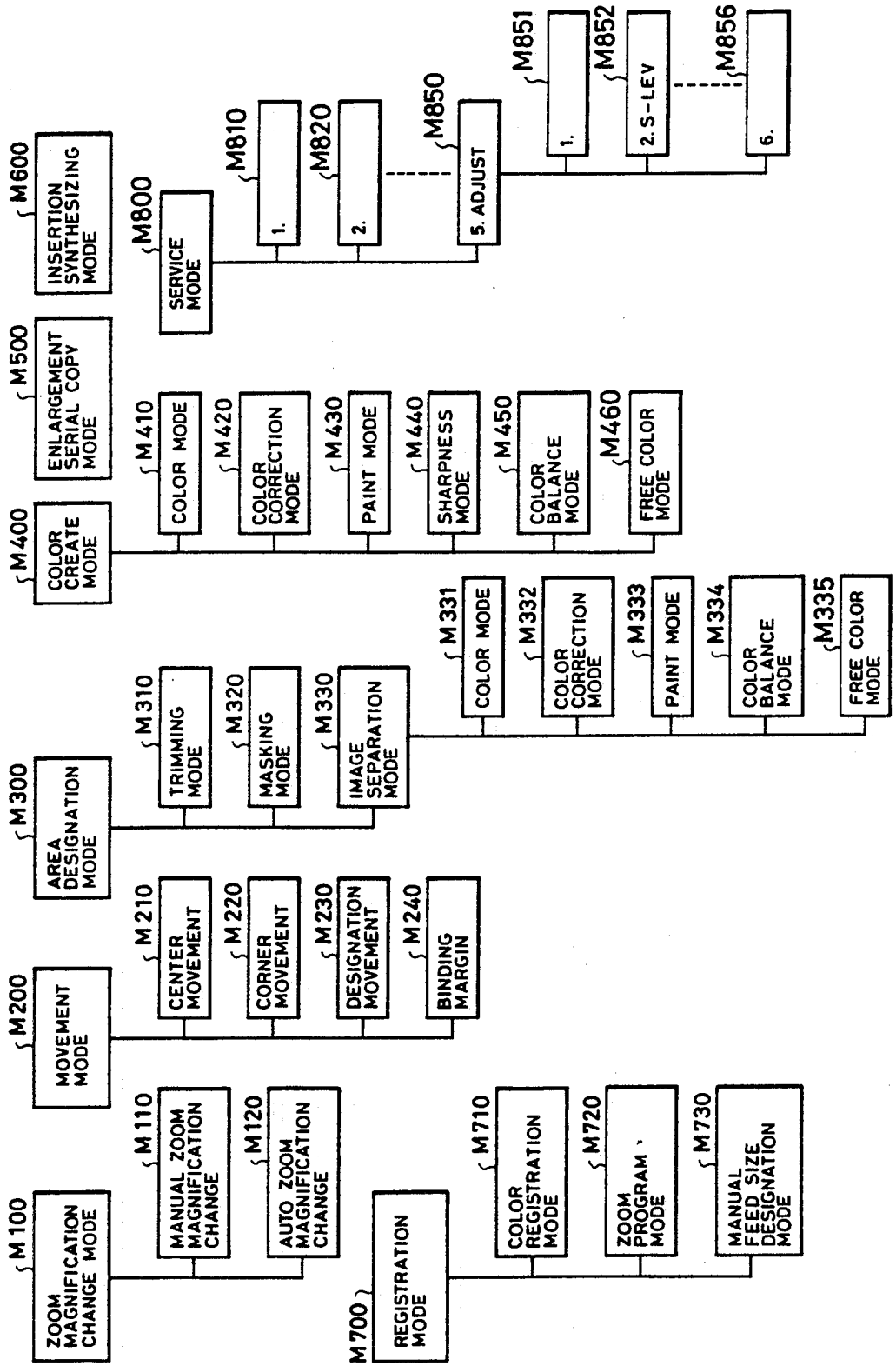
FIG. 41 is an illustration of functions of the color copying apparatus of the embodiment shown in FIG. 1.

Referring to FIG. 41, the color creation create) mode M 400 is further divided into six types of mode: namely, a color mode M 410, color conversion mode 420, paint mode M 430, a sharpness mode M 440, a color balance mode M 450 and a free color mode M 460. The user can appoint one or more of these five modes.

It is recalled that the area appointing mode M 330 described before also has the color mode M 331, color conversion mode M 332, paint mode M 333, the color balance mode M 334 and the free color mode M 335. The sole point of difference between these modes in the color creation mode M 400 and those of the area appointing mode M 300 resides in that, in the color creation mode M 400, the effects of these modes are applied to the whole area on the original, unlike the area pointing mode in which the effects are produced only on selected area. Other portions of these modes are the same as those of the corresponding modes in the area appointing mode M 300. The description therefore is omitted as to these five modes: namely, the color mode M 410, color conversion mode M 420, paint mode M 430 and the color balance mode M 450.

The sharpness mode M 440 is mode for enabling the sharpness of the image to be adjusted. This can be conducted by, for example, effecting an edge stressing on the character images or by controlling the rate of smoothing effect on halftone image.

The practical manner of setting of the color create mode will be explained hereinunder with reference to FIG. 37. When the color create mode key 425 on the digitizer 16 is pressed, the content of the liquid crustal display proceeds to a picture P 400. If the user presses the touch key b (color mode) on the picture P 400, the display proceeds to a picture P 410 which enables the user to select the color mode to be copied. When the monochrome color mode other than 3- and 4-full-color modes is selected, the content of the display is further changed to a picture P 411 which enables the user to select either one of negative and positive.

When the user has pressed the touch key c (sharpness) on the picture P 430, the content of the display is changed to a picture P 430 which enable the use to adjust the sharpness of the copy image. If the user wishes to strengthen the sharpness, he presses the strengthening touch key i so that the amount of edge stressing is increased as explained before, so that minute lines such as those of characters are printed clearly. Conversely, when the user wishes to weaken the sharpness, he presses a weakening touch key h so that the smoothing is effected on the peripheral pixels so as to increase the smoothing effect, whereby defects such as moire inevitably produced when halftone image is copied can be suppressed.

The operations in the color conversion mode M 420, paint mode M 430 and the color balance mode M 450 are not described because they are materially the same as those in the area appointing mode.

Explanation of Fitting Synthesizing Mode

Figure 42A:
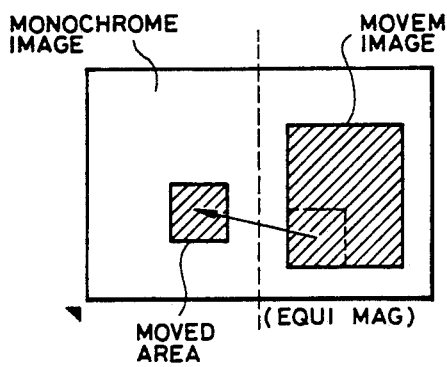
FIGS. 42A, 42B, 42C, 42D, 42E, 42F and 42G are illustrations of fitting synthesizing mode.
Figure 42B:
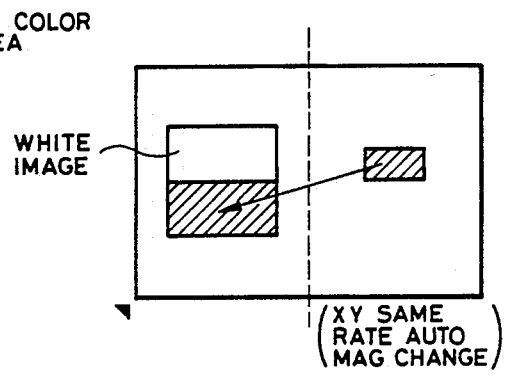
Figure 42C:
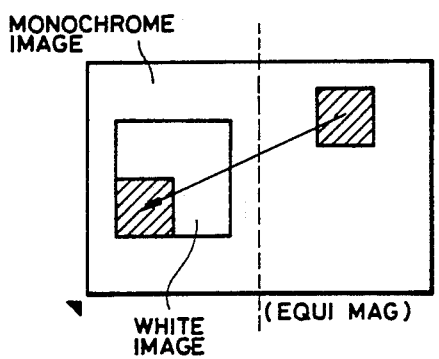
Figure 42D:
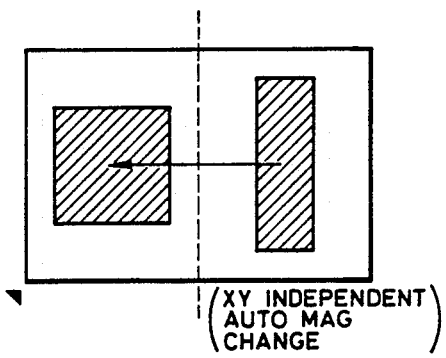
Figure 42E:
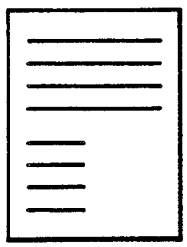
Figure 42F:
Figure 42G:
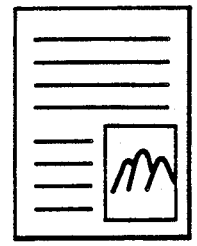
Figure 43:
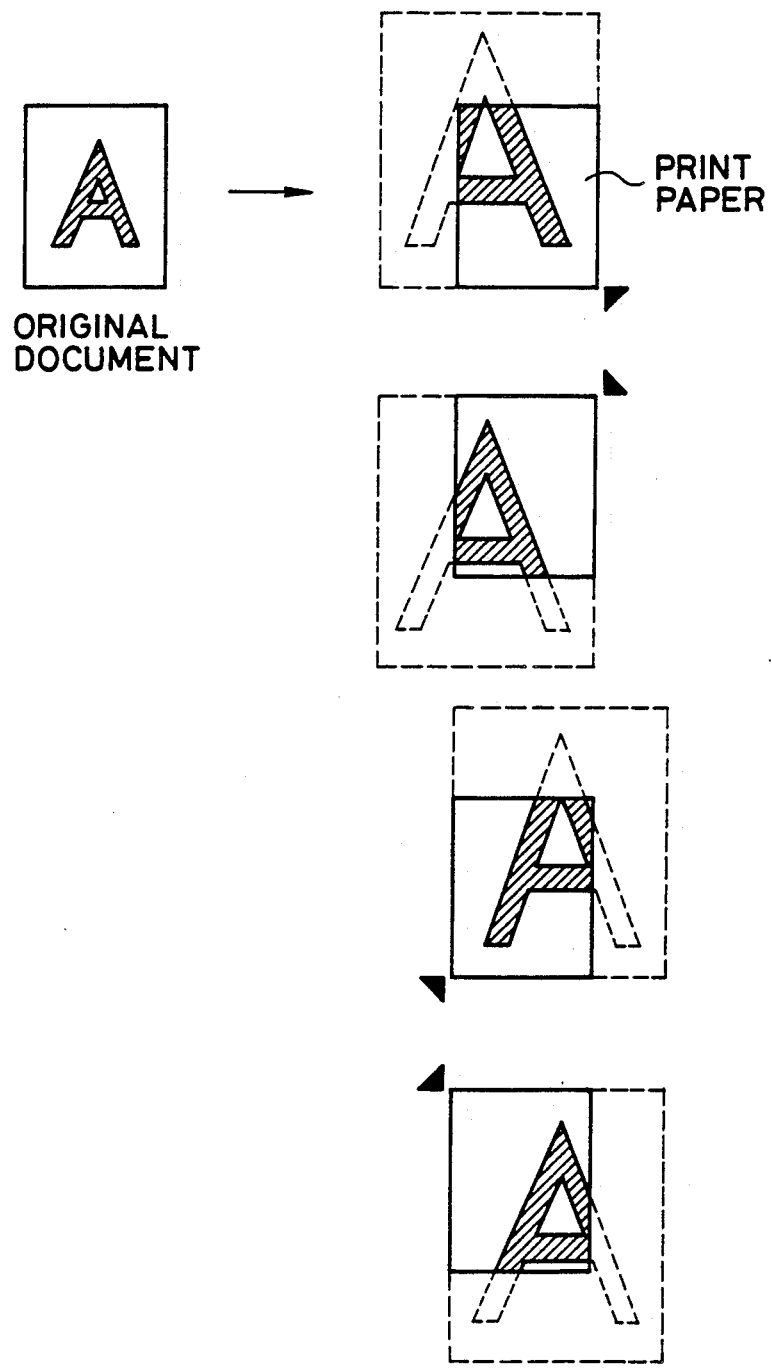
FIG. 43 is an illustration of a print image formed by corner shifting operation.

The fitting (insertion) synthesizing mode M 600 is a mode which is executed when there are two types of originals such as those shown in FIGS. 42E and 42F. Namely, this mode is conducted when it is desired to shift an appointed color image area into an appointed area of a monochrome or color image region, with or without magnification, and to print an image synthesized from these two types of images.

Figure 39:
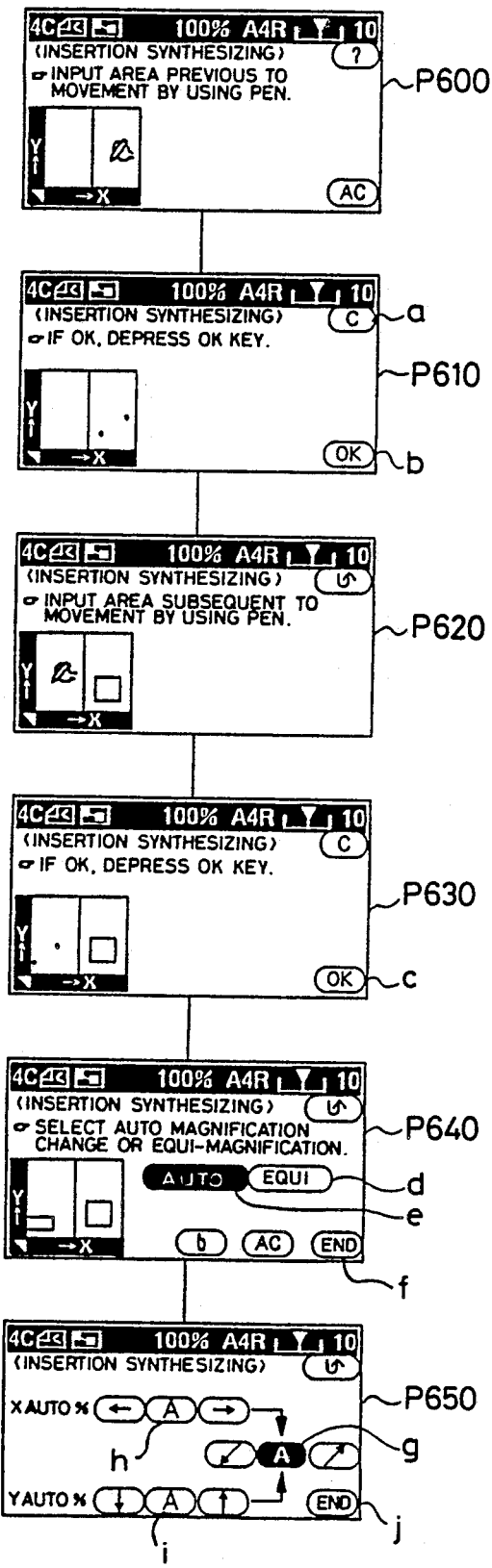
FIG. 39 is an illustration of operation of the apparatus in fitting synthesizing mode.

The manner of setting of the fitting synthesizing mode will be described with reference to a picture on the liquid crystal panel and keys on the touch key panel. As the first step, the user places the original on the coordinates detection plate of the digitizer 16, and presses a fitting synthesizing key 427 which is an entry key for allowing this mode to enter. As a result, the content of the liquid crystal display is changed from the standard picture P 000 shown in FIG. 33 to a picture P 600 shown in FIG. 39. Then, the user appoints the color image area to be shifted, by pointing two points on a diagonal line of this area. In this state, a picture P 610 appears on the display so as to show two dot points similar to the appointed points. In order to shift this area to another area, the user presses the touch key a on the picture P 610 and then appoints two points again. If the area to be shifted is correctly appointed, the user presses the touch key b and then appoints the destination area to which the area is to be shifted, by appointing two points on a diagonal line by means of the point pen 421. If the destined area is correctly appointed, the user presses a touch key c on the picture P 630 so that the content of the display on the liquid crystal display is changed to a picture P 640 which enables the user to set the magnification of the color image to be shifted. If the user wishes to shift the area in real size, i.e., without magnification, he presses the touch key d and then presses an ending touch key thereby completing the operation. When the size of the image area to be shifted is greater than the size of the destined area as in the case of FIGS. 42A and 42B, an automatic control is performed such that the shifted image area is fitted in accordance with the destined area. Conversely, if the size of the image area to be shifted is smaller than the size of the destined area, the shifted image is fitted in the destined area with the vacant portion printed as a white image, by an automatic control.

When it is desired to fit the shifted image to the destined area after a change in the size of the shifted image, the user presses the touch key e on the picture P 640. In consequence, the content of the display is changed to a picture P 640 which enables the user to appoint the magnifications both in the X direction (sub scan direction) and Y direction (main scan direction) in the same manner as that explained before in connection with the zooming mode. More specifically, when the user wishes to fit the shifted color image area in X Y equal auto zooming mode, he presses the touch key g on the picture P 650 so as to reverse the key display. When the user wishes to print the shifted color image area in the same size as the destined area, he presses touch keys h and i on the picture P 650 so as to reverse the key display. The change in the size of the shifted color image area only in X or Y direction, as well as change of the image size at an equal rate both in X and Y directions, can be conducted simply by manipulation of the up/-down key.

After the completion of the described operation, the operator presses the touch key j so that the display is reset to show the standard picture P 000 shown in FIG. 33, thus completing the setting of operation in the fitting synthesizing mode.

Enlarging Continuous Copying Mode

The enlarging continuous copying (enlargement serial copy) mode M 500 is a mode which is executed when the size of the copy image of the whole or selected area on the original produced at a predetermined magnification is greater than the size of preselected copy paper. Namely, in such a case, the apparatus set in this mode automatically divides the original into two areas in accordance with the set magnification and the selected paper size, and the images of these two areas are copied on different copy paper sheets, whereby a copy image of a size greater than the preselected paper size can easily be obtained by adhering these two copy paper sheets.

Figure 38:
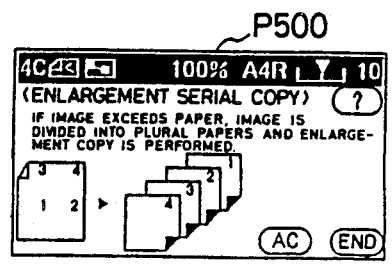
FIG. 38 is an illustration of operation of the apparatus in enlarging continuous copying mode.

The operation of the apparatus in this mode is as follows. For selecting this mode of operation, the user presses an enlarging continuous copying key 436 on the digitizer and then presses an end key a on the picture P 500 shown in FIG. 38 Thereafter, the operation is automatically performed in the above-described manner simply by selection of the magnification and paper size.

Registration Mode

The registration mode M 700 includes three forms: namely, a color registration mode M 710, a zoom program mode M 720 and a manual paper feed appointing mode M 730.

The color registration mode M 710 is a mode which enables registration of the color obtained after the color conversion in each of the color creation mode M 400 and the area appointing mode M 300. The zoom program mode M 720 is a mode which automatically computes the magnification upon receipt of data concerning the size of the original and the length of the copy paper. The thus computed magnification is displayed on the standard picture P 000 and the copy is produced with this magnification.

The color copying apparatus of this embodiment is constructed to allow a manual feed of the copy paper besides the paper feed from the upper and lower paper cassettes. The manual paper feed appointing mode M 730 is a mode for allowing the user to feed a copy paper manually. When the user wishes to use the apparatus in so-called APS (Automatic Paper Select) mode, the user can appoint the size of the paper to be manually fed, by using this function.

Figures 1, 40:
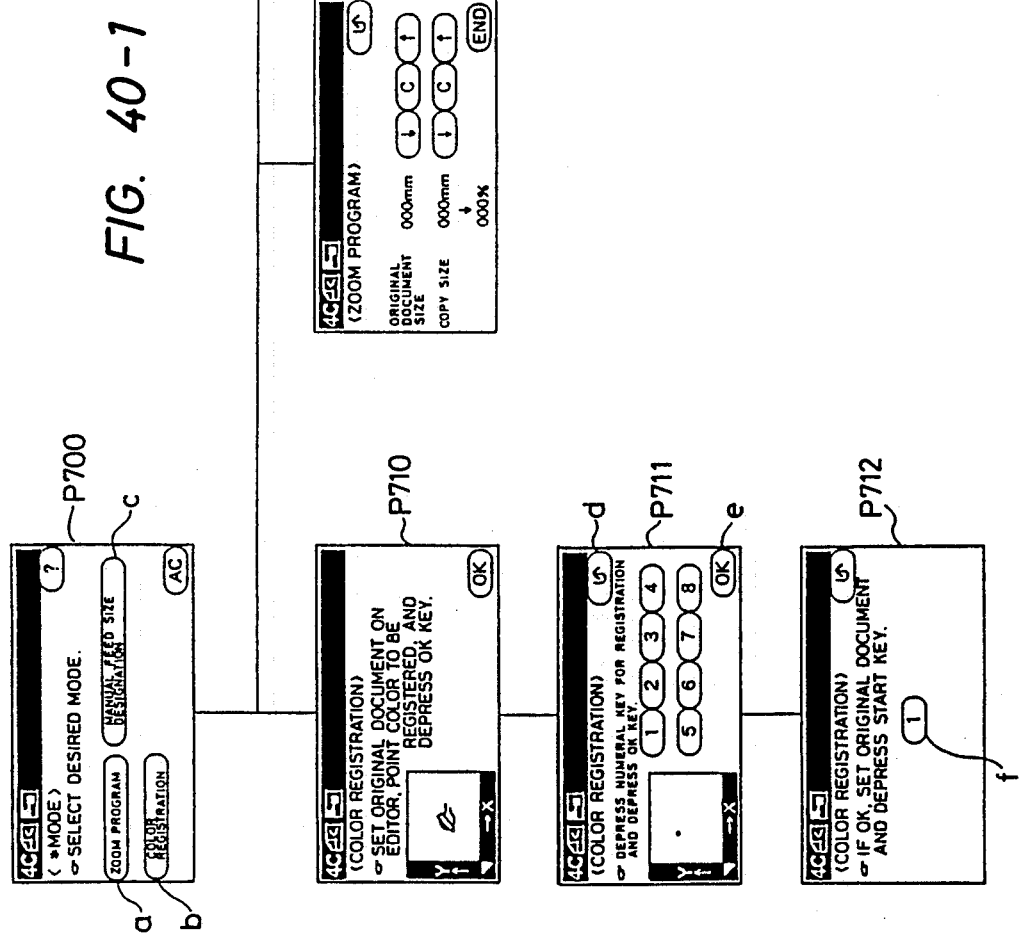
Figures 2, 40:
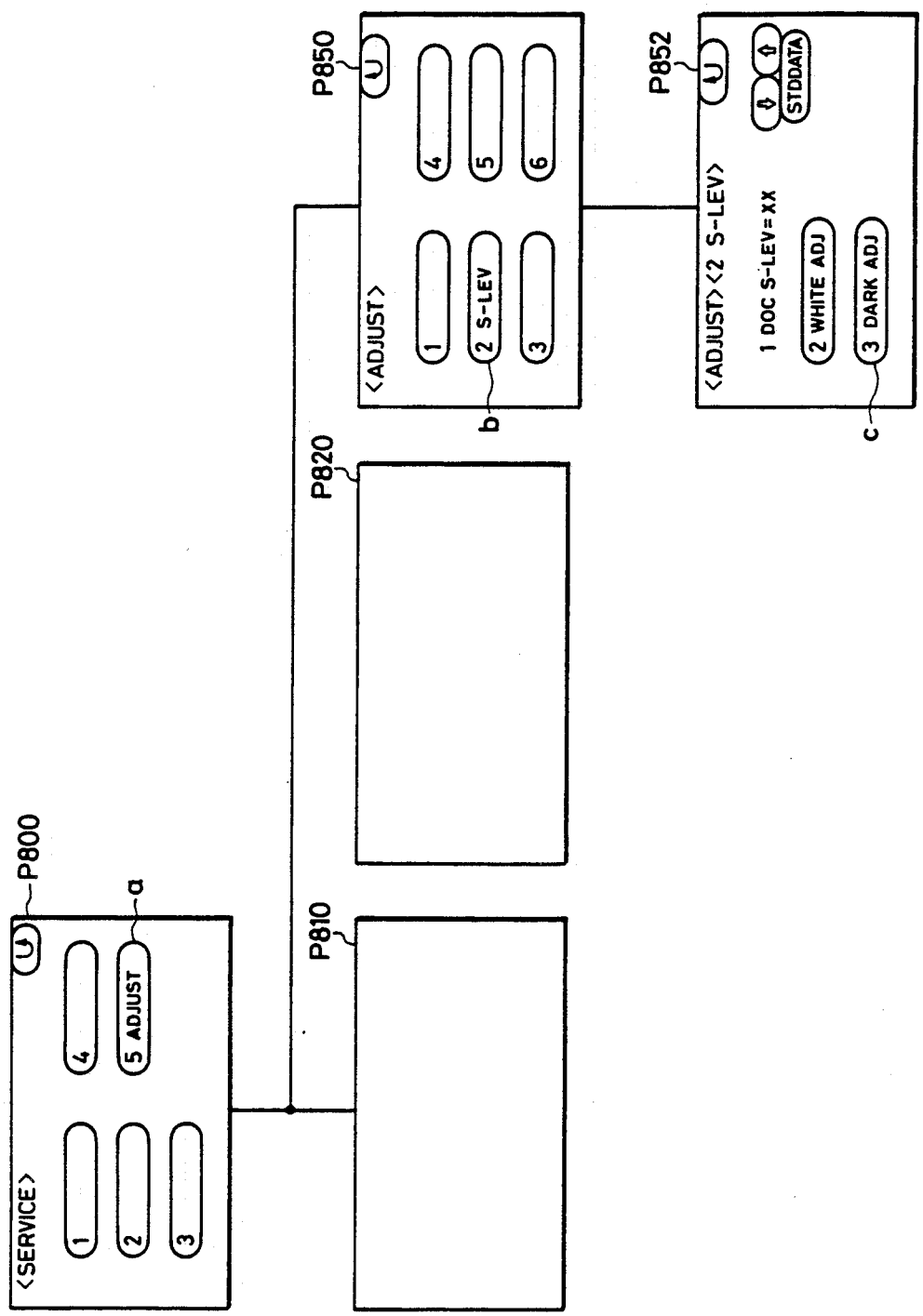

For commencing the operation in the registration mode, the user presses a * key 402 on the control section shown in FIG. 31, so that the content of the display is changed to a picture P 700 shown in FIG. 40-1. When the user wishes to register a color by the color registration mode M 710, he presses the touch key a on the picture P 700 so that the content of the display is changed to a picture P 710. The user then places on the digitizer 16 the original having the color region of a color to be registered, and points this color region by the point pen 421.

In consequence, the content of the display is changed to P 711 to enable the user to set the registration No. with which the color is to be registered, by pressing a key of the corresponding No. When the user wishes to register another color simultaneously, he presses the touch key d on the picture P 711 so that the content of the display is returned to the picture P 710. The user then conducts the described operation for appointing the additional color to be registered. After the input of the coordinates of the color region to be registered, the user presses the key e and then presses the touch key f which is a reading start key appearing on the picture P 712.

Figure 44:
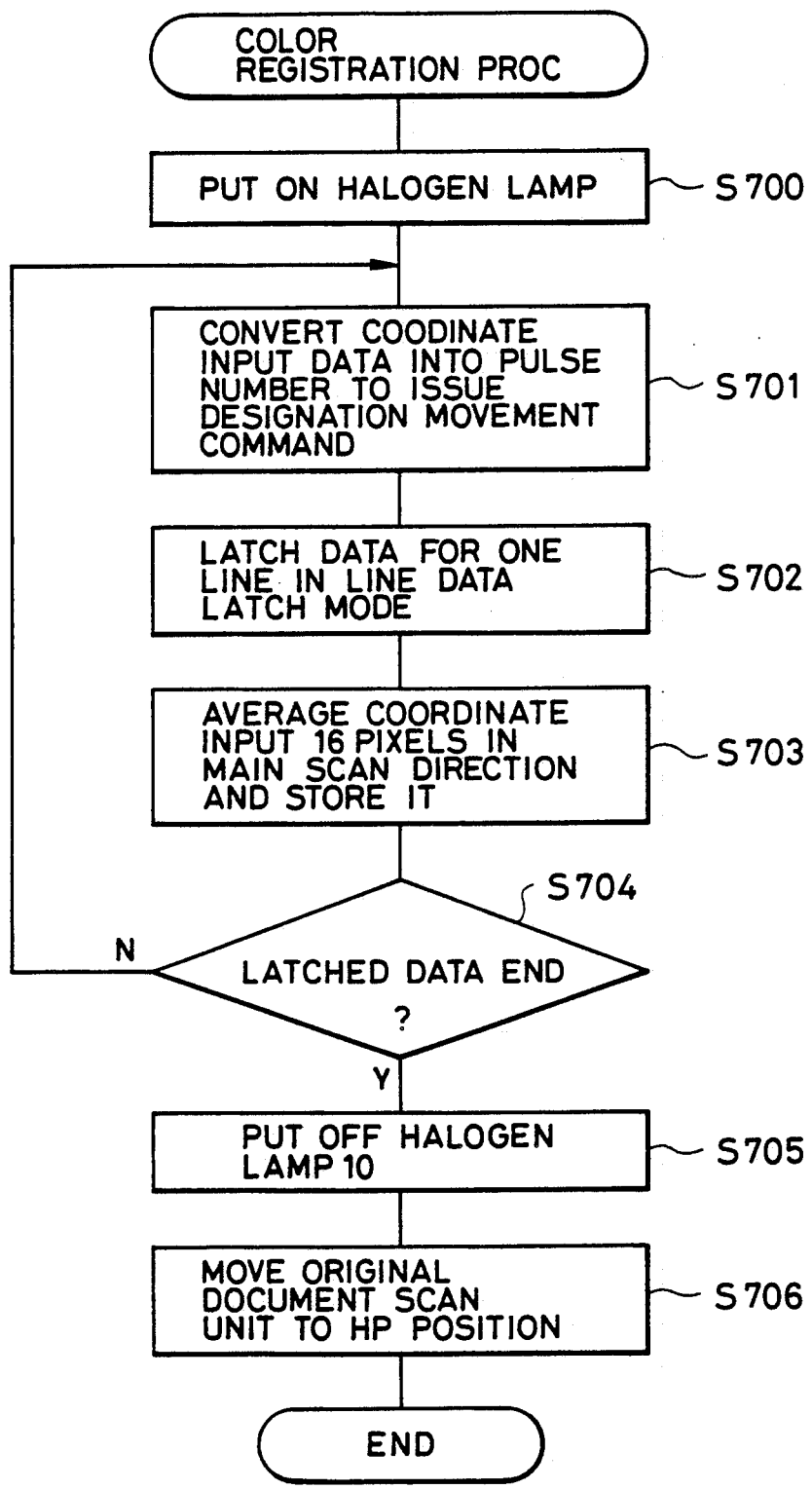
FIG. 44 is a flow chart showing the flow of control employed when the apparatus is used in color registration mode.

After the pressing of the key f, the process proceeds following the flow chart shown in FIG. 44. Namely, the halogen lamp 10 is turned on in Step S 700. In Step S 701, computation is executed to determine the number of the driving pulse for the stepping motor on the basis of the distance to the appointed coordinates in the sub-scan direction. Then, the aforesaid appointed shift command is issued to cause the original scanning unit to move. In Step S 702, the data contained by one line in the appointed subscan position is picked up by operation in the line data pickup mode, and is stored in the RAM 78' shown in FIG. 11-1. In Step S 703, the CPU 22 computes the mean values of data of 8 pixels on the leading and trailing side of the coordinates-appointed main scan position, from the data stored in the RAM 78', and the thus computed mean value is stored in the RAM 24. In Step S 704, a judgment is conducted as to whether all of the registered coordinates have been read. If there still is any coordinates which are to be read, the process returns to Step S 701 so repeat the described operation. Upon conforming the reading of all the registered coordinates, the process proceeds to Step S 705 in which the halogen lamp 10 is turned off and the original scanning unit is returned to the home position, thus completing the operation.

When the user presses the touch key a (zoom program), the content of the display is changed to a picture P 720 which enables the user to set the size of the original and the copy size by means of up/down key. The thus set numerical values are displayed on the picture P 720 and, at the same time, the ratio copy size/original size is displayed in terms of percents. The result of the computation is displayed on the magnification display area display is changed to a picture P 850. As the user presses the touch key b on the picture P 850, the content of the display is changed to a picture P 852. In advance to the copying operation, a data as to whether the present mode is a mode for picking up one-line black level data from the CCD 16 is to be picked up by the RAM 78, by means of the touch key C and the display C on the picture P 852. If the state as shown in FIG. 40-2 is indicated by the display C, the operation mode which does not pickup the one-line black level data is set in the RAMs 24 and 25. If the character portion of the display C has been reversed by an input through the touch key C, a mode for picking up the black level signal is set in the RAMs 24 and 25. The touch key performs a toggle-type action. Other functions of the service mode are not described because they do not constitute any critical portion of the invention.

Figure 51:
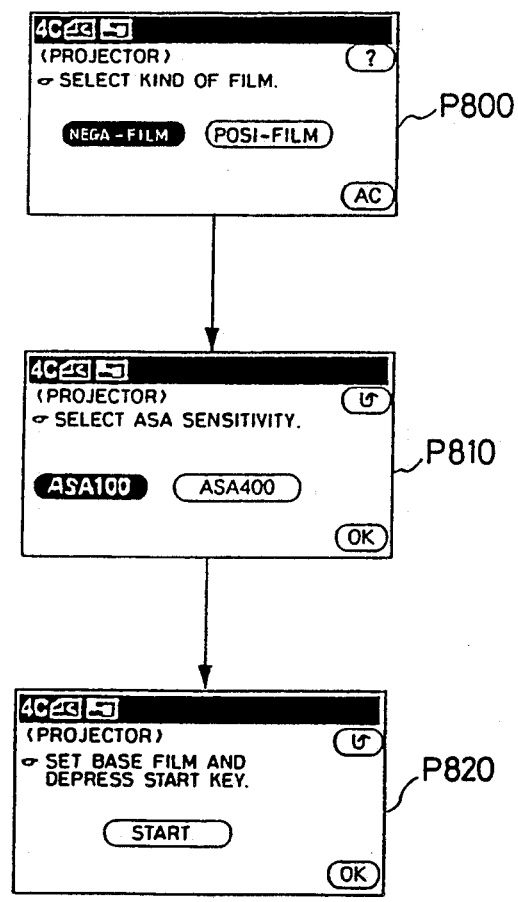
FIG. 51 is an illustration of the manner in which the projector is operated.

FIG. 51 shows a procedure for operating the operating section in a case where the film projector (211 in FIG. 24) is mounted. After the film projector 211 has been connected, if the projector mode selection key 406 in FIG. 31 is turned ON, the display on the liquid crystal touch panel changes to P 800. In this picture, selection is made as to whether the film is negative or positive. For example, if the negative film is then selected, the picture changes to P 810, i.e., the picture for selecting the ASA sensitivity of the film. Then, for example, the film sensitivity ASA100 is selected. Subsequently, as described in detail in the procedure in connection with FIG. 29, the negative base film is set, and the P 820 shading start key is turned ON to correct the shading. The negative film to be printed is then set in the holder 215, and the copy button (400 in FIG. 31) is turned ON to effect an AE operation for determining the exposure voltage. Subsequently, image formation is repeated in the order of yellow, magenta, cyan, and black, as in the case of FIG. 25A.

Figure 46:
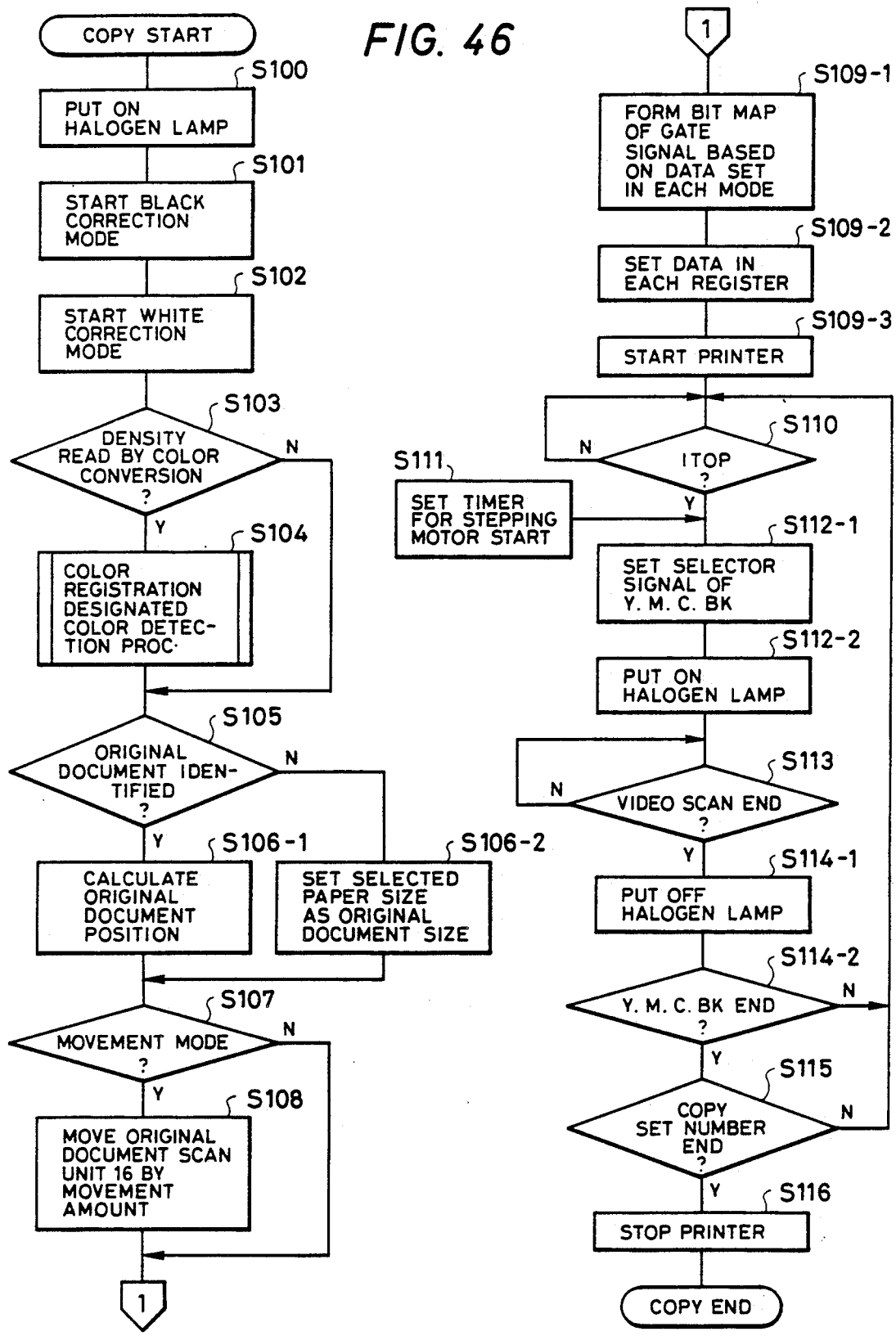
FIG. 46 is a flow chart showing the flow of control of the whole system.

FIG. 46 is a flow chart of the sequence control of this color copying apparatus. A description will be given hereafter of this sequence control with reference to the flow chart. The copy key is pressed to light the halogen lamp in Step 100, the shading processing of the black correction mode and the white correction mode, the operation of which has already been described, is effected in Steps 101 and 102, respectively.

A description will now be given of the black correction mode in Step 101. Specifically, the black correction mode includes the black reference value fetching mode, the black level data calculation processing mode, and the black correction mode for correcting the actual image data, as has already been described in connection with FIGS. 10A, 10B, 10C, and 10D. The black level data fetched in the black reference value fetching mode is susceptible to the effect of noise, as described above, so that a measure is taken to alleviate the effect of noise in the CCD main scanning direction in the calculation processing mode. However, level variations, though small, are also contained between the CCD channels in the repetition of the main scanning of the CCDs. Consequently, if the data fetched as the black level data contain level differences between the channels, these level differences give rise to a color discrepancy of an image between the channels. To avoid this, the touch key C in the DARK ADJ mode in the ADJUST mode P 852 in the above-described ADJUST mode (FIG. 40-2) is pressed, and the mode for fetching the black level signal to the black level RAM 78 is set in the RAMs 24, 25 shown in FIG. 2. The mode set in the RAMs 24, 25 is discriminated in Step 101-1 in the black correction mode Step 101 shown in FIG. 46, the black level signal is fetched through Steps 101-2 and 101-3, the black correction is performed in Step 101-4, and the copy image is confirmed. After confirmation of the copy image, if a color discrepancy has occurred between the CCD channels, a copying operation is performed again, and the image is reconfirmed. When the black level data which do not produce the color discrepancy between the CCD channels have been fetched as a result, the touch key C is pressed in the DARK ADJ mode in the service mode P 800 to change the display C into the reverse display, and the mode which does not fetch the black level signal to the RAM 78 is set in the RAMs 24, 25. Subsequently, Steps 101-2 and 101 3 are not executed in the black correction mode Step 101, and the black correction is performed in Step 101-4 by the black level data fetched previously. In this embodiment, since the state of correction is displayed at the time of the black correction, the apparatus can be used with ease in operation.

If the designated color conversion has been set in the color conversion mode or the paint mode, the color registration and designated color read processing is performed in Step 104 shown in FIG. 46, and the density data which have undergone color separation at designated coordinates are stored in the predetermined areas, respectively, in response to the registration mode and the detection of the designated color. This operation is shown in FIG. 44. In Step 105, a judgment is made as to whether or not the original recognition mode has been set, and if YES is the answer, in Step 106-1 the scanning unit 16 is made to scan 435 mm, i.e., the maximum original detection length to detect the position and size of the original in the above-described original recognition 200 via the CPU bus. On the other hand, if the original recognition mode has not been set, in Step 106-2 the selected paper size is recognized as the original size, and these items of information are stored in the RAM 24. In Step 107, a judgment is made as to whether or not the shift mode has been set, and if YES is the answer, the original scanning unit 16 is shifted in advance to the original side by the amount of that shift.

In Step 109, a bit map for outputting gate signals for the respective functions generated by the RAMA 136 or RAMB 137 is prepared on the basis of information set by each mode.

Figure 49:
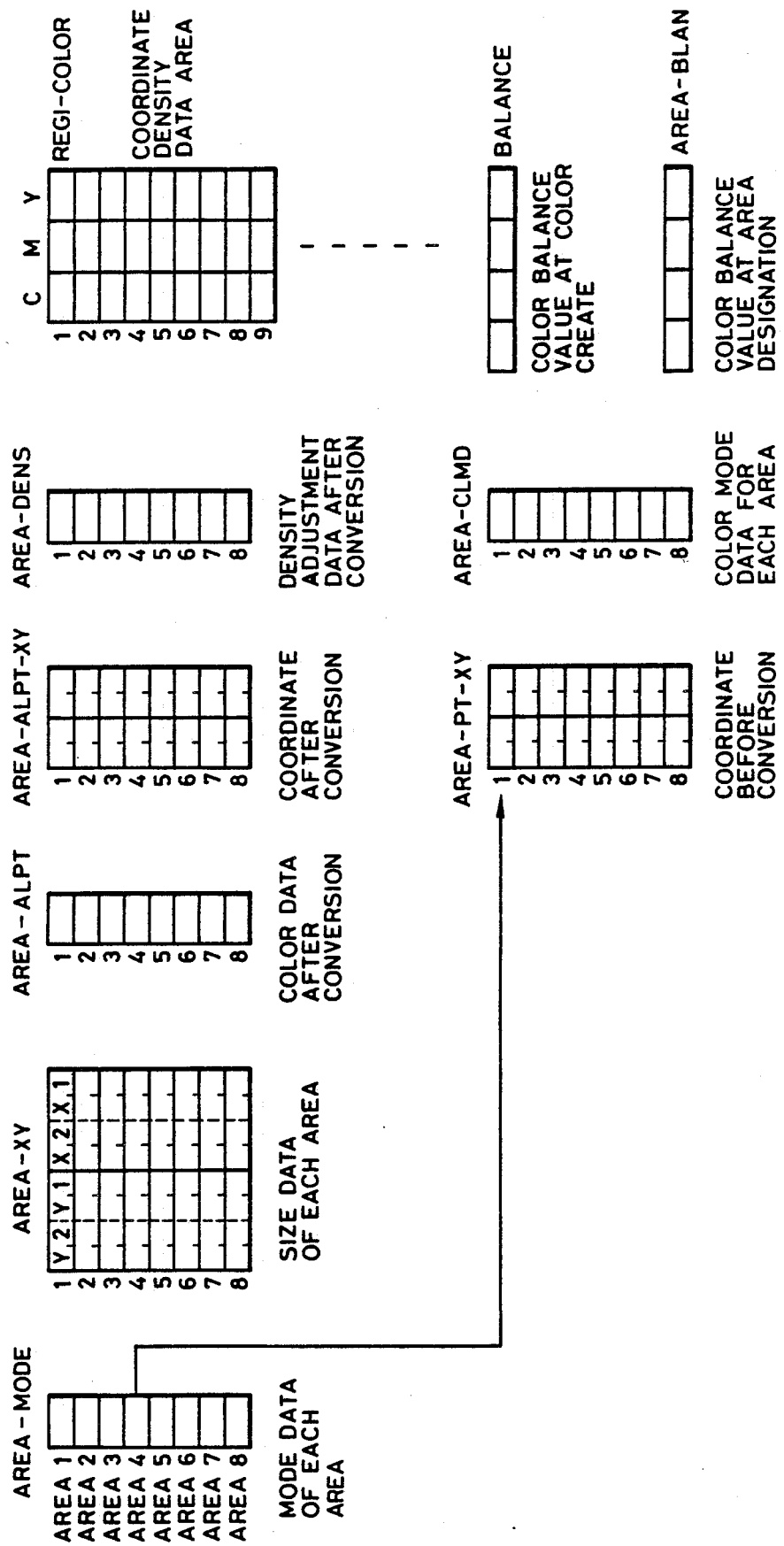
FIG. 49 is an illustration of the memory map of a RAM.

FIG. 49 is a RAM map set in the RAMs 24, 25 in which information set by each of the above-described modes has been set. The AREA MODE contains information on discrimination of each mode concerning the operation in each area, such as painting and trimming. AREA-XY contains information on the original size and the size of each area, while AREA-ALPT contains information after color conversion and information as to whether or nor the reference color or the designated color is a registered color. AREA-ALPT-XY is an information area concerning the color coordinates in a case where the content of the AREA-ALPT is a designated color, while AREA-DENS is a data area concerning density adjustment after conversion. AREA-PT-XY is an information area concerning color coordinates prior to conversion at the time of the color conversion mode, while AREA-CLMD contains information on the color mode of the original or a designated area.

REGI-COLOR stores information of each color registered in the color registration mode and used as the registered color. This area is stored in the backup memory of the RAM 25 and is stored even if the power supply is cut off.

Figure 50:
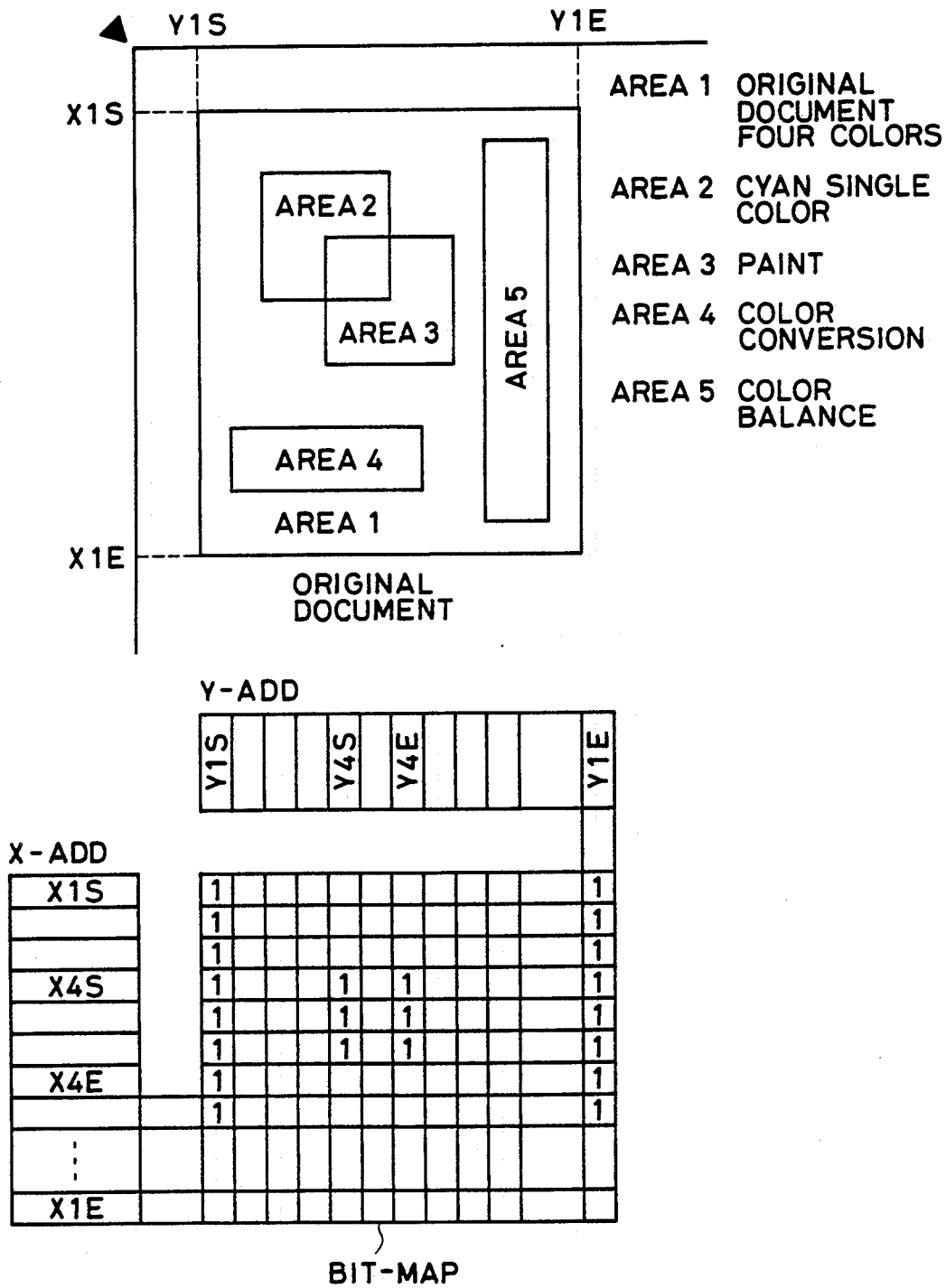
FIG. 50 is an illustration of a bit map.

Bit maps shown in FIG. 50 are prepared on the basis of the information thus set. First, the coordinate data in the sub-scanning direction are fetched from the AREA-XY storing the size information of each area and are sorted and stored in an X-ADD area in order starting with the smallest value. Sorting is similarly carried out in the main scanning direction as well.

Next, "1" is set at the positions of the BIT-MAP corresponding to the starting point and the terminating point in the main scanning direction in each area, and a similar operation is performed up to the coordinates of the terminating point in the sub-scanning. At this juncture, the bit positions at which "1" is set correspond to the respective gate signals generated by the RAMA 136 or RAMB 137, and the bit positions are determined in accordance with the modes of the relevant areas. For instance, area 1, which is the original area, corresponds to TMAREA 660 (edge emphasis) shown in FIG. 21A, while area 5 for color balance designation corresponds to GAREA 626 (gamma characteristics) shown in FIG. 19. Thereafter, bit maps for respective areas are compiled in the BIT—MAP area shown in FIG. 50.

Next, in Step 109-1, the following processing is performed with respect to the mode of each area. First, area 2 is in a single color mode of cyan and is a monochrome image in contrast to the four colors of the original. If unprocessed video signals for this area 2 are transmitted during the development of cyan, area 2 is printed with an image constituted only by cyan components, and images of other yellow and magenta components are not printed. Accordingly, when a designated area has been selected in the single color mode, the following coefficients are set in the register which is selected when the MAREA 564 becomes active, by the masking coefficient register shown in FIG. 16A, so as to obtain an ND image:

| | | | | | |
|---|---|---|---|---|---|
| $\alpha$ Y1, | $\alpha$ Y2, | $\alpha$ Y3 | 0, | 0, | 0 |
| $\beta$ M1, | $\beta$ M2, | $\beta$ M3 | 0, | 0, | 0 |
| $\gamma$ C1, | $\gamma$ C2, | $\gamma$ C3 | ½, | ½, | ½ |
| k 2, | l 2, | m 2 | 0, | 0, | 0 |

The data (used in the four- or three-color mode) stored in the RAM 23 shown in FIG. 2 are set in the masking coefficient register which is selected when the MAREA 564 is set to "0". Subsequently, with respect to area 2 which is in the paint mode, data are set in each register shown in FIG. 18A and selected by the respective gate signals CHAREA 0, 1, 2, 3 corresponding to the bits of BIIMAP area f described above. First, FF is set in $y_u$ 159, 00 in $y_l$ 160, FF in $m_u$ 161, 00 in $m_l$ 162, FF in $C_u$ 163, and 00 in $C_l$ 164 respectively, so as to effect conversion with respect to all the input video signals. Subsequently, color information after conversion which has been stored in FIG. 49 is loaded from the AREA-ALPT or REGI-COLOR, the respective color data are multiplied with the coefficients of the density adjustment data of AREA DENS, and density data after conversion to y' 166, m' 167, and c' 168 are set, respectively. With respect to the color conversion of area 4, values in which certain offset values are added to the respective density data prior to conversion in FIG. 49 are set to the registers of the aforementioned $y_u$ 159, ... ,$C_l$ 164, respectively, and post-conversion data are similarly set thereafter.

In this operation, the user can freely vary the offset value by means of the parameters which are set by the conversion range appointing key on the picture P 341 shown in FIG. 36.

In the color balance of area 5, the aforementioned data values are fetched from the color balance value AREA-BLAN at the time of area designation in FIG. 49 and are set in the areas of Y, M, C, and BK of the RAM 177 selected when the gate signal GAREA 626 is set to "1". Data are fetched from the BLANCE, which represents color balance at the time of color creation, and are set in the areas selected when the GAREA 626 is set to "0".

Figure 47:
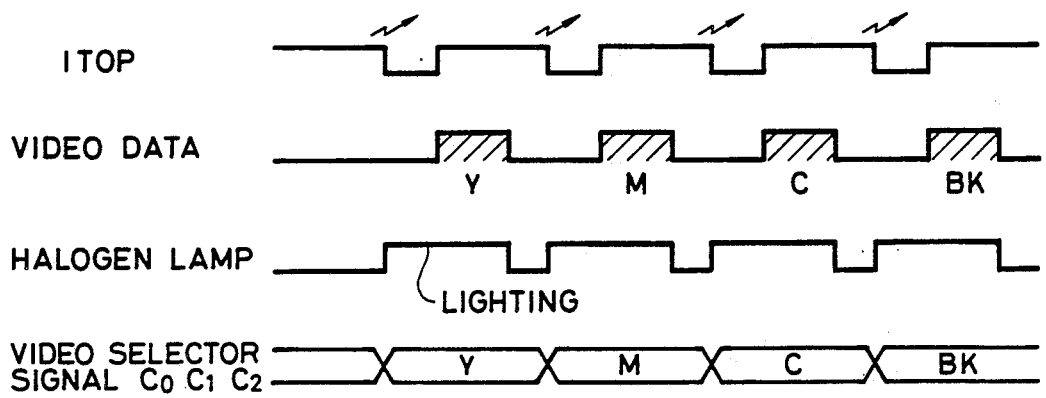
FIG. 47 is a timing chart illustrating the timing of operation of the whole system.

In Step 109, a start command is output to the printer via the SRCOM 516. In Step 110, ITOP shown in the timing chart of FIG. 47 is detected, and, in Step 111, the output video signals $C_0$, $C_1$, $C_2$ of Y, M, C, and Bk are changed over. In Step 112, the halogen lamp is lit. In Step 113, the completion of each video scanning is judged, and, if completed, the halogen lamp is turned off in Step 114. In Steps 114 and 115, the completion of copying is checked, and if completed, a stop command is output to the printer in step 116, thereby completing the copying operation.

Figure 55:
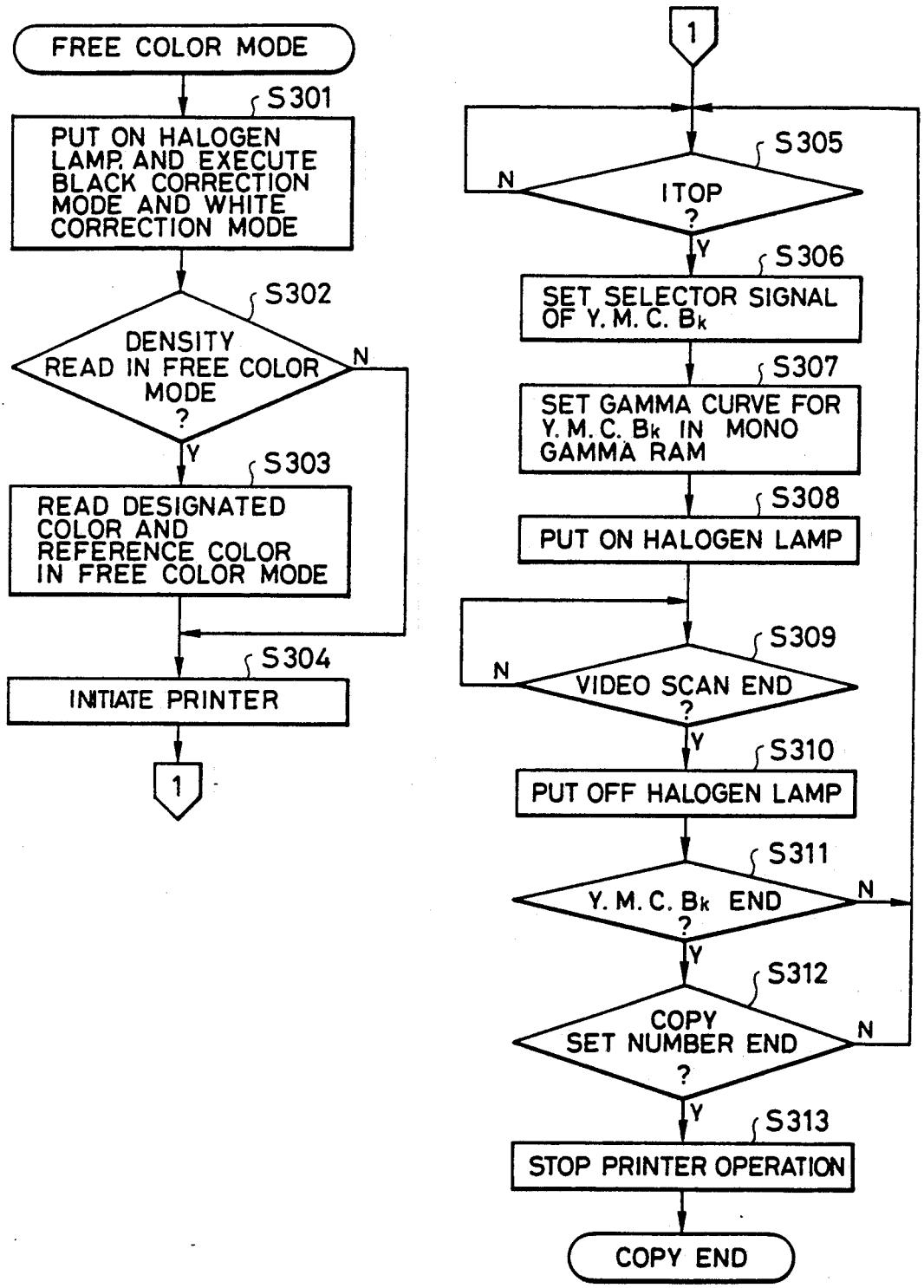
FIG. 55 is a control flow chart illustrating the flow of control performed when the apparatus is set in free color mode.

A description will be made hereinunder as to the sequence control executed when the free color mode has been selected, with reference to a flow chart shown in FIG. 55. As the copy key is pressed, the halogen lamp lights up and black- and white-level corrections are conducted in Step S 301. If the appointed color mode and the density control by means of coordinate appointment have been set in the free color mode, the process proceeds to Step S 303 in which the color information of the appointed color and the MONO value appointed by coordinate are read and stored in predetermined areas. This operation is the same as that explained before in connection with FIG. 44.

In Step S 304, a starting instruction for starting the printer is output through the SRCOM 516. In Step S 305, the ITOP as shown in the timing chart of FIG. 47 is detected and, in Step S 306, change-over of the video signals $C_0$, $C_1$, $C_2$ of Y, M, C, Bk is conducted. In Step S 307, the gamma curves for Y, M and C are set in the MONO gamma RAMs in the manner shown in FIG. 54A. At the same time, a gamma curve is set for Bk in such a manner that 0 is output for all the input values. In Step S 308, the halogen lamp lights up. In Step S 309, the completion of each video scan is judged. If completed, the halogen lamp is turned off in Step S 310 and the completion of the copying operation is checked in Steps S 311 and and S 312. When the completion of the copying operation is confirmed, a stopping instruction for stopping the printer is issued in Step S 313, thus finishing the whole copying sequence.

HINT 517 Interrupt Processing

Figure 48:
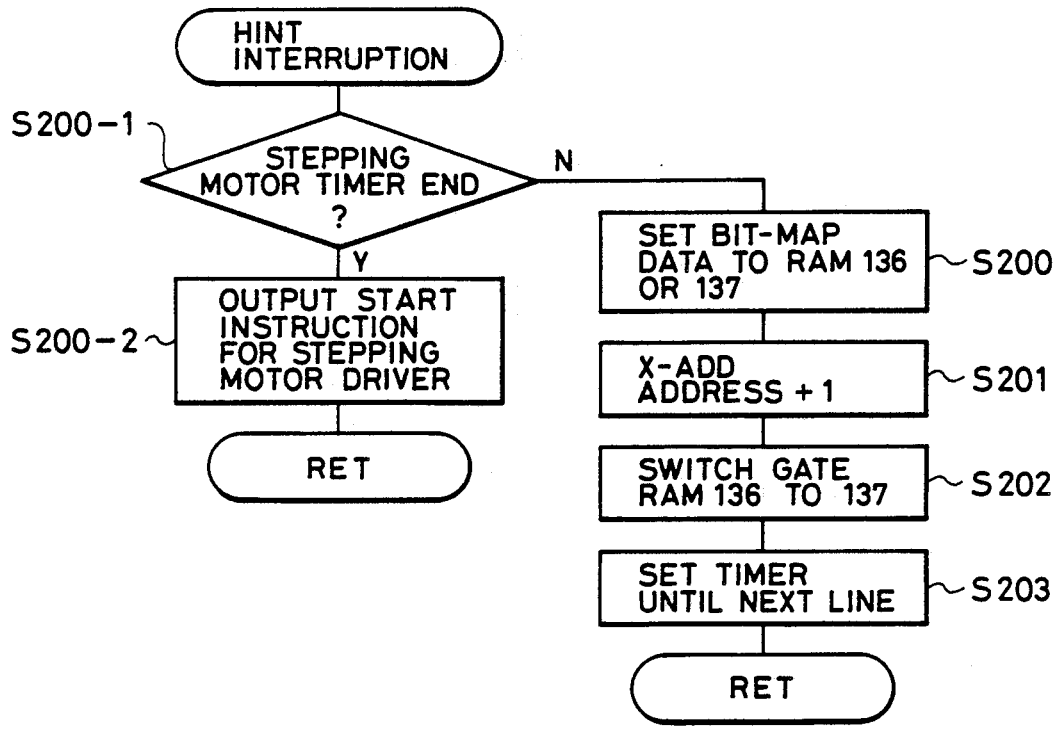
FIG. 48 is a flow chart illustrating the flow of interruption control.

FIG. 48 is a flow chart of interrupt processing for the signal HINT 517 output from the timer 28. In Step 200-1, a check is made as to whether or not the timer for the stepping motor start has timed out. If YES is the answer, the stepping motor is started, and, in Step 200, the BIT-MAP data for one line indicated by X ADD, which are shown in FIG. 50, are set in the RAM 136 or 137. In Step 201, 1 is added to the address of the data to be set in the next interrupting operation. In Step 202, changeover signals $C_3$ 595, $C_4$ 596, $C_5$ 593 for the RAMs 136, 137 are output, and, in Step 203, the time until the changeover of the next sub-scanning is set to the timer 28. Subsequently, the contents of the BIT-MAM indicated by the X-ADD are consecutively set in the RAM 136 or 137 to change over the gate signal.

Namely, each time the carriage moves in the sub-scanning direction and an interruption occurs, the contents of processing in the X direction are changed over, and color processing of conversion to various colors and the like can be performed for each area.

As has been described above, in the color copying apparatus in accordance with this embodiment, various color modes are possible, so that it is possible to reproduce various colors freely.

Although the described embodiment of the apparatus of the invention is a color image forming apparatus making use of electrophotographic recording system, this is only illustrative and the invention can be carried out with various types of recording methods such as ink jet recording method, thermal transfer recording method, and so forth. It is also to be understood that the reading unit and the image forming unit may be installed remotely from each with suitable communication lines connected therebetween, although in the described embodiment the reading unit and the image forming unit are installed in the vicinity of each other.

As has been described, according to the present invention, it is possible to obtain copy images of desired colors from various types of originals such as mono-color original, full-color original, and so forth. It is also possible to reproduce any desired gradation level existing in the original with a desired gradation level. Furthermore, it is possible to convert mono-color image patterns having different gradation levels, e.g., black or yellow image in white background into a desired color with designated lightness, hue and saturation.

Furthermore, the described embodiment enables the user to convert various types of original such as mono-color and full-color images into a desired color having a desired gradation, whereby a copy of the desired color and the desired gradation can be output

What is claimed is:

1. An image processing apparatus comprising:
   (a) hue appointing means for appointing a hue to be obtained after a conversion processing of an original image data having a gradation;
   (b) density appointing means for appointing a specific density level in said original image data; and
   (c) conversion means for converting, in accordance with the hue appointed by said hue appointing means and the density level appointed by said density appointing means, said original image data into a converted image data having a density level proportional to the density level of said original image data and the hue appointed by said hue appointing means.

2. An image processing apparatus according to claim 1, wherein said hue appointing means is designed to appoint one of a plurality of hues which have been beforehand stored.

3. An image processing apparatus according to claim 1, further comprising:
   (d) image data supplying means for supplying said original image data,
      wherein said hue appointing means is designed to appoint the hue to be obtained after conversion, by appointing a particulate hue in the image data supplied by said image data supplying means.

4. An image process apparatus according to claim 3, wherein said hue appointing means and said density appointing means commonly use a same appointing member.

5. An image process apparatus according to claim 1, wherein said conversion means includes:
   (i) a table for receiving said image data and outputting data from a table address corresponding to said image data; and
   (ii) setting means for setting data at each address of said table in accordance with the hue appointed by said hue appointing means and the density level appointed by said density appointing means.

6. An image processing apparatus comprising:
   (a) hue appointing means for appointing a hue to be obtained after a conversion processing of an original image data having a gradation;
   (b) extraction means for extracting the hue appointed by said hue appointing means; and
   (c) conversion means for converting said original image data into a converted image data having the same hue extracted by said extraction means and having a gradation proportional to the gradation of said original image data.

7. An image processing apparatus according to claim 6, wherein said hue appointing means is designed to appoint one of a plurality of hues which have been beforehand stored.

8. An image processing apparatus according to claim 6, further comprising
   (d) image data supplying means for supplying said original image data,
      wherein said hue appointing means is designed to appoint the hue to be obtained after conversion, by appointing a particular hue in the image data supplied by said image data supplying means.

9. An image processing apparatus according to claim 8, wherein said extraction means is designed also to extract the image data supplied by said image data supplying means.

10. An image processing apparatus according to claim 6, wherein said conversion means includes:
    (i) a table for receiving said image data and outputting data from a table address corresponding to said image data; and
    (ii) setting means for setting data at each address of said table in accordance with the hue appointed by said hue appointing means and the gradation of said original image data.

11. An image processing method comprising the steps of:
    (a) appointing a hue to be obtained after a conversion processing of an original image data having a gradation;

(b) appointing a specific density level in said original image data; and (c) converting said original image data in accordance with the appointed hue and density level into a converted image data having a density level proportional to the appointed density level and the same hue as the appointed hue.

12. An image processing method according to claim 11, wherein said step of appointing said hue is a step for appointing one of a plurality of hues which have been stored beforehand.

13. An image processing method according to claim 11, where said step of appointing said hue is a step for appointing the hue to be obtained after the conversion processing by appointing a particular hue in the image data having said density level.

14. An image processing method according to claim 11, further comprising the steps of:

(d) reproducing said image data converted in the converting step into a visible image.

15. An image processing method according to claim 14, wherein the reproducing step includes recording the image data converted in the converting step on a recording medium.

16. An image process apparatus comprising:

(a) appointing means for appointing a desired color into which an original image data is to be converted;

(b) conversion means for converting said original image data into a converted image data having the appointed color and a density level proportional to a density level of said original image data; and (c) adjusting means for allowing adjustment of the density level of the converted image data having the appointed color.

17. An image processing apparatus according to claim 16, wherein said appointing means is designed to appoint one of a plurality of colors which have been beforehand stored.

18. An image processing apparatus according to claim 16, further comprising:

(d) image data supplying means for supplying said original image data;

wherein said appointing means is designed to appoint the color to be obtained after conversion, by appointing a particular color in the image data supplied by said image data supplying means.

19. An image processing apparatus according to claim 16, wherein said adjusting means includes a manual operation member.

20. A recording material in which a converted image data color-converted from an original image data is recorded, wherein said original image data includes regions of different hues and has a gradation, and that the hues of said original image data are converted into a single hue which is obtainable through combination of primary colors and which has a gradation proportional to said gradation of said original image data.

21. A material according to claim 20, wherein said single hue is obtained by appointing a desired portion of said original image.

22. A material according to claim 21, wherein said desired portion is appointed by a digitizer.

23. A material according to claim 20, wherein said original image data is supplied by reading means which scans the original image to generate an electrical signal.

24. A material according to claim 23, wherein said original image data includes full-color digital data.

25. A material according to claim 20, wherein said recording material includes a paper.

26. A material according to claim 20, wherein said converted image data is processed in an electrophotographic process so as to form an image on said recording material.

27. An apparatus according to claim 1, wherein said hue appointing means appoints the hue by appointing a desired portion on said original image.

28. An apparatus according to claim 1, wherein said appointing means includes a digitizer.

29. An apparatus according to claim 6, wherein said hue appointing means appoints the hue by appointing a desired portion on said original image.

30. An apparatus according to claim 6, wherein said appointing means includes a digitizer.

31. A method according to claim 11, wherein said appointing step comprises appointing the hue by appointing a desired portion on said original image.

32. An apparatus according to claim 16, wherein said color appointing means appoints the color by appointing a desired portion on said original image.

33. An apparatus according to claim 16, wherein said appointing means includes a digitizer.

* * * * *

UNITED STATES PATENT AND TRADEMARK OFFICE
CERTIFICATE OF CORRECTION

PATENT NO. : 4,996,591

DATED : February 26, 1991

INVENTOR(S) : TOSHIHIRO KADOWAKI ET AL.          Page 1 of 17

It is certified that error appears in the above-identified patent and that said Letters Patent is hereby corrected as shown below:   On title page,

AT [56] REFERENCES CITED

U.S. Patent Documents, "4,535,413  8/1986  Shiota et al." should read --4,535,413  8/1985  Shiota et al.--.

AT [57] ABSTRACT

Line 8, "color separated" should read
--color-separated--.

SHEET 5 OF 74

FIG. 5, "WHITH" should read --WHITE--.

SHEET 22 OF 74

Figures 2A, 11:
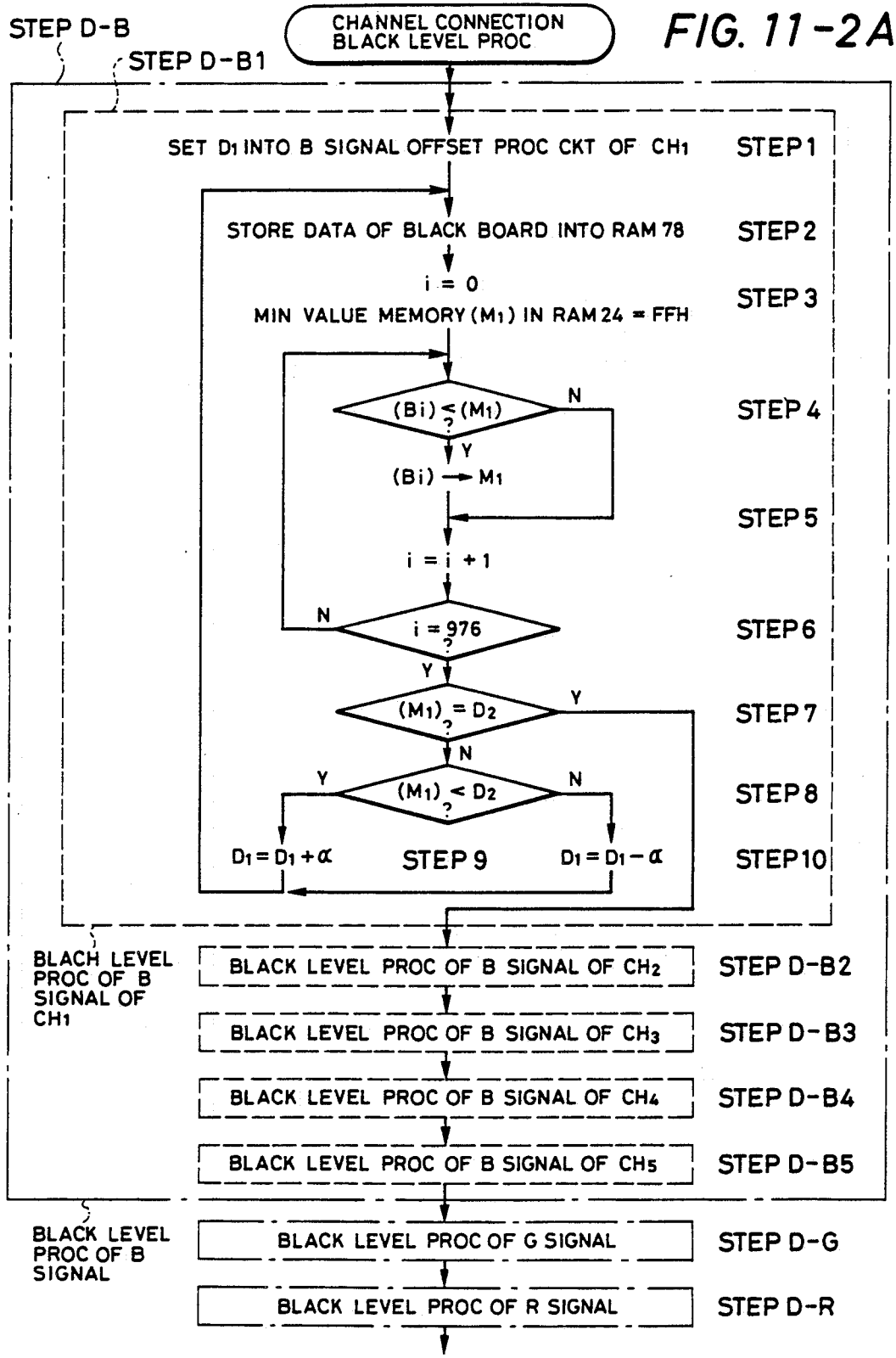
Figures 2B, 11:
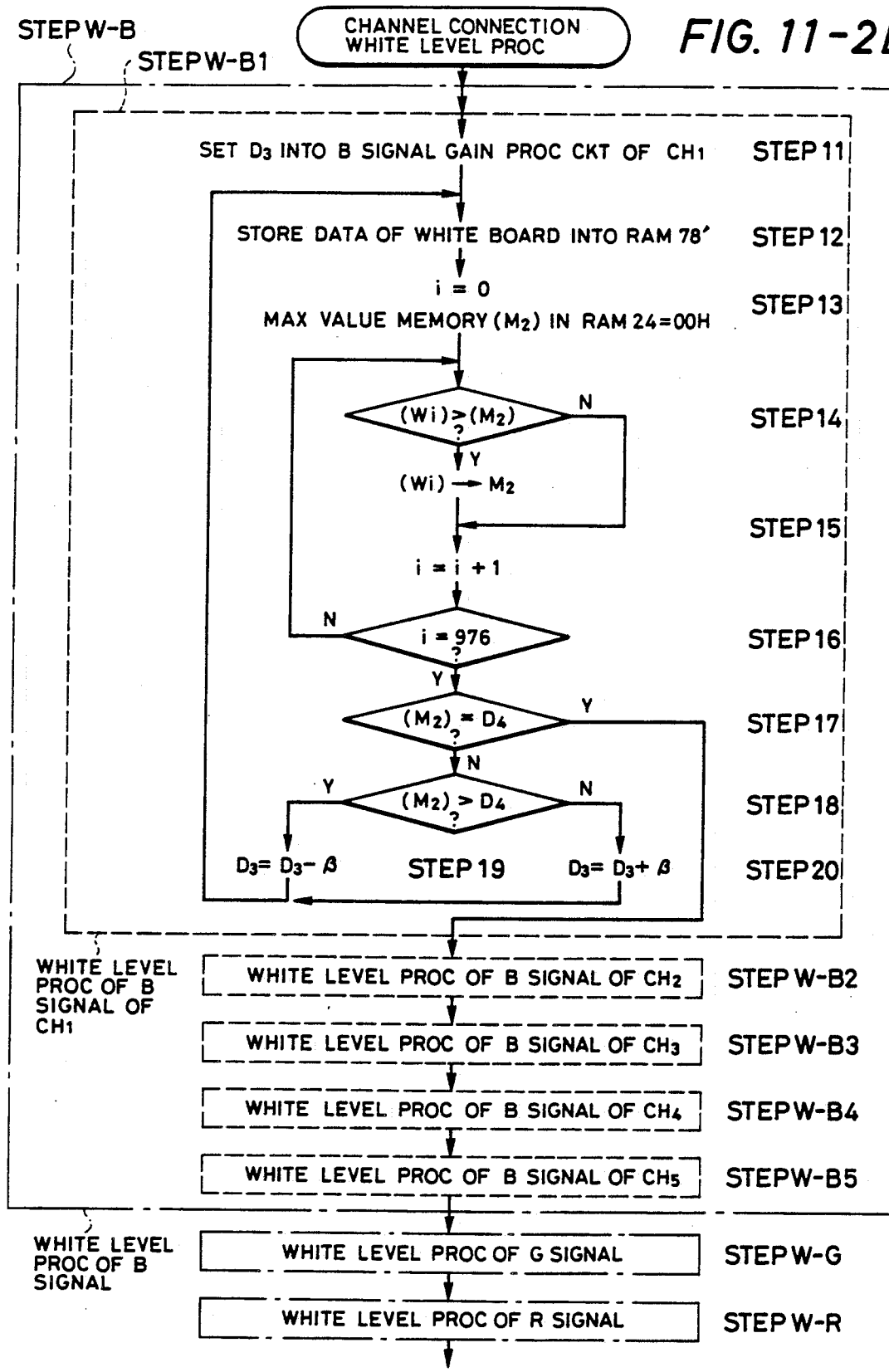
Figures 2C, 11:
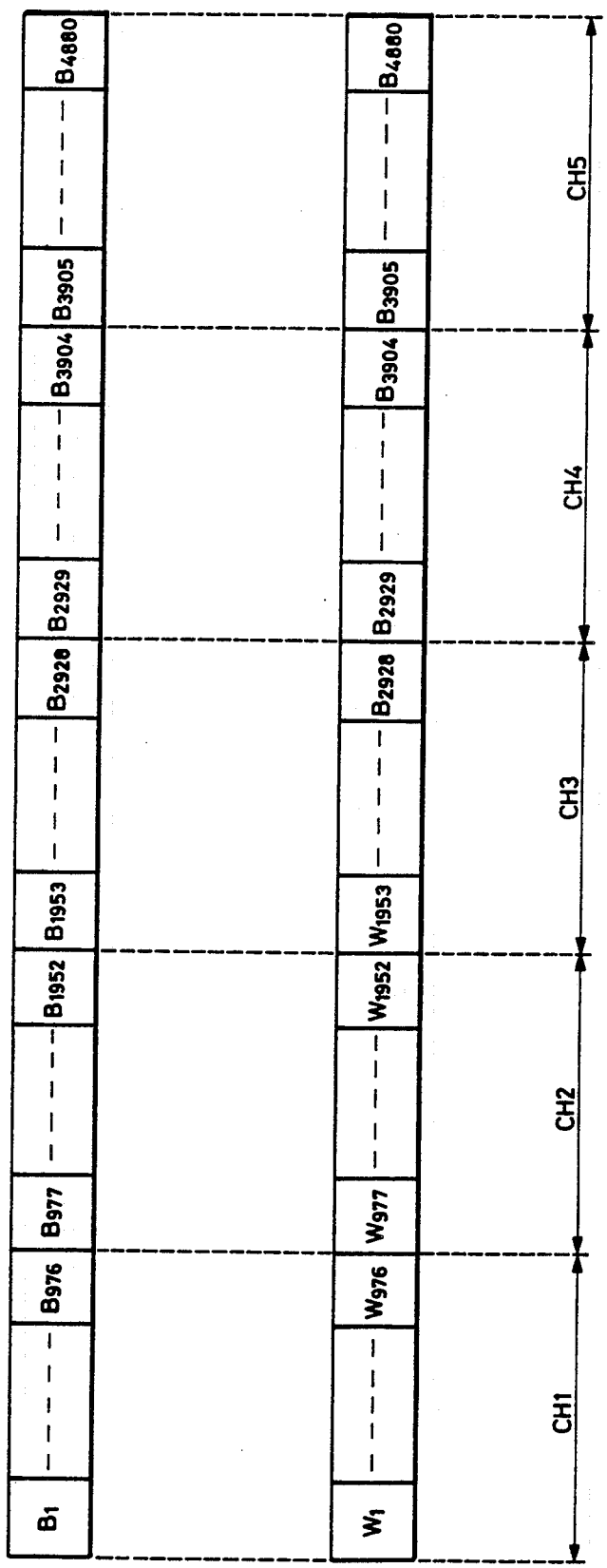
Figures 3, 11:
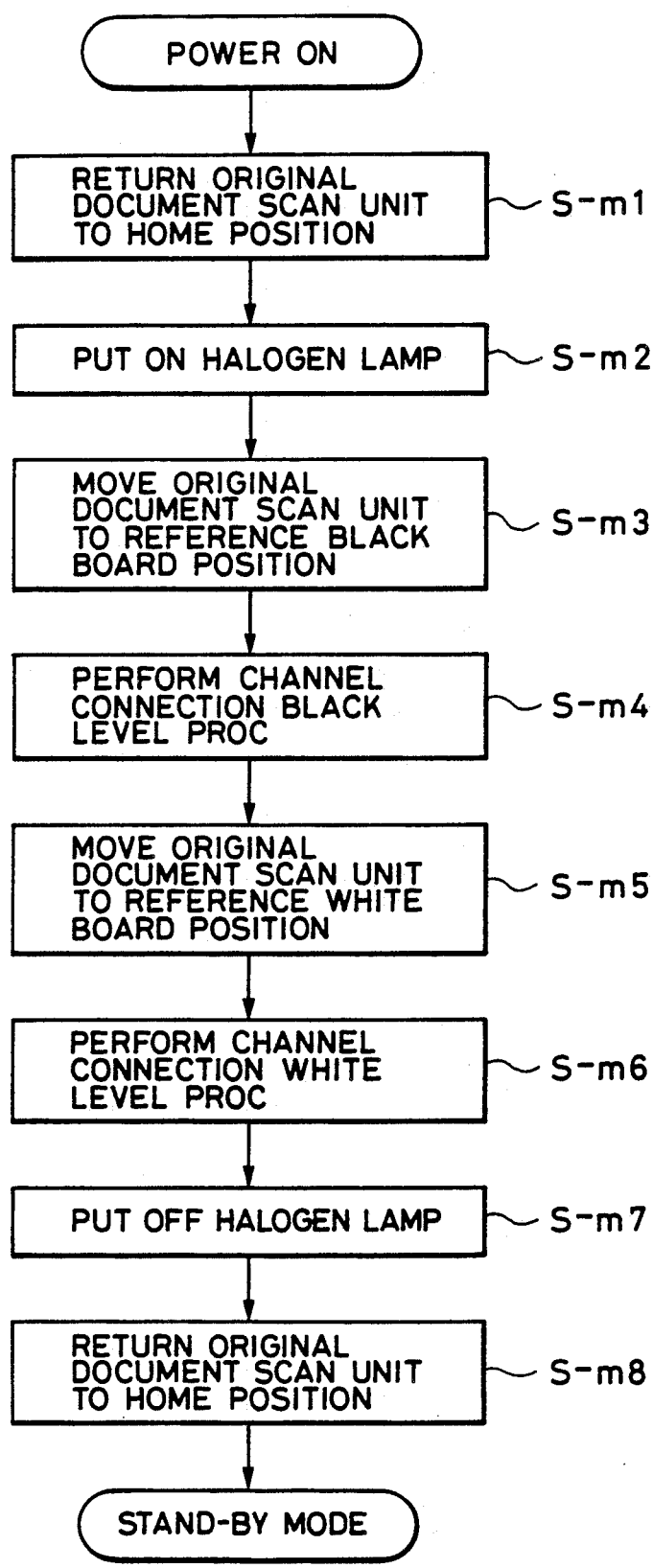
FIG. 3 is an illustration of protocols of a motor driver 15 shown in FIG. 2 and a CPU 22.
Figure 12:
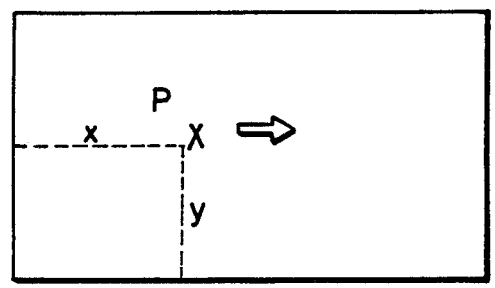
FIG. 12 is an illustration of operation of the embodiment in a line data pick-up mode.

FIG. 11-2A, "BLACH" should read --BLACK--.

SHEET 28 OF 74

FIG. 16A, insert numeral 134.

SHEET 39 OF 74

FIG. 21A, "MEMORY 188" (second occurrence) should read --MEMORY 189--.

SHEET 41 OF 74

FIG. 22, "ENLARGMENT" should read --ENLARGEMENT--.

UNITED STATES PATENT AND TRADEMARK OFFICE
CERTIFICATE OF CORRECTION

PATENT NO. : 4,996,591
DATED : February 26, 1991
INVENTOR(S) : TOSHIHIRO KADOWAKI ET AL.

It is certified that error appears in the above-identified patent and that said Letters Patent is hereby corrected as shown below:

SHEET 42 OF 74

Figure 24:
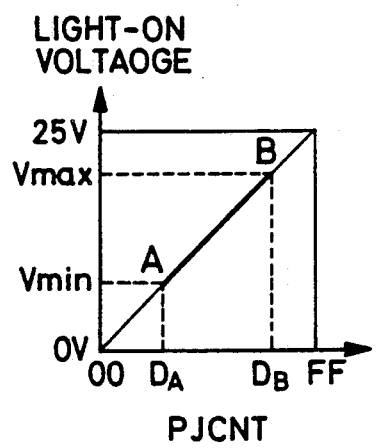
FIG. 24 is n illustration of the relationship between the control input to a film exposure lamp and the lighting voltage of the same.

FIG. 24, "VOLTAOGE" should read --VOLTAGE--.

SHEET 52 OF 74

FIG. 33, "ENLARGMENT" should read --ENLARGEMENT--.

SHEET 53 OF 74

Figures 35A, 35B:
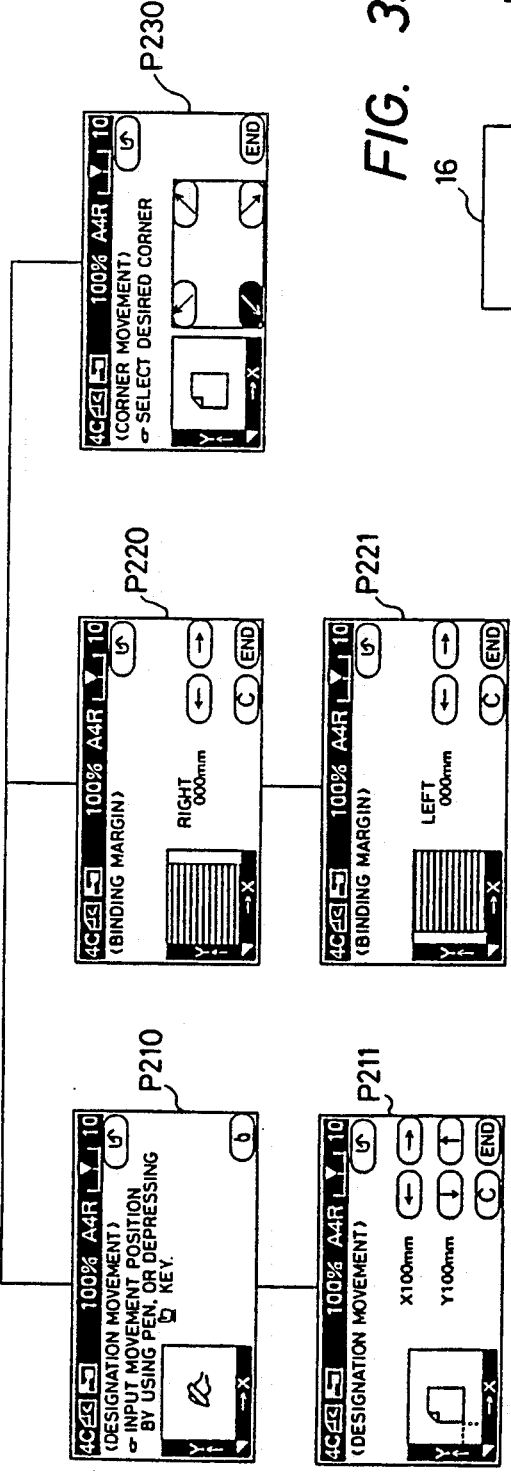
FIGS. 35A and 35B are illustrations of operation of the apparatus in shifting mode.

FIG. 35A, "b" (2nd occurrence) should read --c--.

SHEET 62 OF 74

FIG. 44, "COODINATE" should read --COORDINATE--.

COLUMN 1

Line 12, "technic" should read --technique--.
    Line 18, "units" should read --units.--.
    Line 57, "color separated" should read --color-separated--.
    Line 67, "present invention is to" should be deleted.

COLUMN 3

Line 5, "characteristic" should read --characteristics--.
    Line 8, "developing" should read --a developing--.
    Line 31, "n" should read --an--.

COLUMN 4

Line 50, "reader"," should read --reader"--.

UNITED STATES PATENT AND TRADEMARK OFFICE
CERTIFICATE OF CORRECTION

PATENT NO. : 4,996,591

DATED : February 26, 1991

INVENTOR(S) : TOSHIHIRO KADOWAKI ET AL.   Page 3 of 17

It is certified that error appears in the above-identified patent and that said Letters Patent is hereby corrected as shown below:

COLUMN 5

Line 6, "original" should read --original exposure--.
    Line 27, "blacklevel" should read --black-level--.

COLUMN 6

Line 17, "an" should read --a--.
    Line 22, "sleeve 741M" should read --sleeve 731M--.
    Line 35, "727 and" should read --727, 728 and--.

COLUMN 7

Line 27, "by," should read --,--.
    Line 62, "drum 715" should read --drum 716--.

COLUMN 8

Line 11, "signals BD." should read --signal BD.--.
    Line 58, "rotations" should read --rotation--.
    Line 59, "an" should read --a--.

COLUMN 9

Line 23, "pulses, respectively." should read --pulses.--.
    Line 27, "one" should read --to one--.
    Line 33, "58 to 82" should read --58 to 62--.
    Line 47, "OOIA, (2nd occurrence) should be deleted.
    Line 49, "pulse" should read --pulses--.
    Line 50, "EDRV 518" should read --EDRV 519--.
    Line 52, "pulse" should read --pulses--.

UNITED STATES PATENT AND TRADEMARK OFFICE
CERTIFICATE OF CORRECTION

PATENT NO. : 4,996,591
DATED : February 26, 1991
INVENTOR(S) : TOSHIHIRO KADOWAKI ET AL.     Page 4 of 17

It is certified that error appears in the above-identified patent and that said Letters Patent is hereby corrected as shown below:

COLUMN 10

Line 14, "clock CLKO" should read --clocks CLKO--.
Line 67, "consti-" should read --which is consti---.
Line 68, "dark shielded" should read --dark output portion (optical black) corresponding to 24 pixels shielded--.

COLUMN 11

Line 22, "fedback" should read --fed back--.
Line 33, "to" (2nd occurrence) should be deleted.
Line 32, "S/H 43" should read --S/H 253--.

COLUMN 12

Line 7, "where," should read --where--.
Line 25, "WR" should read --$\overline{WR}$--.
Line 31, "the" (2nd occurrence) should read --this--.
Line 49, "WR" should read --$\overline{WR}$--.

COLUMN 13

Line 7, "system" should read --systems--.
Line 63, "conducted." should read --conducted--.

UNITED STATES PATENT AND TRADEMARK OFFICE
CERTIFICATE OF CORRECTION

PATENT NO. : 4,996,591

DATED : February 26, 1991

INVENTOR(S) : TOSHIHIRO KADOWAKI ET AL.

It is certified that error appears in the above-identified patent and that said Letters Patent is hereby corrected as shown below:

COLUMN 14

Line 10, "ORST 542" should read --ERST 543--.
Line 20, "IRD" should read --1RD--.
Line 45, "is" should read --are--.
Line 49, "eyes," should read --eye,--.
Line 57, "FIG. 9" should read --FIG. 9A--.
Line 64, "white" should read --while--.
Line 65, "opened." should read --opened ⓑ.--.
Line 68, "HSYNC," should read --$\overline{HSYNC}$.--.

COLUMN 15

Line 17, "Bi" should read --$B_i$-- and "(Bi)" should read --$(B_i)$--.
Line 18, "Bi" should read --$B_i$--.
Line 27, "(16X61X5=80)." should read --(16X61X5=4880).--.
Line 28, "Bi" should read --$B_i$--.
Line 30, "and" (2nd occurrence) should be deleted.
Line 32, "Bi-j" should read --$B_{i-j}$--.

COLUMN 16

Line 49, "Fig. 11C." should read --Fig. 11-1C.--.
Line 50, "Do" should read --$D_o$--.
Line 51, "Wi," should read --$W_i$,--.
Line 54, "gate 80" should read --gate 80'--.
Line 66, "Do" should read --$D_o$--.

UNITED STATES PATENT AND TRADEMARK OFFICE
CERTIFICATE OF CORRECTION

PATENT NO. : 4,996,591
DATED : February 26, 1991
INVENTOR(S) : TOSHIHIRO KADOWAKI ET AL.    Page 6 of 17

It is certified that error appears in the above-identified patent and that said Letters Patent is hereby corrected as shown below:

COLUMN 17

Line 1, "is" should read --are--.
Line 28, "(Bi)" should read --$(B_i)$--.
Line 31, "$(M_1)$" should read --$(M_i)$--.
Line 32, "$B_1$)," should read --$(B_i)$,-- and "Bi=$B_1$" should read --$B_i=B_1$--.
Line 40, "determined" should read --determine--.

COLUMN 18

Line 12, "S 508," should read --BUS 508,--.
Line 23, "(Wi)" should read --$(W_i)$--.
Line 27, "Bi=$B_1$" should read --$B_i=B_1$--.
Line 28, "Bi=$B_{976}$," should read --$B_i=B_{976}$,--.
Line 50, "$D_{4-\beta}$," should read --$D_{4-\beta}$,--.
Line 58, "W B3," should read --W-B3,--.

COLUMN 19

Line 1, "set ." should read --set--.
Line 38, "(X mm," should read --(x mm,--.

COLUMN 20

Line 4, "source" should read --sources--.
Line 24, "know" should read --known--.
Line 26, "has" should read --have--.
Line 34, "component," should read --components,--.
Line 47, "Of" should read --of--.

UNITED STATES PATENT AND TRADEMARK OFFICE
CERTIFICATE OF CORRECTION

PATENT NO. : 4,996,591

DATED : February 26, 1991

INVENTOR(S) : TOSHIHIRO KADOWAKI ET AL.   Page 7 of 17

It is certified that error appears in the above-identified patent and that said Letters Patent is hereby corrected as shown below:

COLUMN 21

Line 20, "band" should read --b and--.
Line 26, "(0,,0,1)," should read --(0,0,1),--.
Line 30, "($C_0$, $C_1$, $C_2$)=(0,0,0). While" should read --($C_0$, $C_1$, $C_2$)=(0,0,0) while--.
Line 34, "Mn($Y_i$, $M_i$," should read --Min($Y_i$, $M_i$,--.
Line 37, "bare" should read --b are--.
Line 52, "$C_i$9." should read --$C_i$].--.
Line 53, "his" should read --this--.
Line 56, "an" should read --a--.
Line 59, "$C_{out}$" should read --Cout--.

COLUMN 22

Line 12, "K=$M_i$n" should read --K=Min-- and "it" should read --It--.
Line 20, "MAREAm" should read --MAREA,--.
Line 22, "FIG. 2)" should read --FIG. 5)--.
Line 44, "n." should read --n--.
Line 61, "white" should read --while--.

COLUMN 23

Line 10, "white" should read --while--.
Line 17, "A-hatched Bus" should read --$\overline{\text{A}}$-Bus--.
Line 18, "R/W" should read --$\overline{\text{R/W}}$--.
Line 26, "signal" should read --signals--.
Line 33, "FIG. 18." should read --FIG. 18A.--.
Line 57, "computers" should read --computes--.
Line 65, "comparator" should read --comparators--.
Line 67, "conditions" should read --condition--.
Line 68, "a" should be deleted.

UNITED STATES PATENT AND TRADEMARK OFFICE
CERTIFICATE OF CORRECTION

PATENT NO. : 4,996,591
DATED : February 26, 1991
INVENTOR(S) : TOSHIHIRO KADOWAKI ET AL.

It is certified that error appears in the above-identified patent and that said Letters Patent is hereby corrected as shown below:

COLUMN 24

Line 1, "$C_u),(Y_1,$" should read --$c_u),(Y_1,$--.
Line 42, "an" should be deleted.
Line 45, "FIG. 8B" should read --FIG. 18B--.
Line 61, "mm'," should read --m',--.

COLUMN 25

Line 5, "plurality" should read --plurality of--.
Line 9, "CHESELO" should read --CHSELO--.
Line 17, "FIG. 19" should read --FIG. 19A--.
Line 30, "wiring" should read --writing--.

COLUMN 26

Line 4, "is" should read --are--.
Line 5, "-b2" should read ---2--.

COLUMN 28

Line 24, "to" should read --by--.
Line 46, "Cs" should read --$\overline{C_s}$--.
Line 66, "AWE," should read --$\overline{AWE}$,--.
Line 67, "BWE="Lo"" should read --$\overline{BWE}$="Lo"--.
Line 68, "ARE, BRE="Lo"." should read --$\overline{ARE}$, $\overline{BRE}$="Lo".--.

UNITED STATES PATENT AND TRADEMARK OFFICE
CERTIFICATE OF CORRECTION

PATENT NO. : 4,996,591
DATED : February 26, 1991
INVENTOR(S) : TOSHIHIRO KADOWAKI ET AL.

It is certified that error appears in the above-identified patent and that said Letters Patent is hereby corrected as shown below:

COLUMN 29

Line 2, "ARE="Hi" and BRE=Hi," should read
--$\overline{ARE}$="Hi" and $\overline{BRE}$="Hi",--.
Line 13, "CCLK 588" should read --VCLK 588--.
Line 15, "an" should read --any--.
Line 28, "AWE (and BWE)" should read --$\overline{AWE}$ (and $\overline{BWE}$)--.
Line 29, "AWE="Lo"for" should read --$\overline{AWE}$="Lo" for--.
Line 31, "HSYNC" should read --$\overline{HSYNC}$--.
Line 33, "scan)," should read --scan,--.
Line 34, "ARE (and BRE) are set" should read
--$\overline{ARE}$ (and $\overline{BRE}$)--.
Line 35, "ARE="Lo"for" should read --$\overline{ARE}$="Lo" for--.
Line 38, "dame" should read --same--.
Line 42, "AWE (and BWE) and ARE" should read
--$\overline{AWE}$ (and $\overline{BWE}$) and $\overline{ARE}$--.
Line 43, "(and BRE)." should read --(and $\overline{BRE}$).--.
Line 49, "AWE, ARE," should read --$\overline{AWE}$, $\overline{ARE}$,--.
Line 50, "BWE and BRE" should read --$\overline{BWE}$ and $\overline{BRE}$--.

COLUMN 30

Line 7, "circuits 191 to 196" should read
--circuits 191 to 195--.
Line 12, "signal 651" should read --signal 652--.
Line 24, "EAREA 652" should read --EAREA 651--.
Line 29, "increaser" should read --insrease--.
Line 30, "3 from" should read --3, from--.
Line 31, "FIG. 2-7)," should read --FIG. 21D),--.

UNITED STATES PATENT AND TRADEMARK OFFICE
CERTIFICATE OF CORRECTION

PATENT NO. : 4,996,591
DATED : February 26, 1991
INVENTOR(S) : TOSHIHIRO KADOWAKI ET AL.

It is certified that error appears in the above-identified patent and that said Letters Patent is hereby corrected as shown below:

COLUMN 31

Line 22, "FIGS. 10" should read --FIGS. 10A--.
Line 39, "FONT" should read --font--.
Line 65, "lamp 212" should read --lamp 213--.

COLUMN 32

Line 50, "standard.." should read --standard--.

COLUMN 33

Line 1, "datas" should read --data--.
Line 3, "FIG. 11A)" should read --FIG. 11-1A)--.
Line 24, "FIG. 25C. (see" should read --FIG. 25C (see-- and "FIG. 11)" should read --FIG. 11-1A)--.
Line 30, "factor $\beta$" should read --factor $\alpha$--.
Line 32, "$\beta$" should read --$\alpha$-- and "$\beta=255/R_{max}$" should read --$\alpha=255/R_{max}$--.
Line 33, "$\beta=C_1/Rmin$" should read --$\alpha=C_1/R_{min}$--.
Line 34, "$\beta=C_2/Rmin$" should read --$\alpha=C_2/R_{min}$--.
Line 35, "$\beta=C_3/Rmin$" should read --$\alpha=C_3/R_{min}$--.
Line 41, "$\beta$ value" should read --$\alpha$ value--.
Line 46, "table" should read --tables--.
Line 50, "for" should be deleted.
Line 63, "of" should read --of the--.
Line 65, "ab.scissa" should read --abscissa--.

UNITED STATES PATENT AND TRADEMARK OFFICE
CERTIFICATE OF CORRECTION

PATENT NO. : 4,996,591
DATED : February 26, 1991
INVENTOR(S) : TOSHIHIRO KADOWAKI ET AL.

It is certified that error appears in the above-identified patent and that said Letters Patent is hereby corrected as shown below:

COLUMN 34

Line 5, "returns" should read --returns to--.
    Line 31, "clock," should read --clock-- and "FIG. 26B)" should read --FIG. 26B).--.
    Line 34, "an" should read --a--.
    Line 38, "comparators 910 and 911" should read --comparators 610 and 611--.
    Line 51, "J=K" should read --J-K--.
    Line 59, "FIG. 26B" should read --FIG. 26B.--.
    Line 66, "CMP 1 910 and CMP 2 911," should read --CMP 1 610 and CMP 2 611,--.

COLUMN 35

Line 10, ""back"" should read --"black"--.
    Line 11, ""00"," should read --"0",--.
    Line 20, "aS" should read --as--.
    Line 23, "P5" should read --$P_5$--.
    Line 24, "P6." should read --$P_6$.--.
    Line 44, "O." should read --0.--.
    Line 46, "terminal O." should read --terminal 0.--.
    Line 53, "through" should be deleted.
    Line 56, ""O."" should read --"0"--.
    Line 61, "an" should read --a--.
    Line 64, "are set" should be deleted.

UNITED STATES PATENT AND TRADEMARK OFFICE
CERTIFICATE OF CORRECTION

PATENT NO. : 4,996,591
DATED : February 26, 1991
INVENTOR(S) : TOSHIHIRO KADOWAKI ET AL.  Page 12 of 17

It is certified that error appears in the above-identified patent and that said Letters Patent is hereby corrected as shown below:

COLUMN 36

Line 43, "($0 \leq W \leq wp$" should read --($0 \leq W \leq WP$--.
Line 46, "$wq \leq W \leq W2$" should read --$Wg \leq W \leq W2$--.
Line 47, "are" should read --is--.
Line 52, "$wp \leq W \leq wq$" should read --($WP \leq W \leq Wg$--.
Line 57, "wp to wq," should read --WP to Wg,--.

COLUMN 37

Line 11, "lens 13" should read --lens 713--.
Line 42, "an" should read --a--.
Line 52, "belts 743," should read --belts 742,--.
Line 60, "section 401" should read --section 400--.
Line 63, "later mentioned" should read
   --later-mentioned--.
Line 66, "key" should read --key 403--.

COLUMN 38

Line 40, "(contraction)" should read --(reduction)--.
Line 44, "contraction." should read --reduction.--.
Line 48, "real size" should read --real-size--.
Line 54, "for" should be deleted.

COLUMN 39

Line 18, "mode'" should read --mode:--.
Line 31, "X Y" should read --X-Y--.
Line 32, "auto zooming" should read --auto-zooming--.
Line 33, "X=Y" should read --X-Y--.
Line 38, "auto zooming" should read --auto-zooming--.
Line 54, "editor 16," should read --digitizer 16,--.

UNITED STATES PATENT AND TRADEMARK OFFICE
CERTIFICATE OF CORRECTION

PATENT NO. : 4,996,591
DATED : February 26, 1991
INVENTOR(S) : TOSHIHIRO KADOWAKI ET AL.   Page 13 of 17

It is certified that error appears in the above-identified patent and that said Letters Patent is hereby corrected as shown below:

COLUMN 40

Line 1, "proceeds the" should read --proceed--.
Line 2, "display" should be deleted.
Line 6, "use" should read --user-- and
"key" should read --keys--.
Line 26, "destined" should read --destination--.
Line 40, "use" should read --user--.
Line 53, "destined" should read --destination--.
Line 62, "picture P" should read --pictures P--.
Line 63, "220." should read --220 and 221.--.
Line 67, "areas" should read --more areas--.

COLUMN 41

Line 28, "Y." should read --Y,--.
Line 39, "points" should read --appoints--.
Line 41, "presses" should read --pressed--.
Line 55, "use" should read --user--.
Line 59, "Y.M." should read --Y, M,--.
Line 61, "4-full color" should read --4-full-color--.

COLUMN 42

Line 27, "picture P 70" should read --picture P 370--.
Line 37, "an" should read --can--.
Line 65, "same" should read --is the same--.
Line 67, "mode M 33" should read --mode M 333--.

UNITED STATES PATENT AND TRADEMARK OFFICE
CERTIFICATE OF CORRECTION

PATENT NO. : 4,996,591
DATED : February 26, 1991
INVENTOR(S) : TOSHIHIRO KADOWAKI ET AL.

It is certified that error appears in the above-identified patent and that said Letters Patent is hereby corrected as shown below:

COLUMN 43

Line 19, "MONO color." should read --mono-color.--.
Line 24, "monocolor" should read --mono-color--.
Line 26, "monocolor" should read --mono-color--.
Line 28, "and" should be deleted.
Line 32, "use" should read --user--.
Line 53, "create)" should read --(create)--.
Line 55, "mode 420," should read --mode M 420,--.

COLUMN 44

Line 1, "on" should read --on a--.
Line 7, "mode" (2nd occurrence) should be deleted.
Line 15, "crustal" should read --crystal--.
Line 23, "and" should read --or--.
Line 25, "picture P 430," should read --picture P 400,--.
Line 26, "enable the use" should read --enables the user--.
Line 62, "pointing" should read --appointing--.

COLUMN 45

Line 25, "picture P 640" should read --picture P 650--.
Line 26, "(sub scan" should read --(sub-scan--.
Line 30, "X Y" should read --X-Y-- and "auto" should read --auto-zooming--.
Line 31, "zooming" should be deleted.
Line 66, "FIG. 38" should read --FIG. 38.--.

UNITED STATES PATENT AND TRADEMARK OFFICE
CERTIFICATE OF CORRECTION

PATENT NO. : 4,996,591
DATED : February 26, 1991
INVENTOR(S) : TOSHIHIRO KADOWAKI ET AL.

Page 15 of 17

It is certified that error appears in the above-identified patent and that said Letters Patent is hereby corrected as shown below:

COLUMN 46

Line 35, "points" should read --appoints--.
Line 59, "subscan" should read --sub-scan--.
Line 61, "FIG. 11-1." should read --FIG. 11-1A.--.
Line 68, "is" should read --are--.

COLUMN 47

Line 20, "CCD 16" should read --digitizer 116--.
Line 21, "key C" should read --key c--.
Line 27, "C," should read --c,--.

COLUMN 48

Line 5, "CCDs." should read --CCD.--.
Line 9, "key C" should read --key c--.
Line 25, "key C" should read --key c--.
Line 29, "101 3" should read --101-3--.
Line 50, "recognition 200" should read --recognition mode--.
Line 64, "AREA MODE" should read --AREA-MODE--.

COLUMN 49

Line 38, "BIT MAP" should read --BIT-MAP--.
Line 67, "BIIMAP" should read --BIT-MAP--. and "f" should be deleted.

UNITED STATES PATENT AND TRADEMARK OFFICE
CERTIFICATE OF CORRECTION

PATENT NO. : 4,996,591
DATED : February 26, 1991
INVENTOR(S) : TOSHIHIRO KADOWAKI ET AL.

It is certified that error appears in the above-identified patent and that said Letters Patent is hereby corrected as shown below:

COLUMN 50

Line 7, "AREA DENS" should read --AREA-DENS--.
Line 24, "BLANCE," should read --BALANCE,--.
Line 50, "coordinate" should read --coordinates--.

COLUMN 51

Line 10, "X ADD," should read --X-ADD,--.
Line 17, "BIT-MAM" should read --BIT-MAP--.
Line 19, "change over" should read --change-over--.
Line 55, "output" should read --output.--.

COLUMN 52

Line 13, "particulate" should read --particular--.
Line 15, "process" should read --processing--.
Line 19, "process" should read --processing--.

UNITED STATES PATENT AND TRADEMARK OFFICE
CERTIFICATE OF CORRECTION

PATENT NO. : 4,996,591

DATED : February 26, 1991

INVENTOR(S) : TOSHIHIRO KADOWAKI ET AL.

Page 17 of 17

It is certified that error appears in the above-identified patent and that said Letters Patent is hereby corrected as shown below:

COLUMN 53

Line 19, "steps" should read --step--.

Signed and Sealed this

Twenty-sixth Day of July, 1994

Attest:

BRUCE LEHMAN

Attesting Officer

Commissioner of Patents and Trademarks